US006429923B1

(12) United States Patent
Ueda et al.

(10) Patent No.: US 6,429,923 B1
(45) **Date of Patent: *Aug. 6, 2002**

(54) PHOTOGRAPHIC PROCESSING SYSTEM, ORDER RECEIVING SYSTEM, AND PRODUCT DELIVERING SYSTEM

(75) Inventors: Yutaka Ueda; Minoru Ogawa; Shigeharu Koboshi, all of Hino (JP)

(73) Assignee: Konica Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,059

(22) Filed: Feb. 9, 1999

(30) Foreign Application Priority Data

Feb. 10, 1998 (JP) .......................................... 10-028473

(51) Int. Cl.[7] ................................................ G03B 27/52
(52) U.S. Cl. ........................................................ 355/40
(58) Field of Search ..................... 355/40, 50; 396/564, 396/569, 603; 700/236

(56) References Cited

U.S. PATENT DOCUMENTS 5,032,707 A 7/1991 Gudmundson et al.
5,113,351 A * 5/1992 Bostic ........................ 364/479
5,158,155 A * 10/1992 Domain et al. ............... 186/53
5,159,385 A 10/1992 Imamura
5,264,683 A 11/1993 Yoshikawa
5,289,230 A * 2/1994 Hosoya et al. ................ 355/50
5,649,260 A * 7/1997 Wheeler et al. ............ 396/569
5,652,936 A * 7/1997 Klees et al. ................ 396/564
5,664,253 A * 9/1997 Meyers ....................... 396/603
5,808,723 A * 9/1998 Klees .......................... 355/40
5,821,512 A * 10/1998 O'Hagan et al. ........... 235/383
5,831,714 A * 11/1998 Yoshikawa ................... 355/40
5,907,391 A * 5/1999 Kobayashi et al. ........... 355/40

FOREIGN PATENT DOCUMENTS

DE 4230689 3/1994
WO WO/97/48018 12/1997

* cited by examiner

*Primary Examiner*—N. Le
*Assistant Examiner*—Etienne P LeRoux
(74) *Attorney, Agent, or Firm*—Finnegan, Henderson, Farabow, Garrett & Dunner, L.L.P.

(57) ABSTRACT

A photographic processing system is provided with an ID reader for reading ID from an ID card; an ID transmitting receiving device for transmitting the ID to an ID information administrating apparatus and for receiving owner information regarding the owner of the ID card from the ID information administrating apparatus; an order information inputting device for inputting order information regarding order contents for a photographic process; and a controller for correlating the owner information and the order information and for memorizing the owner information and the order information in the correlating form in a memory.

25 Claims, 14 Drawing Sheets

PHOTOGRAPHIC PROCESSING SYSTEM, ORDER RECEIVING SYSTEM, AND PRODUCT DELIVERING SYSTEM

BACKGROUND OF THE INVENTION

The present invention relates to a photographic processing system, an order receiving system, a customer administrating system and a photographic product delivering system.

Conventionally, an order reception to order a Photographic processing regarding a process such as a development process and a process to produce a print for an image recording medium such as a photographic film in which an image is recorded in each frame and a Photo-CD at a photo shop or a photofinisher has been conducted by such a method that a shop assistant of the photo shop or the photofinisher ask the orderer the order contents of the photographic processing, the contact place (address, telephone number and so on, recently, the entry of telephone number is conducted too many times) and the name of the orderer, enters these items in the order column of bound two carbon copy sheets of a photographic bag and an exchange ticket and asks the orderer to confirm these items. Thereafter, the shop assistant enters the expected finishing date of the ordered product and hands over the entered exchange ticket to the orderer.

Then, the orderer carrying the ticket comes to the photo shop or the photofinisher, the shop assistant of the photo shop or the photofinisher hands over the developed photographic film and the produced prints enclosed in the photographic bag with the receipt in exchange of the ticket and money of the sold money amount. When the orderer lost the ticket or did not carry it, the orderer is requested to write the name, address and the telephone number for the evidence for the receipt of the photographic product.

However, it has been learned that, among persons utilizing the photo shop, some persons have a fear that the contact place and the name are surreptitiously looked by the other persons. As a result of the investigation, in the case of the conventional method of receiving an order, there are problems that the other person observes the entry from a closer place or the conversation between the orderer and the shop assistant is overheard by another orderer standing behind the present orderer and the name and the contact place are known by the another orderer.

Further, it has been learned that there are another problems that the entry in the order column and the confirmation for the entry take much time and labor due to the reason that the shop assistant employed by the photo shop and the photofinisher may not write the name of the orderer with correct characters.

Still further, there are another problems that a sales account can not be reckoned due to the reason that a few orderer do not come to take the photographic print regardless of the order for the photographic processing.

Still further, there are another problems that the orderer has to go to a photo shop or a photofinisher with an exchange ticket in order to take a photographic product at the photo shop or the photofinisher.

SUMMARY OF THE INVENTION

The present invention has been done in view of the above problems and attains at least one objective selected from a plurality of objectives described below.

The first objective of the present invention is to make the procedure to input or record information regarding the orderer such as the name of the orderer more simple.

The second objective of the present invention is to prevent the name and the contact place of the orderer from being known by the other persons as far as possible so that the orderer may be released from a fear that the name and the contact place of the orderer are surreptitiously looked by the other persons.

The third objective of the present invention is to avoid troubles that a produced print may not be transferred or delivered regardless of receiving the photographic processing order.

The fourth objective of the present invention is to avoid the occurrence of the problems that a sales account can not be reckoned due to the reason that the orderer does not come to take the photographic print regardless of the order for the photographic processing.

The fifth objective of the present invention is to eliminate the necessity to carry an exchange ticket for the orderer in order to receive a photographic product at the photo shop or the photofinisher.

The above objectives can be attained by the following structures.

A photographic processing system, comprises:

ID reading means for reading ID from an ID card;

ID transmitting receiving means for transmitting the ID to an ID information administrating apparatus and for receiving owner information regarding the owner of the ID card from the ID information administrating apparatus;

order information inputting means for inputting order information regarding order contents for a photographic process; and control means for correlating the owner information and the order information and for memorizing the owner information and the order information in the correlating form in a memory.

Further, the above objective can be attained by the following preferable structures.

(1) A photographic processing system, comprising:

a receipt receiving means for receiving digital image data used as a document, order contents information regarding order contents of the photographic processing for the digital image data and a type and a card number of a credit card owned by an orderer;

a sold money amount calculating means for calculating an amount of money sold by the photographic processing for the order contents indicated by the order contents information;

a transmitting receiving means for transmitting the sold money amount and the card number to a credit card center corresponding to the type of the credit card so as to settle sales account; and a photographing processing executing means for executing the photographic processing of the order contents indicated by the order-contents information received by the receiving means for the digital image data received by the receiving means.

With the invention described in Item (1), only by transmitting the digital image data used as a document, the order contents information regarding order contents of the photographic processing for the digital image data and the type and the card number of the credit card owned by the orderer, the photographic processing can be ordered without going to a photo shop or a photofinisher. Further, it is not necessary to write a name with katakana character and there is no fear that the name and the contact place are surreptitiously looked by a stalker. Furthermore, since sales account can be calculated upon receipt of an order, there is no problem that the sales account can not be reckoned due to the reason that the orderer does not come to take the photographic print regardless of the order for the photographic processing.

(2) The photographic processing system described in Item (1), wherein the transmitting receiving means transmits the sold money amount and the card number to the credit card center corresponding to the type of the credit card so that the credit card center settles the sales account and transmits information regarding the name and the contact place of the owner of the credit card and the transmitting receiving means receives the information regarding the name and the contact place of the owner of the credit card from the credit card center, and the photographic processing system further comprises orderer information recording means for recording the information regarding the name and the contact place on a photographic product obtained by the photographing processing executing means by using the information regarding the name and the contact place of the owner of the credit card received by the transmitting receiving means.

(3) The photographic processing system described in Item (2), wherein the orderer information recording means records information regarding the card type and the card number of the credit card on the photographic product.

With the invention described in Items (2) and (3), since the information regarding the name and the contact place of the owner of the credit card is recorded on the photographic product on the basis of the information from the credit card center, it is not necessary to write a name with katakana character and there is no fear that the name and the contact place are surreptitiously looked by a stalker. Further, since sales account can be calculated upon receipt of an order, there is no problem that the sales account can not be reckoned due to the reason that the orderer does not come to take the photographic print regardless of the order for the photographic processing. Furthermore, it is possible to urge the orderer or to deliver so that delivery to the orderer can be conducted smoothly.

(4) The photographic processing system described in Item (1), wherein the transmitting receiving means transmits the sold money amount and the card number to the credit card center corresponding to the type of the credit card so that the credit card center settles the sales account and transmits information regarding the name and the contact place of the owner of the credit card and the transmitting receiving means receives the information regarding the name and the contact place of the owner of the credit card from the credit card center, the photographic processing system further comprises orderer information recording means for obtaining orderer information recording medium in which the information regarding the-name and the contact place of the owner of the credit card received by the transmitting receiving means received is recorded.

(5) The photographic processing system described in Item (4), wherein the orderer information recording medium records information regarding the card type and the card number of the credit card.

With the invention described in Items (4) and (5), since the orderer information recording medium recording the information regarding the name and the contact place of the owner of the credit card can be obtained on the basis of the information from the credit card center, it is not necessary to write a name with katakana character and there is no fear that the name and the contact place are surreptitiously looked by a stalker. Further, since sales account can be calculated upon receipt of an order, there is no problem that the sales account can not be reckoned due to the reason that the orderer does not come to take the photographic print regardless of the order for the photographic processing. Furthermore, it is possible to urge the orderer or to deliver so that delivery to the orderer can be conducted smoothly.

(6) A photographic processing system, comprising:

a recording medium reading means for reading digital image and a type and a card number of a credit card owned by an orderer from an image recording medium in which the digital image data used as a document and the type and the card number of the credit card owned by the orderer are recorded;

an inputting means for inputting order contents information regarding order contents of the photographic processing for the digital image data;

a sold money amount calculating means for calculating an amount of money sold by the photographic processing for the order contents indicated by the order contents information inputted by the inputting means;

a transmitting receiving means for transmitting the sold money amount and the card number owned by the orderer read by the recording medium reading means to a credit card center corresponding to the type of the credit card owned by the orderer read by the recording medium reading means so as to settle sales account; and a photographing processing executing means for executing the photographic processing of the order contents indicated by the order contents information inputted by the inputting means for the digital image data read by the recording medium reading means.

With the invention described in Item (6), only by making the recording medium reading means to read the image recording medium and inputting the contents of photographic processing order, the photographic processing can be ordered. Further, it is not necessary to write a name with katakana character and there is no fear that the name and the contact place are surreptitiously looked by a stalker. Furthermore, since sales account can be calculated upon receipt of an order, there is no problem that the sales account can not be reckoned due to the reason that the orderer does not come to take the photographic print regardless of the order for the photographic processing.

(7) The photographic processing system described in Item (6), wherein the transmitting receiving means transmits the sold money amount and the card number to the credit card center corresponding to the type of the credit card so that the credit card center settles the sales account and transmits information regarding the name and the contact place of the owner of the credit card and the transmitting receiving means receives the information regarding the name and the contact place of the owner of the credit card from the credit card center, and the photographic processing system further comprises orderer information recording means for recording the information regarding the name and the contact place of the owner of the credit card received by the transmitting receiving means on a photographic product obtained by the photographing processing executing means.

(8) The photographic processing system described in Item (7), wherein the orderer information recording means records information regarding the card type and the card number of the credit card on the photographic product.

With the invention described in Items (7) and (8), since the information regarding the name and the contact place of the owner of the credit card is recorded on the photographic product on the basis of the information from the credit card center, it is not necessary to write a name with katakana character and there is no fear that the name and the contact place are surreptitiously looked by a stalker. Further, since sales account can be calculated upon receipt of an order, there is no problem that the sales account can not be reckoned due to the reason that the orderer does not come to take the photographic print regardless of the order for the photographic processing. Furthermore, it is possible to urge the orderer or to deliver so that delivery to the orderer can be conducted smoothly.

(9) The photographic processing system described in Item (6), wherein the transmitting receiving means transmits the sold money amount and the card number to the credit card center corresponding to the type of the credit card so that the credit card center settles the sales account and transmits information regarding the name and the contact place of the owner of the credit card and the transmitting receiving means receives the information regarding the name and the contact place of the owner of the credit card from the credit card center, the photographic processing system further comprises orderer information recording means for obtaining orderer information recording medium in which the information regarding the name and the contact place of the owner of the credit card received by the transmitting receiving means received is recorded.

(10) The photographic processing system described in Item (9), wherein the orderer information recording medium records information regarding the card type and the card number of the credit card.

With the invention described in Items (9) and (10), since the orderer information recording medium recording the information regarding the name and the contact place of the owner of the credit card can be obtained on the basis of the information from the credit card center, it is not necessary to write a name with katakana character and there is no fear that the name and the contact place are surreptitiously looked by a stalker. Further, since sales account can be calculated upon receipt of an order, there is no problem that the sales account can not be reckoned due to the reason that the orderer does not come to take the photographic print regardless of the order for the photographic processing. Furthermore, it is possible to urge the orderer or to deliver so that delivery to the orderer can be conducted smoothly.

(11) An order receiving system, comprising:

a recording medium reading means for reading digital image and a type and a card number of a credit card owned by an orderer from an image recording medium in which the digital image data used as a document and the type and the card number of the credit card owned by the orderer are recorded;

an inputting means for inputting order contents information regarding order contents of the photographic processing for the digital image data;

a sold money amount calculating means for calculating an amount of money sold by the photographic processing for the order contents indicated by the order contents information inputted by the inputting means;

a transmitting receiving means for transmitting the sold money amount and the card number to the credit card center corresponding to the type of the credit card so that the credit card center settles the sales account and transmits information regarding the name and the contact place of the owner of the credit card and for receiving the name and the contact place of the owner of the credit card from the credit card center; and a received order recording means for obtaining received order recording medium in which the information regarding the name and the contact place of the owner of the credit card received by the transmitting receiving means and the order contents information inputted by the inputting means are recorded.

(12) The order receiving system described in Item (11), wherein the received orderer recording medium records the information regarding the card type and the card number of the credit card.

With the invention described in Items (11) and (12), only by inputting the order contents information and making the recording medium reading means to read the image recording medium, the photographic processing can be ordered with less labor. Further, since the received order recording medium recording the information regarding the name and the contact place on the basis of the information from the credit card center can be obtained, it is not necessary to write a name with katakana character and there is no fear that the name and the contact place are surreptitiously looked by a stalker. Furthermore, since sales account can be calculated upon receipt of an order, there is no problem that the sales account can not be reckoned due to the reason that the orderer does not come to take the photographic print regardless of the order for the photographic processing.

(13) An image recording medium in which digital image data used as a document and a card type and a card number of a credit card of an orderer are recorded.

With the invention described in Item (13), only by inputting the contents of photographic processing order; making the recording medium reading means to read an image recording medium; calculating an amount of money sold by the photographic processing from the inputted photographic processing order contents; transmitting the sold money amount and the card number of the credit card owned by the read orderer to the credit card center corresponding to the type of the credit card owned by the read orderer so as to settle the sales account; receiving information regarding the name and the contact place of the owner of the credit card from the credit card center; an orderer of the photographic processing can complete the photographing processing order with less labor. Further, since the name can be written on the basis of the information from the credit card center, it is not necessary to write a name with katakana character and there is no fear that the name and the contact place are surreptitiously looked by a stalker. Furthermore, since sales account can be calculated upon receipt of an order, there is no problem that the sales account can not be reckoned due to the reason that the orderer does not come to take the photographic print regardless of the order for the photographic processing.

(14) An order receiving system, comprising:

a recording medium reading means for reading digital image data and a type and a card number of a credit card owned by an orderer from an image recording medium in which the digital image data used as a document and the type and the card number of the credit card owned by the orderer are recorded;

an inputting means for inputting order contents information regarding order contents of the photographic processing for the digital image data; and a received order recording means for obtaining received order recording medium in which the information regarding the name and the contact place of the owner of the credit card read by the recording medium reading means and the order contents information inputted by the inputting means are recorded.

With the invention described in Item (14), only by inputting the contents of photographic processing order and making the recording medium reading means to read the image recording medium at the time of ordering photographing processing, the photographic processing order can be completed with less labor. Further, since the received order recording medium recording the information regarding the type of the credit card, the card number and the photographic processing order contents can be obtained, and since the sales account can be settled and the information regarding the name and the contact place can be obtained by transmitting the sold amount of money and the card number to a credit card center corresponding to the type of the credit card after receiving photographic products produced in accordance with the photographic processing order contents, it is not necessary to write a name with katakana character and there is no fear that the name and the contact place are surreptitiously looked by a stalker. Furthermore, there is no problem that the sales account can not be reckoned due to the reason that the orderer does not come to take the photographic print regardless of the order for the photographic processing.

(15) An order receiving system, comprising:

a recording medium confirming means for confirming whether a type and a card number of a credit card owned by an orderer are recorded in an image recording medium for recording digital image data used as a document and a type and a card number of a credit card owned by an orderer;

an inputting means for inputting order contents information regarding order contents of the photographic processing for the digital image data; and a received order recording means for obtaining received order recording medium which records the-order contents information inputted by the inputting means and is correlated with the image recording medium when the recording medium confirming means confirms that the type and the card number of the credit card owned by the orderer are recorded in the image recording medium.

With the invention described in Item (15), only by inputting order contents information regarding the contents of photographic processing order and making the recording medium reading means to read the image recording medium at the time of ordering photographing processing, the photographic processing order can be completed with less labor. Further, since the image recording medium which is confirmed that it records the type of the credit card and the card number can be obtained with the received order recording medium which records the order contents and is correlated with the image recording medium, and since the sales account can be settled and the information regarding the name and the contact place can be obtained by transmitting the sold amount of money and the card number to a credit card center corresponding to the type of the credit card after receiving photographic products produced in accordance with the photographic processing order contents, it is not necessary to write a name with katakana character and there is no fear that the name and the contact place are surreptitiously looked by a stalker. Furthermore, there is no problem that the sales account can not be reckoned due to the reason that the orderer does not come to take the photographic print regardless of the order for the photographic processing.

(16) An order receiving system, comprising:

a recording medium reading means for reading digital image data and a card ID information of a card owned by an orderer from an image recording medium in which the digital image data used as a document and the card ID information of the card owned by the orderer are recorded;

an inputting means for inputting order contents information regarding order contents of the photographic processing for the digital image data;

a transmitting receiving means for transmitting the card ID information of the card owned by the orderer read by the recording medium reading means to a card center so that the card center transmits the name and the contact place of the owner of the card corresponding to the card ID information and for receiving the name and the contact place of the owner of the card from the card center;

a photographing processing executing means for executing the photographic processing of the order contents indicated by the order contents information received by the receiving means for the digital image data received by the receiving means; and an orderer information recording means for recording the name and the contact place of the owner of the card received by the transmitting receiving means on a photographic product obtained by the photographing processing executing means.

With the invention described in Item (16), only by making the recording medium reading means to read the image recording medium and inputting the order contents information, the photographic processing can be ordered. Further, it is not necessary to write a name with katakana character and there is no fear that the name and the contact place are surreptitiously looked by a stalker. Furthermore, since the name and the contact place of the orderer are recorded on the photographic product, it is possible to urge the orderer or to deliver so that delivery to the orderer can be conducted smoothly.

(17) An order receiving system, comprising:

a recording medium reading means for reading digital image data and a card ID information of a card owned by an orderer from an image recording medium in which the digital image data used as a document and the card ID information of the card owned by the orderer are recorded;

an inputting means for inputting order contents information regarding order contents of the photographic processing for the digital image data;

a transmitting receiving means for transmitting the card ID information of the card owned by the orderer read by the recording medium reading means to a card center so that the card center transmits the name and the contact place of the owner of the card corresponding to the card ID information and for receiving the name and the contact place of the owner of the card from the card center;

a photographing processing executing means for executing the photographic processing of the order contents indicated by the order contents information received by the receiving means for the digital image data received by the receiving means; and an orderer information recording means for obtaining an orderer information recording medium in which the name and the contact place of the owner of the card received by the transmitting receiving means are recorded.

With the invention described in Item (17), only by making the recording medium reading means to read the image recording medium and inputting the order contents information, the photographic processing can be ordered. Further, it is not necessary to write a name with katakana character and there is no fear that the name and the contact place are surreptitiously looked by a stalker. Furthermore, since an orderer information recording medium in which the name and the contact place of the orderer are recorded can be obtained, it is possible to urge the orderer or to deliver so that delivery to the orderer can be conducted smoothly.

(18) The photographic processing system described in Items (16) and (17), further comprising:

a sold money amount calculating means for calculating a sold amount of money obtained by the photographic processing of the order contents indicated in the order contents information inputted by the inputting means; and a cash register for settling the sales account on the basis of the sold amount of money calculated by the sold money amount calculating means.

With the invention described in Item (18), since the sales account can be settled simultaneously with the order receipt, there is no problem that the sales account can not be reckoned due to the reason that the orderer does not come to take the photographic print regardless of the order for the photographic processing.

(19) The photographic processing system described in either one of Items (16) to (18), wherein plural card types can be dealt, the image recording medium records the card type owned by the orderer, the recording medium reading means can read the card type and the card ID information, the transmitting receiving means transmits information to the card center corresponding to the type of the card owned by the orderer read by the recording medium reading means and the transmitting receiving means receives information from the credit card center.

With the invention described in Item (19), plural card types can be dealt and the photographing processing described in either one of Items (16) to (18) can conducted by any one of the plural cards.

(20) An order receiving system, comprising:

a recording medium reading means for reading a card ID information of a card owned by an orderer from an image recording medium in which the digital image data used as a document and the card ID information of the card owned by the orderer are recorded;

an inputting means for inputting order contents information regarding order contents of the photographic processing for the digital image data;

a transmitting receiving means for transmitting the card ID information of the card owned by the orderer read by the recording medium reading means to a card center so that the card center transmits the name and the contact place of the owner of the card and for receiving the name and the contact place of the owner of the card from the card center; and a received order recording means for obtaining received order recording medium which records the name and the contact place of the owner of the card received by the transmitting receiving means and the order contents information inputted by the inputting means.

(21) The order receiving system described in Item 20, wherein the received order recording medium records the card ID information of the card.

With the invention described in Items (20) and (21), only by inputting the order contents information and making the recording medium reading means to read the image recording medium, the photographic processing can be ordered with less labor. Further, since the received orderer recording medium recording the information regarding the name and the contact place of the owner of the credit card can be obtained on the basis of the information from the card center, it is not necessary to write a name with katakana character and there is no fear that the name and the contact place are surreptitiously looked by a stalker.

(22) The order receiving system described in Items (20) and (21), further comprising:

a sold money amount calculating means for calculating a sold amount of money obtained by the photographic processing of the order contents indicated in the order contents information inputted by the inputting means; and a cash register for settling the sales account on the basis of the sold amount of money calculated by the sold money amount calculating means.

With the invention described in Item (22), since the sales account can be settled simultaneously with the order receipt, there is no problem that the sales account can not be reckoned due to the reason that the orderer does not come to take the photographic print regardless of the order for the photographic processing.

(23) The order receiving system described in either one of Items (20) to (22), wherein plural card types can be dealt, the image recording medium records the card type owned by the orderer and the card ID information, the recording medium reading means can read the card type and the card ID information for each of the plural card types, the transmitting receiving means transmits information to the card center corresponding to the type of the card owned by the orderer read by the recording medium reading means and the transmitting receiving means receives information from the credit card center.

With the invention described in Item (23), the order receiving described in either one of Items (20) to (22) can conducted by any one of the plural cards.

(24) An image recording medium in which digital image data used as a document and a card ID information of a card owned by an orderer are recorded.

With the invention described in Item (24), only by inputting the order contents information and making the recording medium reading means to read an image recording medium; since an amount of money sold by the photographic processing for the order contents indicated by the order contents information can be calculated from the inputted order contents information and the sold money amount and the card ID information of the card owned by the read orderer can be transmitted to a card center so as to make the card center can to transmit the name and the contact place of the owner of the card so that the name and the contact place of the owner of the card can be received from the card center; an orderer of the photographic processing can be completed with less labor. Further, since the name can be written on the basis of the information from the card center, it is not necessary to write a name with katakana character and there is no fear that the name and the contact place are surreptitiously looked by a stalker.

(25) An image recording medium in which digital image data used as a document and a card type and a card ID information of a card owned by an orderer are recorded.

With the invention described in Item (24), only by inputting the order contents information and making the recording medium reading means to read an image recording medium for each of plural card types; since an amount of money sold by the photographic processing for the order contents indicated by the order contents information can be calculated from the inputted order contents information and the sold money amount and the card ID information of the card owned by the read orderer can be transmitted to a card center corresponding to the card type so as to make the card center can to transmit the name and the contact place of the owner of the card so that the name and the contact place of the owner of the card can be received from the card center; an orderer of the photographic processing can complete the photographing processing order with less labor. Further, since the name can be written on the basis of the information from the card center, it is not necessary to write a name with katakana character and there is no fear that the name and the contact place are surreptitiously looked by a stalker.

(26) An order receiving system, comprising:

a recording medium reading means for reading a card ID information of a card owned by an orderer from an image recording medium in which the digital image data used as a document and the card ID information of the card owned by the orderer are recorded;

an inputting means for inputting order contents information regarding order contents of the photographic processing for the digital image data; and a received order recording means for obtaining received order recording medium which records the ID information read by the recording medium reading means and the order contents information inputted by the inputting means.

With the invention described in Item (24), only by inputting the order contents information and making the recording medium reading means to read an image recording medium; since an amount of money sold by the photographic processing for the order contents indicated by the order contents information can be calculated from the inputted order contents information and the sold money amount and the card ID information of the card owned by the read orderer can be transmitted to a card center so as to make the card center can to transmit the name and the contact place of the owner of the card so that the name and the contact place of the owner of the card can be received from the card center; an orderer of the photographic processing can complete the photographing processing order with less labor. Further, since the name can be written on the basis of the information from the card center, it is not necessary to write a name with katakana character and there is no fear that the name and the contact place are surreptitiously looked by a stalker.

With the invention described in Item (26), only by inputting the order contents information and making the recording medium reading means to read an image recording medium; an orderer of the photographic processing can be completed with less labor. Further, since the image recording medium recording the card ID information of the card and the order contents information can be obtained and the name and the contact place of the owner of the card can be obtained by transmitting the card number to the card center, it is not necessary to write a name with katakana character and there is no fear that the name and the contact place are surreptitiously looked by a stalker.

(27) The order receiving system described in Item (26), wherein plural card types can be dealt, the image recording medium records the card type owned by the orderer and the card ID information, and the recording medium reading means can read the card type and the card ID information for each of the plural card types, the received order recording medium can records the card type of the card owned by the orderer read by the recording medium reading means.

With the invention described in Item (27), only by inputting the order contents information and making the recording medium reading means to read an image recording medium for each of the plural card types; an orderer of the photographic processing can be completed with less labor. Further, since the image recording medium recording the card ID information of the card and the order contents information can be obtained and the name and the contact place of the owner of the card can be obtained by transmitting the card number to the card center, it is not necessary to write a name with katakana character and there is no fear that the name and the contact place are surreptitiously looked by a stalker.

(28) An order receiving system, comprising:

a recording medium confirming means for confirming whether a card ID information of a card owned by an orderer are recorded in an image recording medium for recording digital image data used as a document and a card ID information of a card owned by an orderer;

an inputting means for inputting order contents information regarding order contents of the photographic processing for the digital image data; and a received order recording means for obtaining received order recording medium which records the order contents information inputted by the inputting means and is correlated with the image recording medium when the recording medium confirming means confirms that the card ID information of the card owned by the orderer are recorded in the image recording medium.

(29) An order receiving system, comprising:

a recording medium confirming means for confirming whether a card type and a card ID information of a card owned by an orderer are recorded in an image recording medium for recording digital image data used as a document and a card type and a card ID information of a card owned by an orderer;

an inputting means for inputting order contents information regarding order contents of the photographic processing for the digital image data; and a received order recording means for obtaining received order recording medium which records the order contents information inputted by the inputting means and is correlated with the image recording medium when the recording medium confirming means confirms that the card type and the card ID information of the card owned by the orderer are recorded in the image recording medium.

With the invention described in Item (28) and (29), only by inputting order contents information and making the recording medium reading means to read the image recording medium, the photographic processing order can be completed with less labor. Further, since the image recording medium which is confirmed that it records the card ID information of the card can be obtained with the received order recording medium which records the order contents information and is correlated with the image recording medium, and since the name and the contact place of the orderer can be obtained by transmitting the card ID information to a card center, it is not necessary to write a name with katakana character and there is no fear that the name and the contact place are surreptitiously looked by a stalker.

(30) A photographic processing system, comprising:

a recording medium reading means for reading digital image and a name and an contact place of an orderer from an image recording medium in which the digital image data used as a document and the name and the contact place of the orderer are recorded;

an inputting means for inputting order contents information regarding order contents of the photographic processing for the digital image data;

a photographing processing executing means for executing the photographic processing of the order contents indicated by the order contents information inputted by the inputting means for the digital image data read by the recording medium reading means; and an orderer information recording means for recording the name and the contact place of the orderer read by the recording medium reading means on a photographic product obtained by the photographing processing executing means.

With the invention described in Item (30), since the name and the contact place read by the recording medium reading means is recorded on the photographic product, it is not necessary to write a name with katakana character and there is no fear that the name and the contact place are surreptitiously looked by a stalker. Further, it is possible to urge the orderer or to deliver so that delivery to the orderer can be conducted smoothly.

(31) A photographic processing system, comprising:

a recording medium reading means for reading digital image and a name and an contact place of an orderer from an image recording medium in which the digital image data used as a document and the name and the contact place of the orderer are recorded;

an inputting means for inputting order contents information regarding order contents of the photographic processing for the digital image data;

a photographing processing executing means for executing the photographic processing of the order contents indicated by the order contents information inputted by the inputting means for the digital image data read by the recording medium reading means; and an orderer information recording means for obtaining orderer information recording medium in which the name and the contact place of the orderer read by the recording medium reading means are recorded.

With the invention described in Item (31), since the orderer information recording medium recording the name and the contact place read by the recording medium reading means can be obtained, it is not necessary to write a name with katakana character and there is no fear that the name and the contact place are surreptitiously looked by a stalker. Further, it is possible to urge the orderer or to deliver so that delivery to the orderer can be conducted smoothly.

(32) An order receiving system, comprising:

a recording medium reading means for reading digital image and a name and an contact place of an orderer from an image recording medium in which the digital image data used as a document and the name and the contact place of the orderer are recorded;

an inputting means for inputting order contents information regarding order contents of the photographic processing for the digital image data; and a received order recording means for obtaining received orderer recording medium in which the name and the contact place of the orderer read by the recording medium reading means and the order contents information inputted by the inputting means are recorded.

With the invention described in Item (32), only by inputting the order contents information and making the recording medium reading means to read an image recording medium; an orderer of the photographic processing can be completed with less labor. Further, since the received order recording medium recording the name and the contact place read by the recording medium reading means and the order contents information can be obtained, it is not necessary to write a name with katakana character and there is no fear that the name and the contact place are surreptitiously looked by a stalker.

(33) An order receiving system, comprising:

a recording medium confirming means for confirming whether a name and an contact place of an orderer are recorded in an image recording medium for recording digital image data used as a document and a name and an contact place of an orderer;

an inputting means for inputting order contents information regarding order contents of the photographic processing for the digital image data; and a received order recording means for obtaining received order recording medium which records the order contents information inputted by the inputting means and is correlated with the image recording medium when the recording medium confirming means confirms that the name and the contact place of the orderer are recorded in the image recording medium.

With the invention described in Item (33), only by inputting order contents information and making the recording medium reading means to read the image recording medium, the photographic processing order can be completed with less labor. Further, since the image recording medium which is confirmed that it records the name and the contact place of the orderer can be obtained with the received order recording medium which records the order contents information and is correlated with the image recording medium, and since the name and the contact place of the orderer can be obtained by reading the image recording medium, it is not necessary to write a name with katakana character and there is no fear that the name and the contact place are surreptitiously looked by a stalker.

(34) An image recording medium in which digital image data used as a document and a name and an contact place of an orderer are recorded.

With the invention described in Item (34), only by inputting the order contents information regarding the order contents for photographic processing, taking out the image recording medium and making the image recording medium to be read; an orderer of the photographic processing can be completed with less labor. Further, since the name and the contact place can be read from the image recording medium, it is not necessary to write a name with katakana character and there is no fear that the name and the contact place are surreptitiously looked by a stalker.

(35) A photographic processing system, comprising:

a modem with which a telephone line is connected;

a client computer for receiving digital image data through the modem, for obtaining output digital image data to output a hard copy, and for memorizing the output digital image data; and a printer including a host computer connected with the client computer and for outputting a hard copy of the digital image data on the basis of the output digital image data;

wherein the client computer is provided with a specific output folder as a common place for an interface between the client computer and the host computer and the output digital image data are stored in the specific output folder.

With the invention described in Item (35), since the client computer is provided with a specific output folder as a common place for an interface between the client computer and the host computer and the output digital image data are stored in the specific output folder, if a large amount of the output digital image data are transmitted to the host computer, the large amount of the output digital image data are stored in the client computer. Accordingly, since it is not necessary to transmit the large amount of the output digital image data to the host computer, the host computer can be prevented from falling in difficulty to output smoothly the image data due to the shortage of the memory capacity. Further, since there is no need to make it possible for the client computer to access the host computer, by making it impossible for the client computer to access the host computer, invasion through the modem from the client computer to the host computer included in the printer can be avoided. Still further, even if the program of the host computer is not kept so as to be adaptable with the program newly installed in the client computer, the program of the host computer functions in good order.

(36) The photographic processing system described in Item (35), wherein the host computer produces output digital image data to output a hard copy independently from the client computer.

With the invention described in Item (36), if a large amount of the output digital image data to be outputted are transmitted to the client computer, since the large amount of the output digital image data to be outputted are transmitted to the host computer, the client computer can be prevented from falling in difficulty to output smoothly the image data due to the shortage of the memory capacity.

(37) The photographic processing system described in Item (35) or (36), wherein when the host computer can not be accessed from the client computer, the digital image data stored in the output folder in the client computer are transmitted to the host computer by the order of the host computer.

With the invention described in Item (37), when the digital image data stored in the specific folder in the client computer are transmitted to the host computer by the order of the host computer and the host computer can not be accessed from the client computer, the invasion through the modem from the client computer to the host computer included in the printer can be avoided.

(38) The photographic processing system described in either one of Items (35) to (37), wherein the host computer produces input digital image data to be inputted to the client computer and the client computer is provided with a specific input folder as a common place for an interface between the client computer and the host computer and the input digital image data are stored in the specific output folder.

With the invention described in Item (38), since the client computer is provided with a specific input folder as a common place for an interface between the client computer and the host computer and the input digital image data are stored in the specific input folder, if a large amount of the input digital image data are produced by the host computer, since it is not necessary to store the large amount of the input digital image data in the host computer, the host computer can be prevented from falling in difficulty to output smoothly the image data due to the shortage of the memory capacity. Further, since there is no need to make it possible for the client computer to access the host computer, by making it impossible to access from the client computer to the host computer, invasion from the client computer to the host computer included in the printer can be avoided.

(39) A photographic processing system, comprising:

a modem with which a telephone line is connected;

a client computer for receiving digital image data-through the modem, for obtaining output digital image data to output a hard copy, and for memorizing the output digital image data; and a printer including a host computer connected with the client computer and for outputting a hard copy of the digital image data on the basis of the output digital image data;

wherein when the host computer can not be accessed from the client computer, the output digital image data are transmitted from the client computer to the host computer by the order of the host computer.

With the invention described in Item (39), when the digital image data are transmitted from the client computer to the host computer and the host computer can not be accessed from the client computer, the invasion from the client computer to the host computer included in the printer can be avoided.

(40) The photographic processing system described in Item (39), wherein the host computer produces input digital image data to be inputted to the client computer and the input digital image data are transmitted from the host computer to the client computer by the order of the host computer.

With the invention described in Item (40), when the input digital image data are transmitted from the host computer to the client computer and the host computer can not be accessed from the client computer, the invasion from the client computer to the host computer included in the printer can be avoided.

(41) An order receiving system, comprising:

an inputting means for inputting order contents information regarding order contents of the photographic processing for the image data from an image recording medium in which a photographic image used as a document is stored;

a sold money amount calculating means for calculating an amount of money sold by the photographic processing for the order contents indicated by the order contents information inputted by the inputting means;

a credit card reading means for reading a card type and a card number of the credit from the credit card owned by the orderer of the photographic processing;

a transmitting receiving means for transmitting the sold money amount and the card number to a credit card center corresponding to the type of the credit card so that the credit card center settles the sales account and transmits information regarding the name and the contact place of the owner of the credit card and the transmitting receiving means receives the information regarding the name and the contact place of the owner of the credit card from the credit card center; and a received order recording means for obtaining received order recording medium in which the information regarding the name and the contact place of the owner of the credit card received by the transmitting receiving means and the order contents information inputted by the inputting means are recorded.

(42) The order receiving system described in Item (41), wherein the received orderer recording medium records the information regarding the card type and the card number of the credit card.

With the invention described in Items (41) and (42), only by inputting the order contents information and making the credit card reading means to read the credit card owned by the orderer, the photographic processing can be ordered with less labor. Further, since the received order recording medium recording the information regarding the name and the contact place of the orderer on the basis of the information from the credit card center and the order contents information inputted by the inputting means can be obtained, it is not necessary to write a name with katakana character and there is no fear that the name and the contact place are surreptitiously looked by a stalker. Furthermore, since sales account can be calculated upon receipt of an order, there is no problem that the sales account can not be reckoned due to the reason that the orderer does not come to take the photographic print regardless of the order for the photographic processing.

(43) An order receiving system, comprising:

an inputting means for inputting order contents information regarding order contents of the photographic processing for the image data from an image recording medium in which a photographic image used as a document is stored;

a sold money amount calculating means for calculating an amount of money sold by the photographic processing for the order contents indicated by the order contents information inputted by the inputting means;

a credit card reading means for reading a card type and a card number of the credit from the credit card owned by the orderer of the photographic processing;

a transmitting receiving means for transmitting the sold money amount and the card number to a credit card center corresponding to the type of the credit card so that the credit card center settles the sales account; and a received order recording means for obtaining received order recording medium in which the information regarding the card type and the card number of the credit card and the order contents information inputted by the inputting means are recorded.

With the invention described in Item (43), only by inputting the order contents information and making the credit card reading means to read the credit card owned by the orderer, the photographic processing can be ordered with less labor. Further, since the card number is transmitted to the credit card center corresponding to the card number of the credit card owned by the orderer so that he credit card center settles the sales account, there is no problem that the sales account can not be reckoned due to the reason that the orderer does not come to take the photographic print regardless of the order for the photographic processing. Further, since the card number is transmitted to the credit card center corresponding to the card type of the credit card recorded in the received order recording medium so as to obtain the name and the contact place of the orderer from the credit card center, it is not necessary to write a name with katakana character and there is no fear that the name and the contact place are surreptitiously looked by a stalker.

(44) An order receiving system, comprising:

an inputting means for inputting order contents information regarding order contents of the photographic processing for the image data from an image recording medium in which a photographic image used as a document is stored;

a credit card reading means for reading a card type and a card number of the credit from the credit card owned by the orderer of the photographic processing; and a received order recording means for obtaining a received order recording medium in which the information regarding the card type and the card number of the credit card read by the credit card reading means and the order contents information inputted by the inputting means are recorded.

With the invention described in Item (44), only by inputting the order contents information and making the credit card reading means to read the credit card owned by the orderer, the photographic processing can be ordered with less labor. Further, since the card number is transmitted to the credit card center corresponding to the card number of the credit card owned by the orderer recorded in the received order recording medium so that he credit card center settles the sales account and since the name and the contact place of the orderer can be obtained from the credit card center, it is not necessary to write a name with katakana character and there is no fear that the name and the contact place are surreptitiously looked by a stalker. Further, since the sales account can be settled, there is no problem that the sales account can not be reckoned due to the reason that the orderer does not come to take the photographic print regardless of the order for the photographic processing.

(45) A photographic product delivering system, comprising:

a memory means for memorizing information regarding an undelivered photographic product which has been finished and has not yet delivered in correlation with the name and the contact place of an orderer;

a credit card reading means for reading a card type and a card number of the credit from the credit card owned by the orderer of the photographic processing;

a transmitting receiving means for transmitting information of the card number to a credit card center corresponding to the type of the credit card and for receiving the information regarding the name and the contact place of the owner of the credit card from the credit card center; and an undelivered photographic product indicating means for reading information regarding an undelivered photographic product corresponding to the name and the contact place of the owner of the credit card received by the transmitting receiving means from the memory means and for indicating the information regarding the undelivered photographic product.

(46) The photographic product delivering system described in Item (45), further comprising:

an inputting means for inputting information regarding a newly finished photographic product in correlation with the name and the contact place of the orderer and for making the memory means to memorize it as an undelivered photographic product.

(47) The photographic product delivering system described in Item (45) or (46), further comprising:

a delivery inputting means for inputting the matter that the photographic product indicated by the undelivered photographic product indicating means has been delivered, wherein the information regarding the undelivered photographic product memorized by the memory means is changed by the input by the inputting means.

With the invention described in Items (45) to (47), since the photographic product is indicated in correlation with the name and the contact place of the owner of the credit card, a photographic product owned by the other person having the same name or a photographic product owned by a person having the same contact place, for example, by persons living in a bachelor dormitory having the same telephone number is not indicated and only the photographic product ordered by the present person is indicated, only the photographic ordered by the present person is delivered to the present person. Further, the orderer can obtain the photographic product from a photo shop or a photophinisher only by indicating the credit card carried the orderer at the usual going-out time without carrying an exchange ticket.

(48) A photographic product delivering system, comprising:

a memory means for memorizing information regarding an undelivered photographic product which has been finished and has not yet delivered in correlation with the card number of the credit card owned by an orderer;

a credit card reading means for reading a card type and a card number of the credit from the credit card owned by the orderer of the photographic processing; and an undelivered photographic product indicating means for reading information regarding an undelivered photographic product corresponding to the card number read by the credit card reading means from the memory means and for indicating the information regarding the undelivered photographic product.

(49) The photographic product delivering system described in Item (48), further comprising:

an inputting means for inputting information regarding a newly finished photographic product in correlation with the card number of the credit card owned by the orderer and for making the memory means to memorize it as an undelivered photographic product.

(50) The photographic product delivering system described in Item (48) or (49), further comprising:

a delivery inputting means for inputting the matter that the photographic product indicated by the undelivered photographic product indicating means has been delivered, wherein the information regarding the undelivered photographic product memorized by the memory means is changed by the input by the inputting means.

With the invention described in Items (48) to (50), since the photographic product is indicated in correlation with the card number of the credit card owned by a person coming to take the photographic product, photographic products owned by the other persons are not indicated and only the photographic product ordered by the present person is indicated, only the photographic ordered by the present person is delivered to the present person. Further, the orderer can obtain the photographic product from a photo shop or a photophinisher only by indicating the credit card carried the orderer at the usual going-out time without carrying an exchange ticket.

(51) An order receiving system, comprising:

a card reading means for reading a card ID information from a card owned by an orderer of a photographic processing for an image recording medium in which a photographic image used as a document is recorded;

a transmitting receiving means for transmitting the card ID information to a card center so that the card center transmits the name and the contact place of the owner of the card and for receiving the name and the contact place of the owner of the card; and an orderer information recording means for obtaining an orderer information recording medium in which the name and the contact place of the owner of the card received by the transmitting receiving means are recorded.

(52) The order receiving system described in Item (51), wherein the orderer information recording medium records the card ID information of the card.

From a point of view that the name and the contact place are refrained from being surreptitiously looked by a stalker at the time of ordering a photographic processing, the invention described in Items (51) and (52) is conceived by finding that the card is not limited to a credit card and any card may be applied with the invention if the card has a card center which memorizes the name and the contact place of the owner of the card in correlation with the card ID information. With the invention described in Items (51) and (52), only by making the card reading means to read the card owned by the orderer, since an orderer information recording medium in which the name and the contact place of the orderer are recorded can be obtained by the information from the card center, it is not necessary to write a name with katakana character and there is no fear that the name and the contact place are surreptitiously looked by a stalker.

(53) An order receiving system, comprising:

a card reading means for reading a card type and a card ID information from a card owned by an orderer of a photographic processing for an image recording medium in which a photographic image used as a document is recorded;

a transmitting receiving means for transmitting the card ID information to a card center corresponding to the card type read by the card reading means so that the card center transmits the name and the contact place of the owner of the card and for receiving the name and the contact place of the owner of the card; and an orderer information recording means for obtaining an orderer information recording medium in which the name and the contact place of the owner of the card received by the transmitting receiving means are recorded.

(54) The order receiving system described in Item (53), wherein the orderer information recording medium records the card type and the card ID information of the card.

With the invention described in Items (53) and (54), only by making the card reading means to read the card owned by the orderer for plural card types, since an orderer information recording medium in which the name and the contact place of the orderer are recorded can be obtained by the information from the card center, it is not necessary to write a name with katakana character and there is no fear that the name and the contact place are surreptitiously looked by a stalker.

(55) The order receiving system described in either one of Items (51) to (54), further comprising:

an input means for inputting order contents information regarding order contents of a photographic processing for an image recording medium in which a photographic image used as a document is recorded, wherein the orderer information recording medium is a received order recording medium in which the order contents information inputted by the inputting means is recorded, and the orderer information recording means is a received order recording means for obtaining the received order information recording medium.

With the invention described in Item (55), only by inputting the order contents information and making the card reading means to read the card owned by the orderer, the photographic processing can be ordered with less labor.

(56) An order receiving system, comprising:

an input means for inputting order contents information regarding order contents of a photographic processing for an image recording medium in which a photographic image used as a document is recorded, a card reading means for reading a card ID information from a card owned by an orderer; and a received order information recording means for obtaining a received order information recording medium in which the card ID information of the card read by the card reading means and the order contents information inputted by the inputting means are recorded.

With the invention described in Item (56), only by inputting the order contents information and making the card reading means to read the card owned by the orderer, the photographic processing can be ordered with less labor. Further, since the name and the contact place of the orderer can be received from the card center by transmitting the card ID information to the card center so as to transmit the name and the contact place of the orderer, it is not necessary to write a name with katakana character and there is no fear that the name and the contact place are surreptitiously looked by a stalker.

(57) The order receiving system described in Item (56), wherein the card reading means reads a card type from the card owned by the orderer and the received order information recording medium records the card type.

With the invention described in Item (57), only by inputting the order contents information and making the card reading means to read the card owned by the orderer for plural card types, the photographic processing can be ordered with less labor. Further, since the name and the contact place of the orderer can be received from the card center corresponding to the card type by transmitting the card ID information to the card center so as to transmit the name and the contact place of the orderer, it is not necessary to write a name with katakana character and there is no fear that the name and the contact place are surreptitiously looked by a stalker.

(58) The order receiving system described in either one of Items (51) to (57), further comprising:

a sold money amount calculating means for calculating a sold amount of money obtained by the photographic processing of the order contents indicated in the order contents information inputted by the inputting means; and a cash register for settling the sales account on the basis of the sold amount of money calculated by the sold money amount calculating means.

With the invention described in Item (58), since the sales account can be settled simultaneously with the order receipt, there is no problem that the sales account can not be reckoned due to the reason that the orderer does not come to take the photographic print regardless of the order for the photographic processing.

(59) A photographic product delivering system, comprising:

a memory means for memorizing information regarding an undelivered photographic product which has been finished and has not yet delivered in correlation with the name and the contact place of an orderer;

a card reading means for reading a card ID information from the card owned by the orderer;

a transmitting receiving means for transmitting the card ID information to a card center so as to transmit the name and the contact place of the owner of the card and for receiving the name and the contact place of the owner of the card from the card center; and an undelivered photographic product indicating means for reading information regarding an undelivered photographic product corresponding to the name and the contact place of the owner of the card received by the transmitting receiving means from the memory means and for indicating the information regarding the undelivered photographic product.

(60) A photographic product delivering system, comprising:

a memory means for memorizing information regarding an undelivered photographic product which has been finished and has not yet delivered in correlation with a card type and card ID information of a card owned by an orderer;

a card reading means for reading the card type and the card ID information from the card owned by the orderer;

a transmitting receiving means for transmitting the card ID information to a card center corresponding to the card type read by the card reading means so as to transmit the name and the contact place of the owner of the card and for receiving the name and the contact place of the owner of the card from the card center; and an undelivered photographic product indicating means for reading information regarding an undelivered photographic product corresponding to the name and the contact place of the owner of the card received by the transmitting receiving means from the memory means and for indicating the information regarding the undelivered photographic product.

(61) The photographic product delivering system described in Item (59) or (60), further comprising:

an inputting means for inputting information regarding a newly finished photographic product in correlation with the name and the contact place of the orderer and for making the memory means to memorize it as an undelivered photographic product.

(62) The photographic product delivering system described in either one of Items (59) to (61), further comprising:

a delivery inputting means for inputting the matter that the photographic product indicated by the undelivered photographic product indicating means has been delivered, wherein the information regarding the undelivered photographic product memorized by the memory means is changed by the input by the inputting means.

With the invention described in Items (59) to (62), since the photographic product is indicated in correlation with the name and the contact place of the owner of the card, a photographic product owned by the other person having the same name or a photographic product owned by a person having the same contact place, for example, by persons living in a bachelor dormitory having the same telephone number is not indicated and only the photographic product ordered by the present person is indicated, only the photographic ordered by the present person is delivered to the present person. Further, the orderer can obtain the photographic product from a photo shop or a photophinisher only by indicating the credit card carried the orderer at the usual going-out time without carrying an exchange ticket.

(63) A photographic product delivering system, comprising:

a memory means for memorizing information regarding an undelivered photographic product which has been finished and has not yet delivered in correlation with the card ID information of the card owned by an orderer;

a card reading means for reading the card ID information from the card owned by the orderer of the photographic processing; and an undelivered photographic product indicating means for reading information regarding an undelivered photographic product corresponding to the card ID information read by the card reading means from the memory means and for indicating the information regarding the undelivered photographic product.

(64) The photographic product delivering system described in Item (63), further comprising:

an inputting means for inputting information regarding a newly finished photographic product in correlation with the card ID information of the card owned by the orderer and for making the memory means to memorize it as an undelivered photographic product.

(65) The photographic product delivering system described in Item (63) or (64), further comprising:

a delivery inputting means for inputting the matter that the photographic product indicated by the undelivered photographic product indicating means has been delivered, wherein the information regarding the undelivered photographic product memorized by the memory means is changed by the input by the inputting means.

With the invention described in Items (63) to (65), since the photographic product is indicated in correlation with the card ID information of the card owned by a person coming to take the photographic product, photographic products owned by the other persons are not indicated and only the photographic product ordered by the present person is indicated, only the photographic ordered by the present person is delivered to the present person. Further, the orderer can obtain the photographic product from a photo shop or a photophinisher only by indicating the credit card carried the orderer at the usual going-out time without carrying an exchange ticket.

(66) A photographic product delivering system, comprising:

a memory means for memorizing information regarding an undelivered photographic product which has been finished and has not yet delivered in correlation with the card type and the card ID information of the card owned by an orderer;

a card reading means for reading the card type and the card ID information from the card owned by the orderer of the photographic processing; and an undelivered photographic product indicating means for reading information regarding an undelivered photographic product corresponding to the card type and the card ID information read by the card reading means from the memory means and for indicating the information regarding the undelivered photographic product.

(67) The photographic product delivering system described in Item (66), further comprising:

an inputting means for inputting information regarding a newly finished photographic product in correlation with the card type and the card ID information of the card owned by the orderer and for making the memory means to memorize it as an undelivered photographic product.

(68) The photographic product delivering system described in Item (66) or (67), further comprising:

a delivery inputting means for inputting the matter that the photographic product indicated by the undelivered photographic product indicating means has been delivered, wherein the information regarding the undelivered photographic product memorized by the memory means is changed by the input by the inputting means.

With the invention described in Items (66) to (68), since the photographic product is indicated in correlation with the card type and the card ID information of the card owned by a person coming to take the photographic product for plural card types, photographic products owned by the other persons are not indicated and only the photographic product ordered by the present person is indicated, only the photographic ordered by the present person is delivered to the present person. Further, the orderer can obtain the photographic product from a photo shop or a photophinisher only by indicating the credit card carried the orderer at the usual going-out time without carrying an exchange ticket.

(69) A photographic product delivering system, comprising:

an accommodating means for accommodating an undelivered photographic product which has been finished and has not yet delivered such that the undelivered photographic product can be taken out for each of the name and the contact place of the orderer;

a credit card reading means for reading a card type and a card number from the credit card owned by the orderer for the photographic processing;

a transmitting receiving means for transmitting the card number to a credit card center corresponding to the card type of the credit card so as to transmit the name and the contact place of the owner of the credit card and for receiving the name and the contact place of the owner of the credit card from the credit card center; and a photographic product delivering means for taking out an undelivered photographic product corresponding to the name and the contact place of the owner of the credit card from the accommodating means on the basis of the information regarding the name and the contact place of the owner of the credit card received by the transmitting receiving means and for delivering the taken-out photographic product.

(70) A photographic product delivering system, comprising:

an accommodating means for accommodating an undelivered photographic product which has been finished and has not yet delivered such that the undelivered photographic product can be taken out for each of the name and the contact place of the orderer;

an inputting means for inputting a card type and a card number of the credit card owned by the orderer for the photographic processing;

a transmitting receiving means for transmitting the card number inputted by the inputting means to a credit card center corresponding to the card type of the credit card inputted by the inputting means so that the credit card center transmits the name and the contact place of the owner of the credit card and for receiving the name and the contact place of the owner of the credit card from the credit card center; and a photographic product delivering means for taking out an undelivered photographic product corresponding to the name and the contact place of the owner of the credit card from the accommodating means on the basis of the name and the contact place of the owner of the credit card received by the transmitting receiving means and for delivering the taken-out photographic product.

With the invention described in Items (69) and (70), since the photographic product is delivered in correspondence with the name and the contact place of the owner of the credit card, a photographic product owned by the other person having the same name or a photographic product owned by a person having the same contact place, for example, by persons living in a bachelor dormitory having the same telephone number is not delivered and only the photographic product ordered by the present person is indicated, only the photographic product ordered by the present person is automatically delivered to the present person. Further, the orderer can obtain the photographic product from a photo shop or a photophinisher only by indicating the credit card carried the orderer at the usual going-out time without carrying an exchange ticket.

(71) A photographic product delivering system, comprising:

an accommodating means for accommodating an undelivered photographic product which has been-finished and has not yet delivered such that the undelivered photographic product can be taken in correspondence with the card type and the card number of the credit card owned by an orderer;

a credit card reading means for reading a card type and a card number from the credit card owned by the orderer for the photographic processing; and a photographic product delivering means for taking out an undelivered photographic product corresponding to the type and the card number read by the credit card reading means from the accommodating means and for delivering the taken-out photographic product.

(72) A photographic product delivering system, comprising:

an accommodating means for accommodating an undelivered photographic product which has been finished and has not yet delivered such that the undelivered photographic product can be taken in correspondence with the card type and the card number of the credit card owned by an orderer;

an inputting means for inputting a card type and a card number of the credit card owned by the orderer for the photographic processing; and a photographic product delivering means for taking out an undelivered photographic product corresponding to the type and the card number inputted by the inputting means from the accommodating means and for delivering the taken-out photographic product.

With the invention described in Items (71) and (72), since the photographic product is delivered in correspondence with the card type and the card number of the credit card owned by a person coming to take the photographic product, photographic products owned by the other persons are not delivered and only the photographic product ordered by the present person is automatically delivered, only the photographic ordered by the present person is delivered to the present person. Further, the orderer can obtain the photographic product from a photo shop or a photophinisher only by indicating the credit card carried the orderer at the usual going-out time without carrying an exchange ticket.

(73) A photographic processing system, comprising:

producing a photographic product on the basis of the image recording medium and the received order recording medium which are subjected to an order receiving process by the order receiving system described in either one of Items 11, 12, 41 to 43;

accommodating the produced photographic product in a delivery container on which the name and the contact place recorded in the received order recording medium are recorded; and transferring the delivery container accommodating the photographic product to a delivering means for delivering the photographic product to the orderer of the name and the contact place described on the delivery container.

With the invention described in Item 73, since the sales account has been already reckoned, it is not necessary to receive money from the orderer and the produced photographic product can be delivered to the orderer without delay. Further, by transferring the photographic product to the delivering means by which the photographic product is delivered to the name and the contact place described on the received order recording medium in which the name and the contact place of the owner of the credit card are recorded, the photographic product is not delivered to the other person having the same name or to a person having the same contact place, for example, a person living in a bachelor dormitory having the same telephone number and can be delivered to the present person of the orderer. Further, the orderer can receive the photographic product without going to a photo shop or a photophinisher.

(74) A photographic processing system having the photographic processing system described in either one of Items 1 to 5, comprising:

accommodating a produced photographic product in a delivery container on which the name and the contact place of an owner of a credit card are recorded; and transferring the delivery container accommodating the photographic product to a delivering means for delivering the photographic product to the orderer of the name and the contact place described on the delivery container.

With the invention described in Item 74, since the sales account has been already reckoned, it is not necessary to receive money from the orderer and the produced photographic product can be delivered to the orderer without delay. Further, by transferring the photographic product to the delivering means by which the photographic product is delivered to the name and the contact place described on the received order recording medium in which the name and the contact place of the owner of the credit card are recorded, the photographic product is not delivered to the other person having the same name or to a person having the same contact place, for example, a person living in a bachelor dormitory having the same telephone number and can be delivered to the present person of the orderer. Further, the orderer can receive the photographic product without going to a photo shop or a photophinisher.

(75) A photographic processing system having the photographic processing system described in either one of Items 9 or 10, wherein the orderer information recording medium is a delivery container in which a produced photographic product is accommodated, comprising:

accommodating the photographic product in the delivery container; and transferring the delivery container accommodating the photographic product to a delivering means for delivering the photographic product to the orderer of the name and the contact place described on the delivery container.

With the invention described in Item 75, since the sales account has been already reckoned, it is not necessary to receive money from the orderer and the produced photographic product can be delivered to the orderer without delay. Further, by transferring the photographic product to the delivering means by which the photographic product is delivered to the name and the contact place described on the received order recording medium in which the name and the contact place of the owner of the credit card are recorded, the photographic product is not delivered to the other person having the same name or to a person having the same contact place, for example, a person living in a bachelor dormitory having the same telephone number and can be delivered to the present person of the orderer. Further, the orderer can receive the photographic product without-going to a photo shop or a photophinisher.

(76) A photographic product delivering system, comprising:

an accommodating means for accommodating an undelivered photographic product which has been finished and has not yet delivered such that the undelivered photographic product can be taken out for each of the name and the contact place of the orderer;

a card reading means for reading a card ID information from the card owned by the orderer for the photographic processing;

a transmitting receiving means for transmitting the card ID information to a card center so as to transmit information regarding the name and the contact place of the owner of the card and for receiving the information regarding the name and the contact place of the owner of the credit card from the credit card center; and a photographic product delivering means for taking out a photographic product corresponding to the name and the contact place of the owner of the card received by the transmitting receiving means from the accommodating means and for delivering the taken-out photographic product.

(77) A photographic product delivering system, comprising:

an accommodating means for accommodating an undelivered photographic product which has been finished and has not yet delivered such that the undelivered photographic product can be taken out for each of the name and the contact place of the orderer;

an inputting means for inputting a card ID information from the card owned by the orderer for the photographic processing;

a transmitting receiving means for transmitting the card ID information to a card center so as to transmit information regarding the name and the contact place of the owner of the card and for receiving the information regarding the name and the contact place of the owner of the credit card from the credit card center; and a photographic product delivering means for taking out a photographic product corresponding to the name and the contact place of the owner of the card received by the transmitting receiving means from the accommodating means and for delivering the taken-out photographic product.

With the invention described in Items (76) and (77), since the photographic product is delivered in correspondence with the name and the contact place of the owner of the card, a photographic product owned by the other person having the same name or a photographic product owned by a person having the same contact place, for example, by persons living in a bachelor dormitory having the same telephone number is not delivered and only the photographic product ordered by the present person is indicated, only the photographic product ordered by the present person is automatically delivered to the present person. Further, the orderer can obtain the photographic product from a photo shop or a photophinisher only by indicating the credit card carried the orderer at the usual going-out time without carrying an exchange ticket.

(78) A photographic product delivering system, comprising:

an accommodating means for accommodating an undelivered photographic product which has been finished and has not yet delivered such that the undelivered photographic product can be taken out for each of the name and the contact place of the orderer;

a card reading means for reading a card type and a card ID information from the card owned by the orderer for the photographic processing;

a transmitting receiving means for transmitting the card ID information to a card center corresponding to the card type read by the card reading means so as to transmit information regarding the name and the contact place of the owner of the card and for receiving the information regarding the name and the contact place of the owner of the card from the card center; and a photographic product delivering means for taking out a photographic product corresponding to the name and the contact place of the owner of the card received by the transmitting receiving means from the accommodating means and for delivering the taken-out photographic product.

(79) A photographic product delivering system, comprising:

an accommodating means for accommodating an undelivered photographic product which has been finished and has not yet delivered such that the undelivered photographic product can be taken out for each of the name and the contact place of the orderer;

an inputting means for inputting a card type and a card ID information from the card owned by the orderer for the photographic processing;

a transmitting receiving means for transmitting the card ID information to a card center corresponding to the card type inputted by the inputting means so as to transmit information regarding the name and the contact place of the owner of the card and for receiving the information regarding the name and the contact place of the owner of the card from the card center; and a photographic product delivering means for taking out a photographic product corresponding to the name and the contact place of the owner of the card received by the transmitting receiving means from the accommodating means and for delivering the taken-out photographic product.

With the invention described in Items (78) and (79), since the photographic product is delivered in correspondence with the name and the contact place of the owner of the card for plural card types, a photographic product owned by the other person having the same name or a photographic product owned by a person having the same contact place, for example, by persons living in a bachelor dormitory having the same telephone number is not delivered and only the photographic product ordered by the present person is indicated, only the photographic product ordered by the present person is automatically delivered to the present person. Further, the orderer can obtain the photographic product from a photo shop or a photophinisher only by indicating the credit card carried the orderer at the usual going-out time without carrying an exchange ticket.

(80) A photographic product delivering system, comprising:

an accommodating means for accommodating an undelivered photographic product which has been finished and has not yet delivered such that the undelivered photographic product can be taken out in correspondence with the card ID information of the card owned by an orderer;

a card reading means for reading a card ID information from the card owned by the orderer for the photographic processing; and a photographic product delivering means for taking out a photographic product corresponding to the card ID information read by the card reading means from the accommodating means and for delivering the taken-out photographic product.

(81) A photographic product delivering system, comprising:

an accommodating means for accommodating an undelivered photographic product which has been finished and has not yet delivered such that the undelivered photographic product can be taken out in correspondence with the card ID information of the card owned by an orderer;

an inputting means for inputting a card ID information of the card owned by the orderer for the photographic processing; and a photographic product delivering means for taking out a photographic product corresponding to the card ID information inputted by the inputting means from the accommodating means and for delivering the taken-out photographic product.

With the invention described in Items (80) and (81), since the photographic product is delivered in correspondence with the card ID information of the card owned by a person coming to take the photographic product, photographic products owned by the other persons are not delivered and only the photographic product ordered by the present person of the orderer is delivered, only the photographic ordered by the present person is delivered to the present person. Further, the orderer can obtain the photographic product from a photo shop or a photophinisher only by indicating the credit card carried the orderer at the usual going-out time without carrying an exchange ticket.

(82) A photographic product delivering system, comprising:

an accommodating means for accommodating an undelivered photographic product which has been finished and has not yet delivered such that the undelivered photographic product can be taken out in correspondence with the card type and the card ID information of the card owned by an orderer;

a card reading means for reading a card type and a card ID information from the card owned by the orderer for the photographic processing; and a photographic product delivering means for taking out a photographic product corresponding to the card type and the card ID information read by the card reading means from the accommodating means and for delivering the taken-out photographic product.

(83) A photographic product delivering system, comprising:

an accommodating means for accommodating an undelivered photographic product which has been finished and has not yet delivered such that the undelivered photographic product can be taken out in correspondence with the card type and the card ID information of the card owned by an orderer;

an inputting means for inputting a card type and a card ID information of the card owned by the orderer for the photographic processing; and a photographic product delivering means for taking out a photographic product corresponding to the card type and the card ID information inputted by the inputting means from the accommodating means and for delivering the taken-out photographic product.

With the invention described in Items (82) and (83), since the photographic product is delivered in correspondence with the card ID information of the card owned by a person coming to take the photographic product for plural card types, photographic products owned by the other persons are not delivered and only the photographic product ordered by the present person of the orderer is delivered, only the photographic ordered by the present person is delivered to the present person. Further, the orderer can obtain the photographic-product from a photo shop or a photophinisher only by indicating the credit card carried the orderer at the usual going-out time without carrying an exchange ticket.

Explanation for Terminology

In the present invention, "information regarding—" is a conception including not only "information—itself" but also including "information capable of introducing—itself", accordingly, "information regarding—" may be "information—itself", also "information regarding—" may be "information capable of introducing—itself". For example, the order contents information regarding the order contents for the photographing processing includes the information of the order contents itself for the photographing processing, but also includes information capable of introducing the information of the order contents itself for the photographic processing. As the information capable of introducing the information of the order contents itself for the photographic processing, a photographic processing identification number may be listed up. For example, a photographic processing identification number is provided in advance for each of plural kinds of photographic processing, and an ordered photographic processing is specified by the photographic processing identification number.

An image recording medium is a medium in which an image is recorded. As such an image recording-medium, a medium in which an image is recorded as a visible image such as a developed photographic film and a printed product of a photographic print, a medium in which an image is recorded as a latent image such as an undeveloped photographic film, a media in which an image is recorded as digital image data (hereinafter, the media in which an image is recorded as digital image data is merely shortened as a media) and a media in which an image is recorded as analog image signals such as 8 mm video tape and SVHS video tape may be listed up.

Here, as the media stated above, CD (compact disk) in which digital image data are recorded, PC card which is standardized as Type II card by PCMCIA (Personal Commuter Memory Card International Association) and used as an image recording card for a digital electronic camera and in which digital image data are recorded, MO (Optic magnetic recording media in which digital image data are recorded, Zip in which digital image data are recorded, and DVD (Digital Video Disk) in which digital image data are recorded, are listed up.

Further, as the CD in which digital image data are recorded, DV-I (Digital Video Interface), Photo-CD, CD-ROM, Additionally-written type CD, CD-ROM XA are listed up.

Incidentally, the image recording medium and the received order recording medium which is correlated with the image recording medium may be the same recording medium or separated recording medium from each other. In the case of the separated recording medium, in order to make the image recording medium and the received order recording medium to correspond to each other, they may be provided with the same ID number or the same sign or the received order recording medium may has a bag in which the image recording medium is stored. Further, the other embodiment may be used.

The received order recording medium is a medium in which the information regarding the name and the contact place of the orderer and the order contents information are recorded. The media may be a ticket or a photographic product bag on which such sorts of information are written with characters. The media may be a medium in which such sorts of information are recorded as digital data. Further, the other embodiment may be used.

The orderer information recording medium is a medium in which the information regarding the name and the contact place of the orderer are recorded. The media may be a ticket or a photographic product bag on which such sorts of information are written with characters. The media may be a medium in which such sorts of information are recorded as digital data. Further, the other embodiment may be used.

The photographic product in the present invention is a product obtained by conducting the photographic processing of the order contents of the orderer to the image recording medium of the orderer. As such the photographic product, a print or a film which is a copy of an image recorded in an image recording medium, a print or a film which is obtained by subjecting an image recorded in the image recording medium to an image processing which includes an image modification and an image composition, and a media recording digital image data obtained by conducting an image processing to an image recorded in an image recording medium are listed up.

The photographic processing system is a system to conduct a process regarding a photography such as a process to use an image recording medium or transmitted digital image data as a document and to produce a photographic product from the document and a process to transmit digital image data.

The printer in the present invention is an output device which includes a host computer connected to a client computer and outputs a hard copy of digital image on the basis of the output digital image data. It may be preferable to output the hard copy of the digital image as a visible image. However, the hard copy may be outputted on a state of a latent image recorded in a photosensitive material without developing.

As the digital image data, output digital image data to output a hard copy and digital image data used as a document to obtain output digital image data by an image processing are listed up. Further, these digital image data may be digital image data obtained by reading a photographic film with a scanner, digital image data produced by a computer, digital image data obtained by photographing with an electronic camera, digital image data recorded in an image recording medium or digital image data in the other embodiments.

As the contact place of an orderer, a telephone number of an orderer, an address of an orderer, a telephone number of an office of an orderer, an address of an office of an orderer, and an E-mail address of an orderer are listed up.

The card in the present invention is a card for which a card center exists in order to memorize a card ID information of each card and information regarding a name and a contact place of an owner of the card in the correlated form. As the card, in addition to a credit card, a card of a photographic product handling dealing chain shop, a card of a department store and a card of a super market are listed up.

The image recording system in the present invention may consists of a single apparatus or plural apparatuses and is a system to obtain a sheet on which an image is recorded on the basis of the output digital image data. The image recorded on the sheet may be an image recorded as a visible image or an image recorded as a latent image such as a latent image recorded on a photosensitive material without developing.

The recording material in the present invention is a material on which an image is recorded by the image recording system of the present invention. As the material, a photosensitive material to which an image is recorded by exposure light, a transfer sheet on which a toner image is formed by an electrophotographic method, a recording sheet on which an image is recorded by the thermal transfer method or by the ink-jet method, a heat sensitive sheet on which an image is recorded by heat are listed up.

The card in the present invention is a card in which a card type and a card ID information are recorded. As the card, a shopping chain card, a credit card, a bank card, a license and a passport are listed up. Further, as the card in the present invention, a booklet such as a Japanese passport is included.

The proprietary right of a credit card belongs to the company issuing the credit card. Further, with regard to some kinds of cards, their proprietary rights belong to the corporation issuing the cards. However, needless to say, the concept of "occupation" is different from that of "possession" and is to carry a thing for itself. The owner of a card is a person to carry the card-and is not the company issuing the card or the corporation issuing the card.

The card center in the present invention is a center to memorize card ID information and a name and a contact place of the owner of the card in a correlated form with regard to the card type corresponding to the card center. Further, the credit card center is a center to memorize card ID information and a name and a contact place of the owner of the card in a correlated form with regard to the credit card of the card type corresponding to the card center. In addition, usually, the card center memorizes information regarding the limitation of credit and the balance of credit.

The sales account settlement in the credit card center is a settlement to remit a sold money amount transmitted. to the credit card center into the bank account of the transmitting side and to pull out the sold money amount transmitted to the credit card center (the money amount remitted to the bank account of the transmitting side) from the bank account of the owner of the card number.

The header information in the present invention is index information provided to digital image data. As the information included in the header information, characteristic information regarding the characteristic of digital image data and axially information accompanied to the digital image data are listed up.

The card ID information is information to identify the card from plural cards of the same type. There may be the case that the card is identified with a card number, the case that the card is identified with a sign, the case that the card is identified with an image ID, and so on.

DETAILED DESCRIPTION OF THE PREFERRED EMBODIMENT

Embodiment of the Invention

There will be shown examples of the invention as follows as an embodiment, but the invention is not limited to these embodiments. Though some terms in the embodiments have conclusive expression, these represent preferable examples of the invention, and they limit neither the meaning of terms nor the technical scope of the invention.

Embodiment 1

Figure 1:
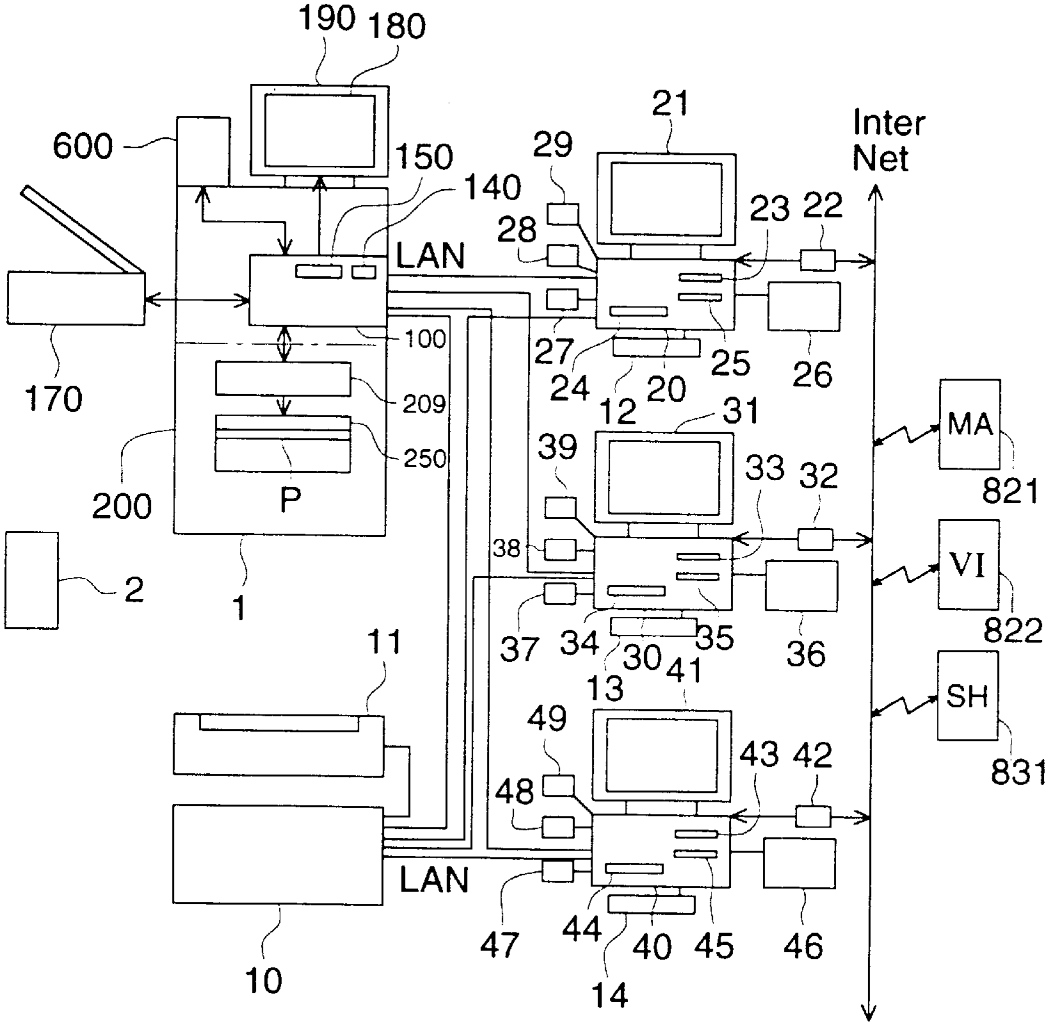
FIG. 1 is an outlined structural view of a photographic processing system in Embodiment 1.

A photographic processing system in the present embodiment will be explained as follows based on FIG. 1 which represents a schematic structure diagram of the photographic processing system in the present embodiment. Incidentally, a place such as a photographic store and a counter of a photofinishing laboratory where the photographic processing system of the present embodiment is installed is called a store briefly.

1. Schematic Structure of Photographic Processing System

The photographic processing system of the present embodiment is composed of client computers 20, 30 and 40 which generate output-use digital image data for outputting hard copies, printer processor 1 which includes host computer 100 connected to the client computers 20, 30 and 40 and outputs a hard copy of the digital image stated above, and film developing unit 2 which conducts photographic processing for undeveloped photographic films.

1-1 Schematic Structure on the Part of Client Computer

The client computers 20, 30 and 40 are connected to monitors 21, 31 and 41 which display information of order receiving processing, information of delivery, images of digital image data image-processed by the client computers 20, 30 and 40, status of image processing, and the status of driving external equipment connected to the client computers 20, 30 and 40. Further, on the client computers 20, 30 and 40, there are provided key boards for key input conducted through operation of an operator. Through these key boards, interactive processing is performed.

The system on the part of the client computers 20, 30 and 40 can function as an order receiving system for order receiving, and it can further function as a delivery system for delivery.

To the client computers 20, 30 and 40, there are connected floppy disk drives 23, 33 and 43 for reading information out of a floppy disk or for writing information in a floppy disk, CD drives 24, 34 and 44 for reading information out of a CD or for writing information in a CD, PC card drives 25, 35 and 45 for reading information out of a PC card or for writing information in a PC card, and MO drives 26, 36 and 46 for reading information out of MO or for writing information in MO. Through these media drive, it is possible to read information out of these media or to write information in these media.

The client computers 20, 30 and 40 are connected to modem 727 connected with telephone lines which are to be connected to an internet, credit card centers 821 and 822, and shopping chain center 831. The client computers 20, 30 and 40 are further connected to credit card readers 28, 38 and 48 which can read a type and a card number of the inserted credit card for various types of credit cards. The client computers 20, 30 and 40 are further connected to bar code readers 29, 39 and 49 each reading a type and a card number of a shopping chain card by reading a bar code recorded on each of various shopping chain cards and reading a bar code recorded on a slip. Owing to these, the client computer can access credit card centers 821 and 822 corresponding to credit card types read by credit card readers 28, 38 and 48 for repairing and obtaining information, and can access shopping chain center 831 corresponding to the credit card type read by bar code readers 29, 39 and 49 for repairing and obtaining information.

The client computers 20, 30 and 40 are further connected to slip issuing machine 27 which issues a slip on which information of order contents showing order contents for photographic processing and information of orderer identification for identifying an orderer are recorded and issues a photographic bag (representing an order receiving information recording medium and an orderer information recording medium).

The client computers 20, 30 and 40 are further connected with cash containing sections 12, 13 and 14 each containing cash by cash types, and the client computers control opening and closing of the cash containing sections. The client computers 20, 30 and 40 play a role of a cash register by controlling opening and closing of the cash containing sections 12, 13 and 14 depending on necessity of receiving or paying cash.

Figure 2:
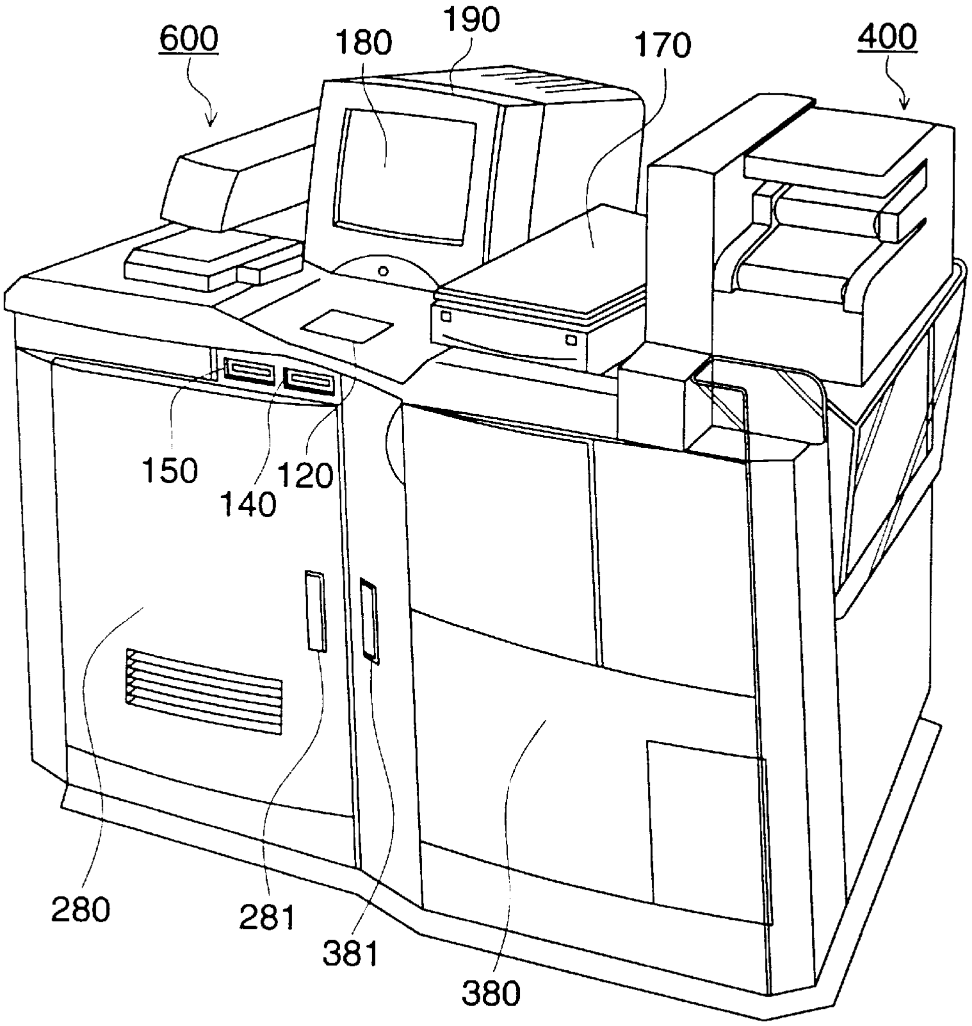
FIG. 2 is an outlined perspective view of a printer processor 1 of the photographic system in Embodiment 1.
Figure 3:
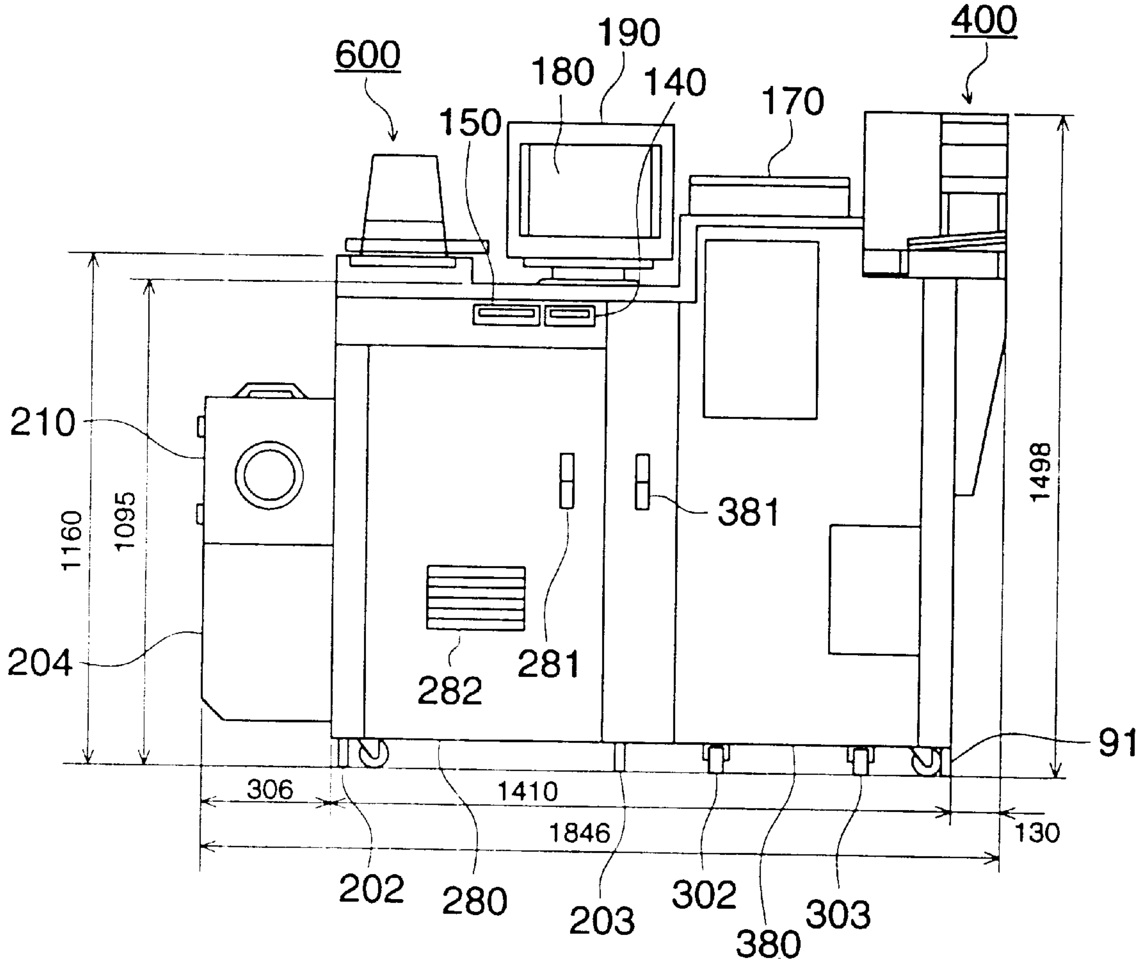
FIG. 3 is an outlined front view of a printer processor 1 on the photographic system in Embodiment 1.
Figure 4:
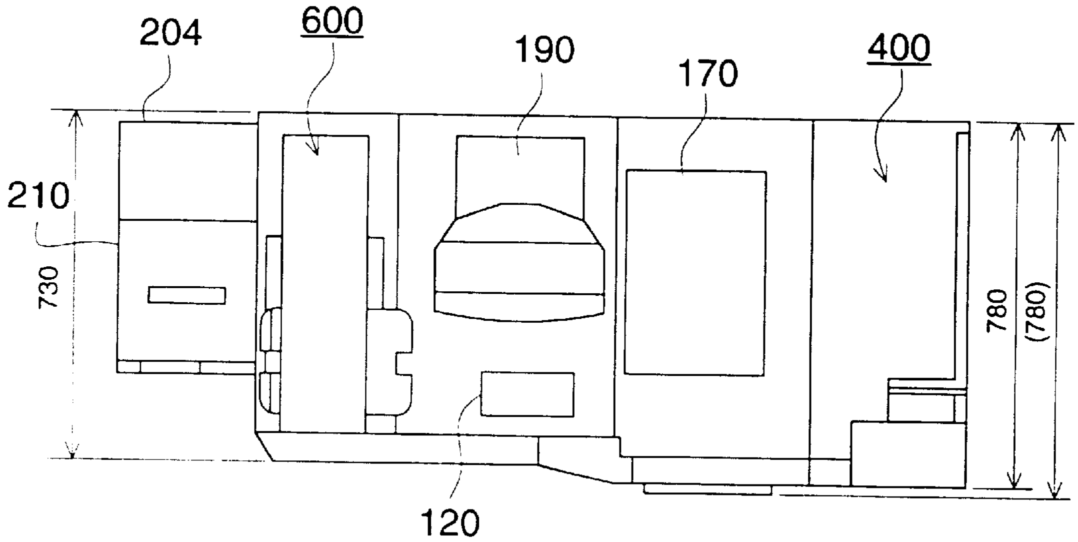
FIG. 4 is an outlined top view of a printer processor 1 of the photographic system in Embodiment 1.
Figure 5:
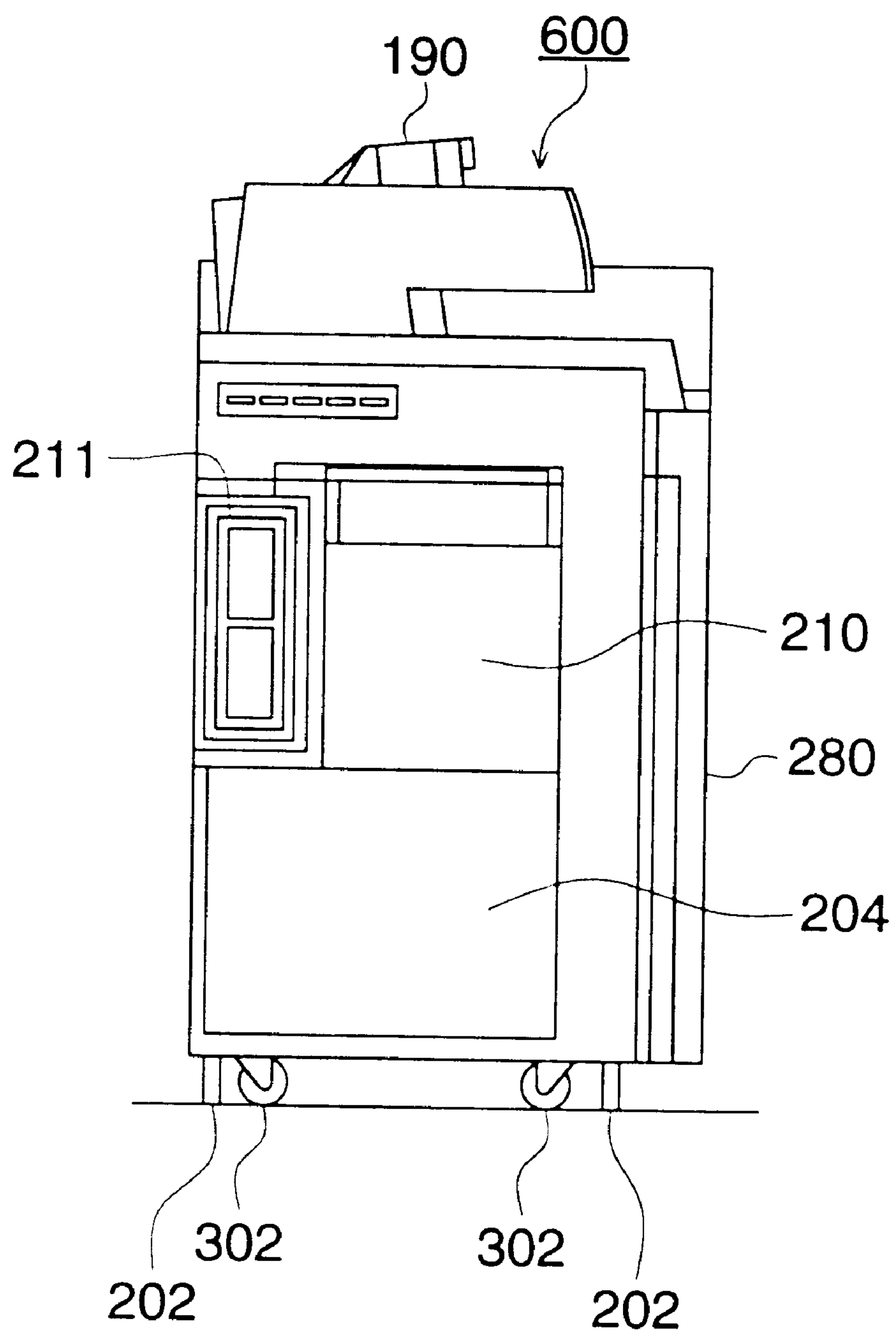
FIG. 5 is an outlined left side view of a printer processor 1 of the photographic system in Embodiment 1.
Figure 6:
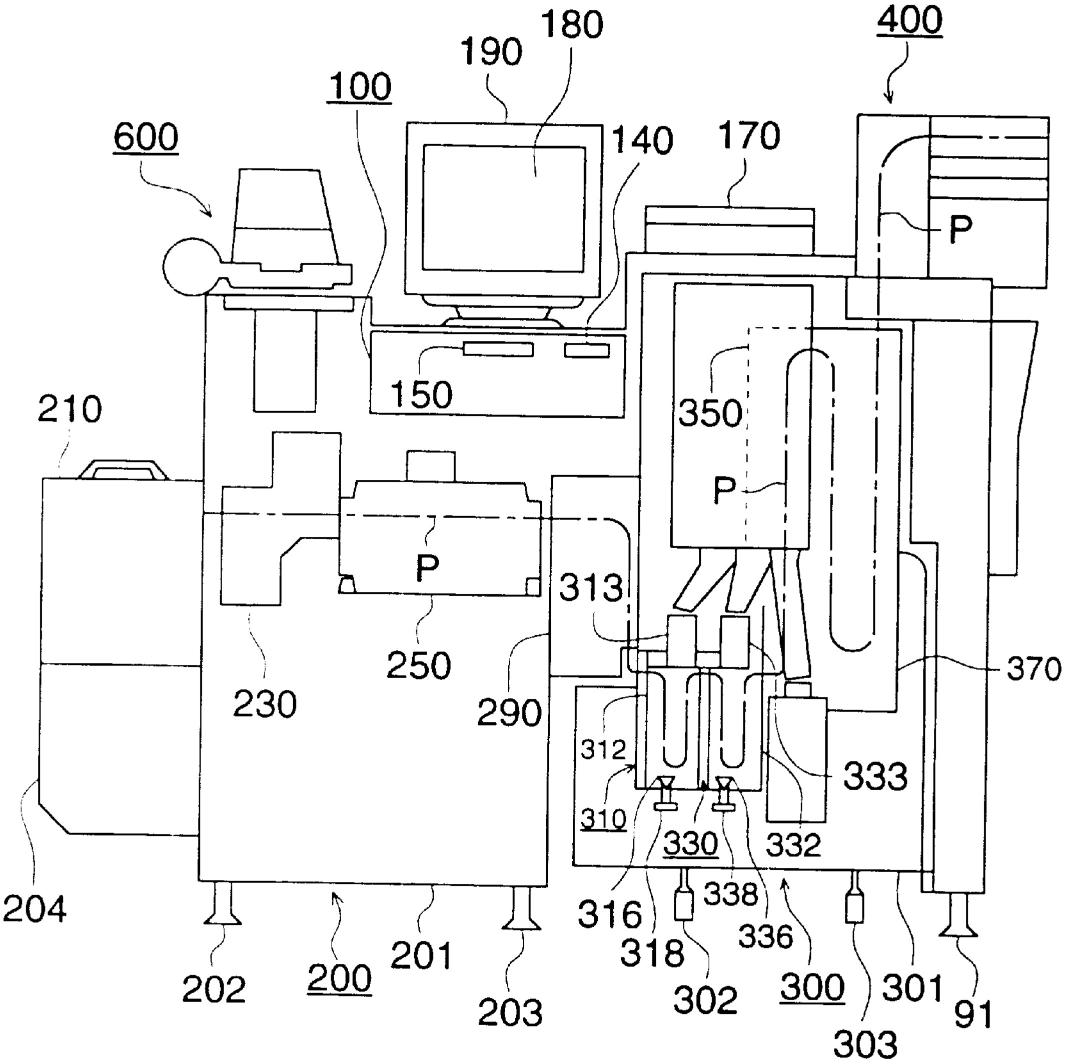
FIG. 6 is an outlined front sectional view of a printer processor 1 of the photographic system in Embodiment 1.

Printer processor 1 of the present embodiment is a printer corresponding to output-use digital image data having gradation data of 8-bit or more for each pixel and the number of pixels of a million pixels or more. For example, it is a printer processor capable of making a print on which a difference between the maximum density and the minimum density is 2.0 or more in terms of reflection density from output-use digital image data having gradation data of 12-bit for each pixel and the number of pixels of a million pixels—a hundred million pixels. Now, schematic structure of the printer processor 1 of the present embodiment will be explained as follows, referring to FIG. 1, FIG. 2 representing a schematic perspective view of the printer processor 1, FIG. 3 representing a schematic front view, FIG. 4 representing a schematic top view, FIG. 5 representing a schematic left side view and FIG. 6 representing a schematic front sectional view.

1-2 Schematic Structure of Printer Processor

Printer processor 1 of the present embodiment has therein host computer 100 which conducts overall control of the printer processor 1 and generates digital image data for recording an image to be transmitted to exposure unit 200, the exposure unit 200 which conducts exposure print-use light-sensitive material P based on the transmitted digital image data for recording an image, automatic processor 300 which processes print-use light-sensitive material P exposed to light by the exposure unit 200 and sorter 400 which sorts prints obtained through processing conducted by the automatic processor 300.

On the printer processor 1 of the present embodiment, there are provided film scanner 600, flat bed scanner 170, PC card reader 140 and CD (compact disk) drive 150, as a unit to be connected to the host computer 100 to input data of input digital image into the host computer 100. There are further provided monitor 190, touch panel 180 provided on the display surface of the monitor 190 and key board 120, as other units connected to the host computer 100.

The host computer 100 display on the monitor 190 a reproduction image of a hard copy of output-use digital image data or digital image data on the half way of image processing, the image processing status and the status of driving printer processor 1, and processes them in accordance with information inputted from touch panel 180 or key board 120.

The host computer 100 further conducts image processing to process input digital image data inputted from film scanner 600, flat bed scanner 170, PC card reader 140 and CD drive 150 into input-use digital image data to be transmitted to client computers 20, 30 and 40 or into output-use digital image data. In this case, the host computer controls the monitor 190 to display and controls the touch panel 180 and key board 120 to input so that information necessary as header information of the data stated above may be obtained. Incidentally, as header information necessary as input-use digital image data, there are given order information and size information, while, as header information necessary as image recording-use digital image data, there are given print quantity information, magazine selection information, longitudinal and lateral information, cutting length information and printing information.

The host computer 100 is connected to the client computers 20, 30 and 40, and conducts image processing from output-use digital image data read from the client computers 20, 30 and 40 and from output-use digital image data obtained through the image processing, and obtains image-recording-use digital image data including print quantity information, magazine selection information, longitudinal and lateral information, cutting length information and printing information to store them as header information.

Film scanner 600 reads a frame image recorded on a photographic film and sends input digital image data thus obtained to the host computer 100.

Flat bed scanner 170 reads an image recorded on a reflection document and sends input digital image data to the host computer 100.

PC card reader 140 reads input digital image data recorded on the PC card and sends them to the host computer 100.

CD drive 150 reads input digital image data recorded on CD, and sends them to the host computer 100.

Exposure unit 200 is connected to the host computer 100, and has therein exposure control section 209 which repeats a cycle of reading image-recording-use digital image data from the host computer 100, sending magazine selection information and cutting information to outgoing section 230, sending printing information to conveyance section 290, generating image recording signals for exposure section 250 of the exposure unit 200, and sending them to the exposure section 250, for the number of times corresponding to the print quantity, magazine stand 204 on which magazine 210 containing a roll of print-us e light-sensitive material P is set, outgoing section 230 which sends out print-use light-sensitive material P from magazine 210 selected based on the transmitted magazine selection information, cuts the sheet to the cutting length based on the transmitted cutting length and sends to exposure section 250, the exposure section 250 which exposes sheet-shaped print-use light-sensitive material P transmitted from the outgoing section 230 based on the transmitted image recording signals, and conveyance section 290 which conveys print-use light-sensitive material P to automatic processor 300, while printing, based on the transmitted printing information, on the print-use light-sensitive material P exposed to light by exposure section 250.

Exposure control section 209 of the exposure unit 200 reads image-recording-use digital image data out of the host computer 100 in time to the exposure timing, and conducts overall control of the exposure unit 200.

Automatic processor 300 conducts processing for print-use light-sensitive material P exposed to light by the exposure unit 200 while conveying it along the prescribed conveyance path at a certain conveyance speed. The automatic processor 300 has therein color developing unit 310 which conducts color development processing on print-use light-sensitive material P sent from the exposure unit 200, bleach-fixing unit 330 which conducts bleach-fixing processing on the print-use light-sensitive material P which has been subjected to color development processing by the color developing unit 310, stabilizing section 350 which stabilizes the print-use light-sensitive material P which has been subjected to bleach-fixing by the bleach-fixing unit 330, and drying section 370 which dries the print-use light-sensitive material P which has been stabilized by the stabilizing section 350. Then, the print thus obtained after being dried by the drying section 370 is sent to sorter 400.

The sorter 400 sorts the print which represents a hard copy of output-use digital image data, based on order information of the header information annexed to output-use digital image data corresponding to the transported print.

2. Processing in and Between Printer Processor and Client Computer

Figure 7:
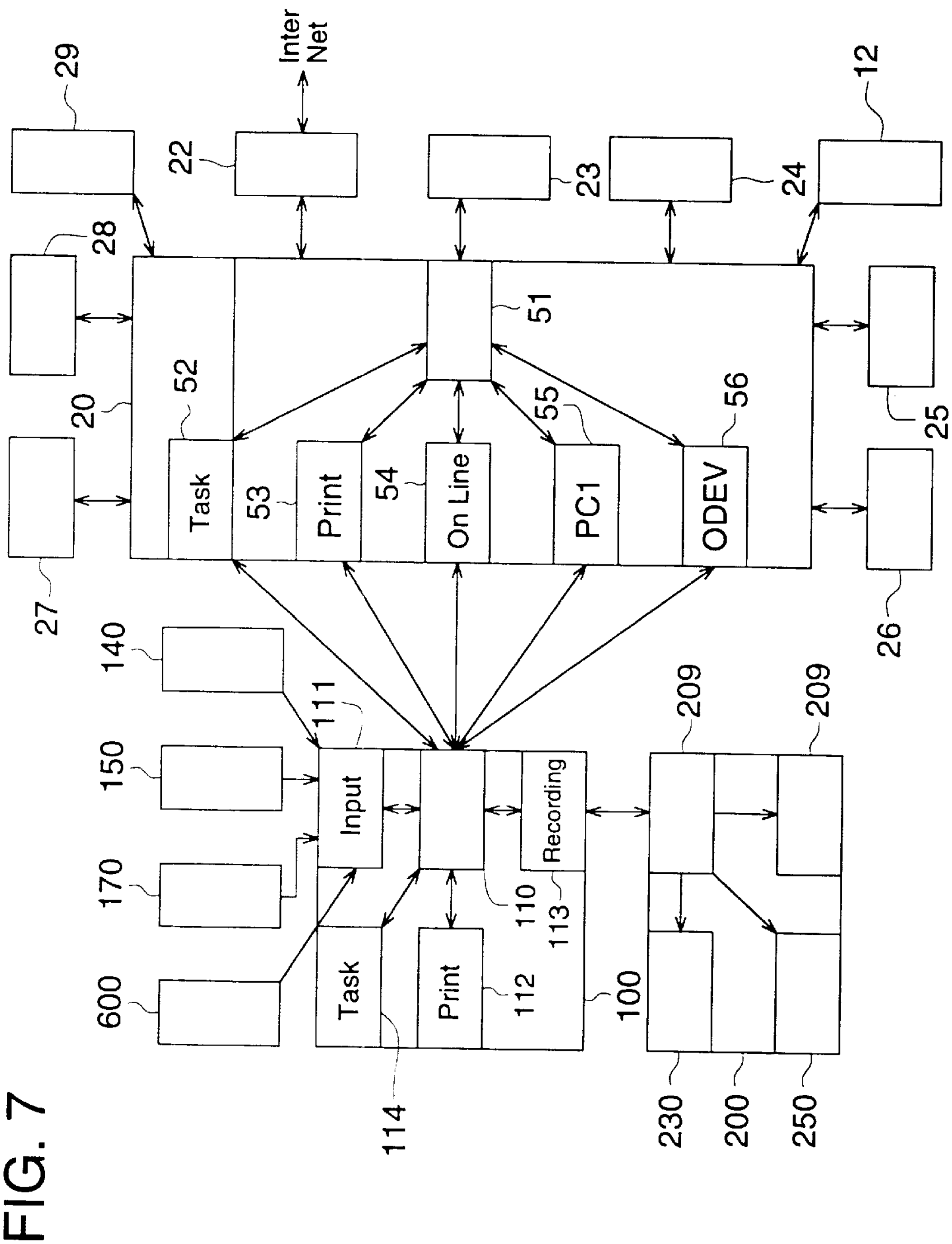
FIG. 7 is an outlined view regarding processing relative to each other or inside a printer processor and a client computer of the photographic system in Embodiment 1.

Next, based on FIG. 7 representing a conceptual diagram relating to the processing in and between the printer processor in the photographic processing system of the embodiment and a client computer, there will be explained the processing in and between host computer 100 of printer processor 1 in the photographic processing system of the present embodiment and client computers 20, 30 and 40, using an example of the host computer 100 and the client computer 20. The client computers 30 and 40 also act in the same way as the client computer 20.

2-1 Order Receiving Processing

First of all, when a client who is an orderer visits a store where the photographic processing system of the present embodiment is installed, an operator of the client computer 20 deals with the client. The operator of the client computer 20 asks the client about contents of the order, receives an image recording media representing a photographic document in trust from the client, and inputs the contents of the order of photographic processing of the client through the key board provided on the client computer 20.

2-1-1. Order Contents Information to be Inputted

Order contents information concerning the order contents of photographic processing to be inputted are as follows.

First information is a type of an image recording medium representing a photographic document (for example, various kinds such as an undeveloped photographic film, developed photographic film, reflection type documents such as a photographic print and a printed matter, a floppy disk, CD, PC card and MO).

Second information is one concerning whether to process all image frames recorded on an image recording medium, for example, like the processing for the first-time print of an undeveloped photographic film, or to process only specific image frames among image frames recorded on an image recording medium, for example, like the processing for the reorder print from a developed photographic film.

Third information includes the number or the estimated number of image frames recorded on an image recording medium when processing all image frames recorded on the image recording medium, and information to specify image frames to be processed from an image recording medium (for example, frame numbers) or the number of frames to be processed, when processing only specific image frames among image frames recorded on an image recording medium.

Fourth information includes types of objects desired (for example, types such as development of a photographic film, making of a photographic print (including an index print and a seal print in addition to ordinary photographic prints), writing in a floppy disk, writing in CD such as Photo-CD and writing in MO).

Fifth information includes contents of image processing desired (types such as a simple copying processing, composite processing and image maneuver processing).

2-1-2. Calculation of the Amount Sold

After these contents of photographic processing order are inputted, client computer 20 saves them as order contents information of header information, then starts a program for calculating the amount sold, and calculates the amount sold from the inputted order contents for photographic processing to save it in sales information of the header information. Further, the client computer starts a program for calculating the scheduled time of completion to calculate it from the inputted order contents for photographic processing, and save it in the information of scheduled time for completion in header information. Then, the client computer 20 makes monitors 21, 31 and 41 to display the calculated amount sold.

2-1-3. Order receiving in the case where an image recording medium represents a medium.

When an image recording medium is a medium on which digital image data representing a document for making a photographic product are recorded, an operator receives this medium and inserts it in the drive (a drive selected from floppy disk drive 23, CD drive 24, PC card drive 25 and MO drive 26) corresponding to the type of that medium.

Then, the drive in which the medium has been inserted reads the inserted medium to confirm whether digital image data representing a document for making a photographic product are recorded on the medium or not.

When it is confirmed that digital image data representing a document for making a photographic product are recorded on the medium, this is transmitted to client computer 20. When the client computer 20 receives the confirmation that digital image data representing a document for making a photographic product are recorded on the medium, the client computer makes the monitor 21 to display this. Then, the sequence advances to the step which follows the order receiving step. An operator of the client computer 20 advances to the step following the order receiving step after observing a display on the monitor 21.

However, when it is confirmed that digital image data representing a document for making a photographic product are not recorded on the medium, this is transmitted to client computer 20. After receiving information of the confirmation that digital image data representing a document for making a photographic product are not recorded, the client computer 20 makes monitor 21 to display the information showing that digital image data representing a document for making a photographic product are not recorded, and does not conduct order receiving processing. Then, an operator of the client computer 20 rejects an order.

2-1-4. Requesting Deposit of Cards

Then, the operator of the client computer 20 requests a customer to deposit a medium on-which information of a card such as a credit card, a shopping chain card, a credit card or a shopping chain card is recorded. Incidentally, when the credit card deposited in that store is a card for which the store is not a contractor, the customer is requested to deposit a credit cart or a shopping chain card for which the store is a contractor.

2-1-5. When a Credit Card is Deposited

When a credit card is deposited, the operator inserts the deposited card into credit card readers 28, 38 and 48. The credit card readers 28, 38 and 48 read the inserted credit card and read the type and the card number of the credit card, and sends the type and the card number of the credit card thus read to client computer 20 which temporary saves the transmitted type and card number of the credit card.

Then, the client computer 20 makes server 10 to transmit the consecutive receipt numbers showing the order of receipt, and saves the received receipt number, order contents information, sales information (the amount sold calculated through the amount sold calculating program) and card information (type and card number of a credit card) as header information. Then, the client computer 20 makes the server 10 to store the header information. Incidentally, on and after this moment, header information in the server 10 is changed each time the header information is changed by the client computer 20.

Then, the client computer 20 transmits the amount sold calculated by the amount sold calculating program and the card number to credit card centers 821 and 822 corresponding to the types of the credit card read, through modem 22 (for example, transmits to credit card center 821 of "MA" Company in the case of a credit card of "MA" Company, while transmits to credit card center 822 of "VI" Company in the case of a credit card of "VI" Company) to make the credit card center to conduct selling procedures, and to transmit information showing whether the selling procedures have been conducted or not and information of a liaison section including the zip code, an address and a telephone number and a name of an owner of the credit card corresponding to the card number of the transmitted credit card.

Then, the client computer 20 receives information showing whether the selling procedures have been conducted or not and information of a liaison section including the zip code, an address, a telephone number and a name of an owner of the credit card corresponding to the card number of the transmitted credit card, from the credit card centers 821 and 822 through modem 22.

Then, the client computer 20 establishes and registers information of a liaison section including the zip code, an address, a telephone number and a name of an owner of the received credit card and the receipt number as order information, then establishes and registers a part of order contents information, a telephone number, a name and the receipt number as printing information, and establishes and registers information showing whether the selling procedures have been conducted or not in sales information of the header information.

When selling procedures have not been conducted, cash containing sections 12 is opened, and order receiving which does not employ card information explained in Item 2-1-9 stated later is conducted.

When selling procedures have been conducted, the client computer 20 makes slip issuing machine 27 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which also serves as a memorandum for delivery of the finished photographic products. The photographic bag serves as a memo for the store, and it can be utilized as a container to contain an image recording medium and a photographic product prepared from the image recording medium.

2-1-6. When a Shopping Chain Card is Deposited

When a shopping chain card is deposited, the shopping chain card thus deposited is read by bar code readers 29, 39 and 49 so that the card number (representing card ID information which sometimes includes characters and symbols in addition to numerals) of the shopping chain card is read. Then, the card number of the shopping chain card thus read is sent to client computer 20. The client computer 20 saves temporarily the transmitted card number of the shopping chain card.

Then, the client computer 20 makes server 10 to transmit the consecutive receipt numbers showing the sequence of order receiving, and saves the received receipt numbers, order contents information, sales information (the amount sold calculated by the amount sold calculating program) and card information (card number of the shopping chain card), as header information. Then, the client computer 20 makes the server 10 to store the header information. Incidentally, on and after this moment, header information in the server 10 is changed each time the header information is changed by the client computer 20.

Then, the client computer 20 transmits the amount sold calculated by the amount sold calculating program and the card number to shopping chain center 831 through modem 22 so that the amount sold may be stored, and makes the sales record in the past and information of a liaison section composed of a zip code, an address, a telephone number and a name of the owner of the shopping chain card corresponding to the card number of the transmitted shopping chain card to be transmitted.

Then, it receives from the shopping chain center 831 the sales record in the past and information of a liaison section composed of a zip code, an address, a telephone number and a name of the owner of the shopping chain card corresponding to the card number of the transmitted shopping chain card, through modem 22.

Then, the client computer 20 makes monitors 21, 31 and 41 to display the received sales record in the past. Due to this, an operator of the client computer 20 can take actions corresponding to the sales record in the past. Further, the client computer 20 establishes and registers information of a liaison section composed of a zip code, an address, a telephone number and a name of the owner of the received shopping chain card and the card number, as order information. Further, the client computer 20 establishes and registers a part of order contents information, a telephone number, a name and the receipt number as printing information.

Then, when the operator of the client computer 20 receives cash exceeding the amount sold displayed on monitor 21, the operator inputs the received cash. After the received cash is inputted, the client computer 20 opens cash containing section 12 so that settlement in cash may be made. Then, the operator of the client computer 20 closes the cash containing section 12 after the settlement in cash is completed.

When the cash containing sections 12 is closed, the client computer 20 makes slip issuing machine 27 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag, presuming that the selling procedures have been conducted.

The slip thus issued is a receipt to be given to the customer which also serves as a memorandum for delivery of the finished photographic products. The photographic bag serves as a memo for the store, and it can be utilized as a container to contain an image recording medium and a photographic product prepared from the image recording medium.

Though the explanation stated above is made under the assumption that the store belongs to only one shopping chain, the store may also belong to plural shopping chains, and when the store belongs to plural shopping chains, there is required processing corresponding to the type of the shopping chain card which has been explained in the case of a credit card.

2-1-7. When Medium on Which Credit Card Information is Recorded is Deposited

When a medium on which credit card information is recorded is deposited, an operator inserts the deposited medium on which credit card information is recorded into the drive corresponding to the type of the medium (one drive selected from the group of floppy disk drive 23, CD drive 24, PC card drive 25 and MO drive 26).

Then, the drive in which the medium has been inserted reads the inserted medium to confirm whether the type of the credit card and the card number are recorded on the medium or not.

When it is confirmed that the type of the credit card and the card number are recorded on the medium, the type of the credit card and the card number are read and are transmitted to client computer 20. The client computer 20 saves therein temporarily the transmitted type of the credit card and the card number.

Incidentally, when it is confirmed that the type of the credit card and the card number are not recorded on the medium, this is transmitted to client computer 20. The client computer 20 makes monitor 21 to display that the type of the credit card or the card number is not recorded, and enters the order receiving depending on no card information which will be explained in Item 2-1-9.

Then, the client computer 20 makes server 10 to transmit the consecutive receipt numbers showing the order of receipt, and saves the received receipt number, order contents information, sales information (the amount sold calculated through the amount sold calculating program) and card information (type and card number of a credit card) as header information. Then, the client computer 20 makes the server 10 to store the header information. Incidentally, on and after this moment, header information in the server 10 is changed each time the header information is changed by the client computer 20.

Then, the client computer 20 transmits the amount sold calculated by the amount sold calculating program and the card number to credit card centers 821 and 822 corresponding to-the types of the credit cart read, through modem 22 (for example, transmits to credit card center 821 of “MA” Company in the case of a credit card of “MA” Company, while transmits to credit card center 822 of "VI" Company in the case of a credit card of "VI" Company) to make the credit card center to conduct selling procedures, and makes information showing whether the selling procedures have been conducted or not and information of a liaison section including the zip code, an address and a telephone number and a name of an owner of the credit card corresponding to the card number of the transmitted credit card to be transmitted.

Then, the client computer 20 receives information showing whether the selling procedures have been conducted or not and information of a liaison section including the zip code, an address, a telephone number and a name of an owner of the credit card corresponding to the card number of the transmitted credit card, from the credit card centers 821 and 822 through modem 22.

Then, the client computer 20 establishes and registers information of a liaison section including the zip code, an address, a telephone number and a name of an owner of the received credit card and the type of the credit card as well as the card number as order information. The client computer establishes and registers a part of order contents information, a telephone number, a name and the receipt number as printing information.

Then, the client computer 20 saves information showing whether the selling procedures have been conducted or not in sales information of header information. When the selling procedures have not been conducted, the client computer opens cash containing section 12, and settles accounts in cash which will be stated later.

When selling procedures have been conducted, the client computer 20 makes slip issuing machine 27 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which also serves as a memorandum for delivery of the finished photographic products. The photographic bag serves as a memo for the store, and it can be utilized as a container to contain an image recording medium and a photographic product prepared from the image recording medium.

2-1-8. When a Medium on Which Shopping Chain Card Information is Recorded is Deposited When a medium on which shopping chain card information is recorded is deposited, the medium on which shopping chain card information is recorded is inserted in the drive corresponding to the type of the medium on which shopping chain card information is recorded (one drive selected from the group of floppy disk drive 23, CD drive 24, PC card drive 25 and MO drive 26).

Then, the drive in which the medium has been inserted reads the medium inserted, and confirms whether the card number of the shopping chain card is recorded on the medium or not.

When it is confirmed that the card number of the shopping chain card and digital image data representing a document for making a photographic product are recorded on the medium, the drive in which the medium has been inserted reads the medium inserted to read the card number (card ID information which sometimes includes characters and symbols in addition to the numeral) of the shopping chain card recorded on the medium, and transmits the card number thus read to client computer 20. The client computer 20 saves temporarily the transmitted card number of the shopping chain card.

When it is confirmed that the card number of the shopping chain card is not recorded on the medium, this is transmitted to client computer 20. The client computer 20 makes monitor 21 to display that the type of the credit card or the card number is not recorded, and enters the order receiving depending on no card information which will be explained in Item 2-1-9.

Then, the client computer 20 makes server 10 to transmit the consecutive receipt numbers showing the order of receipt, and saves the received receipt number, order contents information, sales information (the amount sold calculated through the amount sold calculating program) and the received card information (the card number of the shopping chain card) as header information. Then, the client computer 20 makes the server 10 to store the header information. Incidentally, on and after this moment, header information in the server 10 is changed each time the header information is changed by the client computer 20.

Then, the client computer 20 transmits the amount sold calculated by the amount sold calculating program and the card number to shopping chain center 831 through modem 22 to make the amount sold to be stored, and makes the sales record in the past and information of a liaison section including the zip code, an address and a telephone number and a name of an owner of the shopping chain card corresponding to the card number of the transmitted shopping chain card to be transmitted to be transmitted.

Then, the client computer 20 receives the sales record in the past and information of a liaison section including the zip code, an address, a telephone number and a name of an owner of the shopping chain card corresponding to the card number of the transmitted shopping chain card, from the shopping chain center 831 through modem 22.

Then, the client computer 20 makes monitors 21, 31 and 41 to display the received sales record in the past. Due to this, an operator of the client computer 20 can take actions corresponding to the sales record in the past. Further, the client computer 20 establishes and registers information of a liaison section including the zip code, an address, a telephone number and a name of an owner of the received shopping chain card and the card number as order information, and it further establishes and registers a part of order contents information, a telephone number, a name and the receipt number as printing information.

Then, when the operator of the client computer 20 receives cash exceeding the amount sold displayed on monitor 21, the operator inputs the received cash. After the received cash is inputted, the client computer 20 opens cash containing section 12 so that settlement in cash may be made. Then, the operator of the client computer 20 closes the cash containing section 12 after the accounts are settlement in cash. Then the cash containing section 12 is closed, the client computer 20 makes server 10 to transmit the consecutive receipt numbers showing the sequence of order receiving, and adds the received receipt number to header information to make the server 10 to store the header information.

The client computer 20 makes slip issuing machine 27 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which also serves as a memorandum for delivery of the finished photographic products. The photographic bag serves as a memo for the store, and it can be utilized as a container to contain an image-recording medium and a photographic product prepared from the image recording medium.

Though the explanation stated above is made under the assumption that the store belongs to only one shopping chain, the store may also belong to plural shopping chains, and when the store belongs to plural shopping chains, there is required processing corresponding to the type of the shopping chain card which has been explained in the case of a credit card.

2-1-9. Order Receiving Depending on no Card Information (In the Case of None of the Above)

When neither credit card nor shopping chain card is deposited, and neither a medium on which credit card information is recorded nor a medium on which shopping chain card information is recorded is deposited, an operator of client computer 20 hears from a customer its phone number, address and name and inputs them through a key board. Then, the client computer 20 establishes and registers where to make contact containing the customer's address and phone number and the customer's name as order information.

Then, client computer 20 makes server 10 to transmit the consecutive receipt numbers showing the sequence of order receiving, and saves the received receipt numbers and order contents information, sales information (the amount sold calculated by the amount sold calculating program) and inputted order information (where to make contact containing a phone number or an address), as header information. Then, client computer 20 establishes and registers a part of the order contents information, the phone number and the name as printing information. Then, client computer 20 makes server 10 to store these header information. Incidentally, on and after this moment, header information in the server 10 is changed each time the header information is changed by the client computer 20.

Then, when the operator of the client computer 20 receives cash exceeding the amount sold displayed on monitors 21, 31 and 41, the operator inputs the received cash. After the received cash is inputted, the client computer 20 opens cash containing section 12 so that settlement in cash may be made. Then, the operator of the client computer 20 closes the cash containing section 12 after the settlement in cash is completed. When the cash containing sections 12 is closed, the client computer 20 updates sales information, judging that the selling procedures have been completed.

Then, the client computer 20 makes slip issuing machine 27 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which also serves as a memorandum for delivery of the finished photographic products. The photographic bag serves as a memo for the store, and it can be utilized as a container to contain an image recording medium and a photographic product prepared from the image recording medium.

2-2. Order Receiving Processing Through Telephone Line

Incidentally, since client computer 20 of the photographic processing system in the present embodiment is connected to the telephone line through modem 22, an order for photographic processing is sometimes received directly by way of the telephone line through modem 22.

In this case, digital image data representing a document for photographic products, order contents information relating to the order contents for photographic processing, where to make contact of an orderer (an electronic mail address and a name) and a type and a number of the credit card owned by an orderer are transmitted first from the orderer in accordance with the prescribed standards, and then are received by client computer 20 through modem 22. The client computer 20 saves temporarily all of these information.

Then, client computer 20 makes server 10 to transmit the consecutive receipt numbers showing the sequence of order receiving, and saves the received receipt numbers, order contents information and card information (an electronic mail address and a name) as header information. Then, client computer 20 makes sever 10 to store the header information. Incidentally, on and after this moment, header information in the server 10 is changed each time the header information is changed by the client computer 20.

Then, the client computer 20 calculates the amount sold for photographic processing of order contents shown by the received order contents information by the use of the amount sold calculating program, and saves them as sales information (the amount sold) of header information. Then, it transmits the amount sold to where to make contact (electronic mail address) for the confirmation of the order, by which the orderer can confirm the amount sold. Then, the reply for confirmation of the order is transmitted from the orderer. When the reply is received by the client computer 20, the client computer 20 transmits information of the amount sold calculated by the amount sold calculating program and the card number to credit card centers 821 and 822 corresponding to the types of the transmitted credit cards through modem 22 (for example, transmits to credit card center 821 of "MA" Company in the case of a credit card of "MA" Company, while transmits to credit card center 822 of "VI" Company in the case of a credit card of "VI" Company) to make the credit card center to conduct selling procedures, and to transmit information showing whether the selling procedures have been conducted or not and information of a liaison section including the zip code, an address and a telephone number and a name of an owner of the credit card corresponding to the card number of the transmitted credit card.

Then, the client computer 20 receives information showing whether the selling procedures have been conducted or not and information of a liaison section including the zip code, an address, a telephone number and a name of an owner of the credit card corresponding to the card number of the transmitted credit card, from the credit card centers 821 and 822 through modem 22 who transmitted.

Then, the client computer 20 saves information showing whether the selling procedures have been conducted or not in sales information of header information. When the selling procedures have not been conducted, the client computer sends to the electronic mail address the reply showing that selling procedures have not conducted, through modem 22, and eliminates header information-relating to this order.

When the selling procedures have been conducted, the client computer 20 establishes and registers information of a liaison section including the zip code, an address, a telephone number and a name of an owner of the received credit card as order information. A part of order contents information, a telephone number, a name and the receipt number are further established and registered as printing information.

Then, the client computer 20 makes slip issuing machine 27 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which is put in a photographic bag because it can not be handed to the customer. The photographic bag serves as a memo for the store, and it can be utilized as a container to contain an image recording medium and a photographic product prepared from the image recording medium.

2-3. Order Receiving Processing Through Internet

Incidentally, since client computer 20 of the photographic processing system in the present embodiment is connected to an internet by way of the telephone line through modem 22, an order for photographic processing is sometimes received by way of the telephone line such as the internet through modem 22.

In this case, for example, a home page menu for receiving digital image data representing a document for making a photographic product, order contents information relating to order contents for photographic processing from the digital image data, and the type and number of a credit card owned by an orderer of photographic processing is provided on a provider, and there are provided an order receiving means which receives digital image data representing a document for making a photographic product, order contents information relating to order contents for photographic processing from the digital image data, and the type and number of the credit card, the amount sold calculating means which calculates the amount sold for photographic processing in the order contents shown by the order contents information from the order contents information received by the order receiving means, and a transmitting/receiving means which transmits the calculated amount sold and card number to the credit card center corresponding to the type of the credit card to make it to conduct selling procedures and to make it to transmit information relating to the name and where to make contact of the owner of the credit card, and receives information relating to the name and where to make contact of the owner of the credit card from the credit card center.

Incidentally, the amount sold calculating means is the same as the amount sold calculating program mentioned above.

These means provided on the provider operate as follows.

First of all, the order receiving means provided on the provider receives digital image data representing a document for making a photographic product and order contents information relating to order contents for photographic processing which have been transmitted from a customer by the use of a home page menu of the store.

Then, the amount sold calculating means in the order receiving means calculates the amount sold for photographic processing of order contents shown by the order contents information, from digital image data and order contents information both transmitted from the customer.

Then, the amount sold calculated by the amount sold calculating means is displayed to the customer on the home page menu of the store. Due to this, the customer can confirm the amount sold.

Then, when online sign-up is conducted from the customer, the type and the number of the credit card owned by the customer are transmitted to the provider, and the order receiving means receives them.

Then, the transmitting/receiving means provided on the provider transmits the calculated amount sold and the card number to the credit card center corresponding to the type of the credit card which received by the order receiving means (for example, transmits to credit card center 821 of "MA" Company in the case of a credit card of "MA" Company, while transmits to credit card center 822 of "VI" Company in the case of a credit card of "VI" Company) to make selling procedures to be conducted, and to make information showing whether selling procedures have been conducted or not, and information relating to liaison section including a name, a zip code, an address, a phone number of the owner of the credit card to be transmitted, and receives information relating to the name of the owner of the credit card and its liaison section from the information showing whether selling procedures have been conducted or not and from the credit card center.

When selling procedures have not been conducted, it is displayed on the home page menu of the store that selling procedures have not been-conducted so that the customer may learn it, and procedures thereafter are not conducted, showing the end of the procedure.

When selling procedures have been conducted, it is displayed on the home page menu of the store that selling procedures have been conducted so that the customer may learn it, and a transmitting/receiving means provided on the provider transmits digital image data representing a document to make photographic products, order contents information relating to order contents of photographing processing from the digital image data, a type and a card number of the credit card owned by the orderer of this photographic processing, information relating to the name and where to make contact of the owner of the credit card and the amount sold, to client computer 20 through modem 22.

When the transmission mentioned above is conducted, the client computer 20 stores therein all information temporarily.

Then the client computer 20 makes server 10 to transmit consecutive receipt numbers showing the sequence of order receiving, and stores the digital image data and header information of the digital image data including the receipt number, order contents information, sales information (the amount sold), card information (type and number of the credit card) and order information (where to make contact such as a zip-code, an address, a phone number and a name, all received. Then, the client computer establishes and registers a part of the order contents information, the phone number, the name and the receipt number as printing information. Then the client computer 20 makes the server 10 to store the header information. Incidentally, on and after this moment, header information in the server 10 is changed each time the header information is changed by the client computer 20.

Then, the client computer 20 makes slip issuing machine 27 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which is put in a photographic bag because it can not be handed to the customer. The photographic bag serves as a memo for the store, and it can be utilized as a container to contain an image recording medium and a photographic product prepared from the image recording medium.

2-4. Processing Conducted on the Part of Client Computer for Image Recording Medium for Which an Order is Accepted Then, either one of the following steps is taken depending on the type of image recording medium representing a photographic document deposited.

2-4-1. In the Case Where an Image Recording Medium Representing a Photographic Document Deposited is One Which Can be Processed Only on the Part of Printer Processor 1 (Hereinafter Referred to as Case A)

Namely, when an image recording medium representing a photographic document is either one of reflection documents such as an undeveloped photographic film, a developed photographic film, a photographic print and a printed matter, it is processed on the part of the printer processor 1. Accordingly, a file including only header information is stored in work commanding folder (for example: a folder named "Task") 52 in client computer 20. An operator of the client computer 20 puts the image recording medium representing the photographic document deposited in the photographic bag, and handles it to an operator of printer processor 1.

Incidentally, in this case, when the object is one capable of being processed on the part of client computer 20, it is stored in input-use folders 54, 55 and 56 as input-use digital image data as will be described, to be processed.

2-4-2. In the Case Where the Object is One Which Can Not be Obtained on Client Computer 20 When an Image Recording Medium Representing a Photographic Document Deposited is One Which Can be Processed on the Part of Client Computer 20 (Hereinafter Referred to as Case B)

Namely, when the object is a photographic print in the case where an image recording medium representing a photographic document is either one of a floppy disk, CD, PC card and MO, an operator of client computer 20 inserts this image recording medium in the drive corresponding to the type of the image recording medium representing the photographic document deposited, then, this drive reads a frame image recorded on the inserted image recording medium, the client computer 20 starts the image processing program stated above, and conducts image processing (image maneuvering) in accordance with order contents by conducting gradation processing on a necessary frame image among frame images thus read to make the frame image to be output-use digital image data, and saves them in output-use folder 53 together with header information. The operator of the client computer 20 puts the image recording medium representing the photographic document deposited in the photographic bag, and handles it to an operator of printer processor 1.

2-4-3. In the Case Where the Object is One Which Can be Obtained on Client Computer 20 When an Image Recording Medium Representing a Photographic Document Deposited is One Which Can be Processed on the Part of Client Computer 20 (Hereinafter Referred to as Case C)

Namely, when the object is to record on either one of a floppy disk, CD, PC card and MO, in the case where an image recording medium representing a photographic document is either one of a floppy disk, CD, PC card and MO, an operator of client computer 20 inserts this image recording medium in the drive corresponding to the type of the image recording medium representing the photographic document deposited, then, this drive reads a frame image recorded on the inserted image recording medium, and the operator of the client computer 20 inserts the image recording medium representing the object into the drive corresponding to the type of the image recording medium representing the object, then, the client computer 20 starts the image processing program stated above, and conducts image processing (image maneuvering) in accordance with order contents by conducting gradation processing on a necessary frame image among frame images thus read to make the frame image to be recording-medium-recording-use digital image data, and makes them to be recorded on an image recording medium of the object, together with header information.

Incidentally, in this case, card information of the header information is recorded in accordance with specific standards. Namely, when conducting order receiving by the use of information of a type and a number of a credit card, the type and the number of the credit card are recorded in a way that they can be read out when an order receiving is processed by the image recording medium thereafter. In the same way, when conducting order receiving by the use of information of a number of a shopping card, the card number of a shopping chain card may be read out from the image recording medium when an order receiving is processed by the image recording medium thereafter.

Then, the operator of the client computer 20 takes out an image recording medium representing a photographic document and an image recording medium representing the object, put them in a photographic bag, and puts it in a box for finished products. The client computer 20 makes server 10 to store header information including information showing the processing has been finished.

2-5. Image Processing Carried Out on the Part of Client Computer 2-5-1. On the client computer 20, there is set specific output-use folder 53 (for example: the name of the folder is "Print") representing the common place of interface between the client computer 20 and host computer 100. In the photographic processing system in the present embodiment, output-use digital image data are saved in the output-use folder 53.

Due to this, even when a large amount of digital image data are transmitted through modem 727, or even when a large amount of output-use digital image data are generated at a time, it does not happen that a large amount of output-use digital image data are transmitted to the host computer 100 side at a time, and it is thereby possible to prevent that shortage of storage capacity is caused on the host computer 100 to interrupt satisfactory output and that an operation to generate output-use digital image data is made to be impossible.

Since it is not necessary to access from the part of the client computer 20 to the part of host computer 100, the photographic system in the present embodiment is arranged so that it is impossible to access from the part of the client computer 20 to the part of host computer 100. Due to this, it is possible to prevent an invasion from the part of the client computer 20 to the part of host computer 100 included in printer processor 1.

Even when a program of the host computer 100 of the printer processor 1 is not kept to be one which corresponds to the newly developed program which is to be provided on the client computer 20, the program of the host computer 100 can function satisfactorily.

2-5-2. Input-use Folder Storing Input-use Digital Image Data

On the client computer 20, there is set each of specific input-use folders 54, 55 and 56 representing the common place of interface between the client computer 20 and host computer 100 for each of image processing program. For example, input-use folder 54 (for example: a folder whose name is "On Line") is established, corresponding to image processing program whose name is "Inter Net Photo Service" (trade name), while, input-use folder 55 (for example: a folder whose name is "PC1") is established, corresponding to image processing program whose name is "PC Picture Show" (trade name).

Host computer 100 is one which converts digital image data inputted from film scanner 600 or from flat bed scanner 170 into input-use digital image data for generation, separately from client computers 20, 30 and 40.

Then, the host computer 100 transmits, in accordance with its command, the input-use digital image data generated by the host computer 100 to the appropriate input-use folder among input-use folders 54, 55 and 56 established respectively by client computers 20, 30 and 40, and makes the input-use folder to save the digital image data.

Incidentally, the input-use folder is a specific folder representing a common plate of interface between client computers 20, 30 and 40 and host computer 100.

Under the condition stated above, a specific input-use folder representing a common place of the interface between host computer 100 and each of client computers 20, 30 and 40 is established on each of client computers 20, 30 and 40, and thereby input-use digital image data are saved. It is therefore unnecessary to save a large amount of input-use digital image data on the part of the host computer 100 even when a large amount of input-use digital image data are generated on the part of the host computer 100, and it is prevented that storage capacity shortage is caused on the part of the host computer 100 to inhibit satisfactory output. In addition, since no access can be carried out from the part of the client computers 20, 30 and 40 to the part of the host computer 100, an invasion from the client computers 20, 30 and 40 to the part of the host computer 100 included in printer processor 1 can be prevented.

2-5-3. Image Processing Program Generating Output-use Digital Image Data

Next, there will be explained an image processing program which generates output-use digital image data for obtaining of hard copies of the image through the printer processor 1. This image forming program. This is image processing program 51 executed by the client computer 20 in the case B stated above.

In this image processing program, client computer 20 reads digital image data for which the order has been received, and displays on monitor 21 the reproduced image of the hard copy of the read digital image data and contents of header information.

Then, the client computer 20 conducts image processing and obtains output-use digital image datafolder 53, in accordance with input from a key board from an operator, while displaying reproduced images of hard copies of digital image data in process and the image processing status on monitor 21.

The client computer displays on the monitor 21 the reproduced images of hard copies of the obtained output-use digital image data and contents of header information, and saves the obtained output-use digital image data together with header information on output-use folder 53 through input representing the confirmation of an operator.

2-5-4. Program to Record Input-use Digital Image Data on a Medium

Next, there will be explained a program for recording on a medium input-use digital image data obtained by host computer 100 of printer processor 1 and stored in input-use folders 54, 55 and 56 from the host computer 100. This is program 51 executed by the client computer 20 when the object is recording of digital image data on a medium in an occasion or Case A.

In this program, the client computer 20 judges whether input-use digital image data are saved in input-use folders 54, 55 and 56 or not. When input-use digital image data are saved in input-use folders 54, 55 and 56, the sequence advances to the next step.

Next, an image processing program corresponding to input-use folders 54, 55 and 56 in which input-use digital image data are saved is started, and input-use digital image data saved in the input-use folders 54, 55 and 56 are read. For example, when input-use digital image data are saved in the input-use folder 55 (for example: a folder whose name is "PC1"), image processing program 51 (name is "PC Picture Show (trade name)) corresponding to the input-use folder 55 is started to read input-use digital image data saved in the input-use folder 55.

In this image processing program 51, the client computer 20 displays on monitor 21 a reproduced image of a hard copy of the read input-use digital imagedata and contents of header information.

The client computer 20 conducts image processing in accordance with input from an operator and obtains medium-use digital image data, while displaying on monitor 21 a reproduced image of a hard copy of digital image data in process and the state of image processing.

The client computer displays on monitor 21 a reproduced image of a hard copy of the obtained medium-use digital image data and contents of header information, and records the obtained medium-use digital image data on the medium of the corresponding medium drive together with header information, through input of an operator for confirmation.

Incidentally, in this case, card information of header information is recorded in accordance with specific standards. Namely, when conducting order receiving by the use of information of the type and number of a credit card, the card information is recorded so that the type and number of the credit card can be read out when order receiving processing is conducted with an image recording medium in the future. In the same way, when conducting order receiving by the use of information of the number of a shopping chain card, the card information is recorded so that the number of the shopping chain card can be read out when order receiving processing is conducted with an image recording medium in-the future.

Then, the media on which the obtained medium-use digital image data are recorded are put in the corresponding photographic bag after order information of header information is checked. Then, the client computer 20 makes server 10 to store header information including information showing that processing is over.

2-6. Processing in Film Developing Machine

Next, processing for developing an undeveloped photographic film in film processing machine 2 will be explained. This is processing executed when a photographic document is an undeveloped photographic film on the occasion of the case A stated above.

First of all, an operator of printer processor 1 takes out an undeveloped photographic film (which is naturally contained in a cartridge) contained in a photographic bag from an operator of the client computer 20, and records the same number on the tip portion of the photographic film and on the photographic bag (the most simple way is to paste seals on each of which the same number is printed on the tip portion of the photographic film and on the photographic bag). Then, the operator sets the undeveloped photographic film on film processing machine 2.

Then, the photographic films are processed in the order for setting -them on the film processing machine 2, and are ejected out of the film processing machine 2 in succession after the prescribed period of time from the start of processing. Accordingly, it is efficient if photographic bags are arranged in the order of setting the films. Then, each of the photographic films ejected out of the film processing machine 2 is combined with a photographic bag, using the number recorded on the tip portion of the photographic film.

If the order content of photographic processing is only to process a photographic film, the processed film is put in a photographic bag which is then put in a finished product box. Further, header information of order information is made to be of prepared by inputting the receipt number through key board 120, and information of server 10 is updated.

When the order content of photographic processing includes processing of a photographic film and processing accompanying image pickup on the processed photographic film, an order for reading images recorded on the photographic film is waited by film scanner 600 of a printer processor.

2-7. Reading Processing of Host Computer

Incidentally, host computer 100 can generate output-use digital image data, separately from output-use digital image data read from client computer 20, by conducting image processing from input digital image data inputted from film scanner 600, flat bed scanner 170, PC card reader 140 and CD drive 150.

When an image recording medium representing a photographic document deposited is one which can be processed only on the part of printer processor 1, namely, when the image recording medium is either one of reflection documents such as an undeveloped photographic film, a developed photographic film, a photographic print and a printed matter, input digital image data are inputted in host computer 100 from film scanner 600 or from flat bed scanner 170. Incidentally, when an image recording medium representing a photographic document deposited is an undeveloped photographic film, the image recording medium is processed by film processing machine 2, and frame images recorded on the photographic film are read by film scanner 600, as explained in Item 2-6.

An operator of printer processor 1 takes image recording medium (photographic film or reflection document) out of a photographic bag first, then, sets it on the corresponding image reading apparatus (film scanner 600 and flat bed scanner 170), and inputs the receipt number of order information 170), and inputs the receipt number of order information on the photographic bag. Then, host computer 100 reads header information corresponding to the order information out of work instruction folder (example: folder whose name is "Task") 52. Then, the host computer 100 makes image reading apparatus (film scanner 600 or flat bed scanner 170) to read images from image recording medium (photographic film and reflection document), and makes input digital image data thus obtained to document), and makes input digital image data thus obtained to data can be saved in the input-use folder (example: folder data can be saved in the input-use folder (example: folder together with header information. together with header information.

2-8 Image Processing of Host Computer

Figure 8:
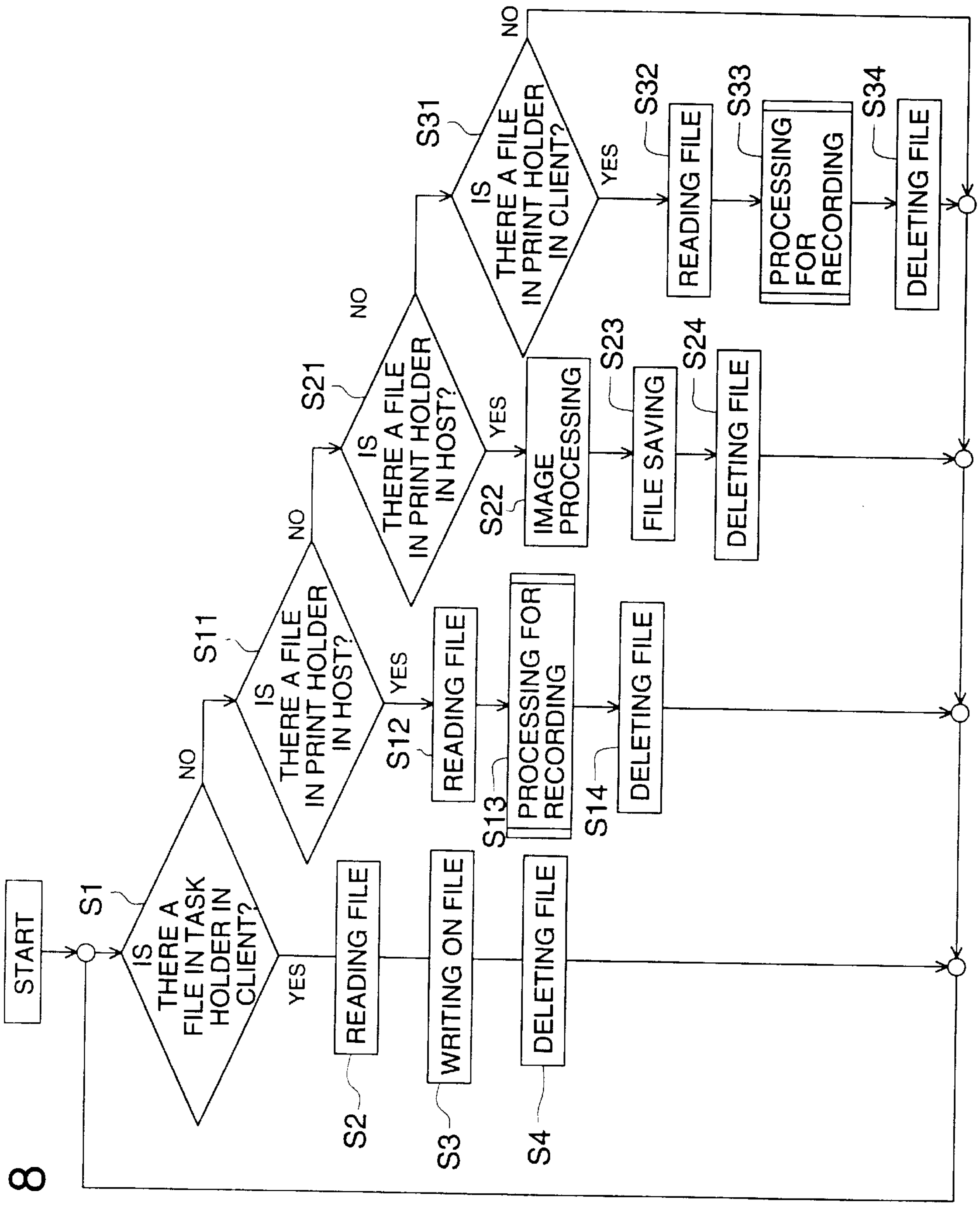
FIG. 8 is a flowchart of a processing program of a host computer 100 of the photographic system in Embodiment 1.

With regard to a processing program of host computer 100, parallel with a processing program for saving input digital image data explained in Item 2-7 above in input-use folder (example: folder whose name is "Input") in host computer 100, as shown in FIG. 8 representing a flow diagram for a processing program of host computer 100. Next, a processing program which is flowing as shown in FIG. 8 will be explained with reference to FIGS. 7 and 8.

A processing program of host computer 100 flows as shown in FIG. 8 which is a flow chart of the processing program of host computer 100. It will as follows.

First, a work instruction folder (folder whose name is "Task") in client computers 20, 30 and 40 is searched at S1, and it is judged whether or not a file of only header information is saved in the work instruction folder (example: folder whose name is "Task") in client computers 20, 30 and 40. If the file of only header information is not saved in the work instruction folder (example: folder whose name is "Task") in client computers 20, 30 and 40, the step advances to S11. When the file of only header information is saved in the work instruction folder (example: folder whose name is "Task") in client computers 20, 30 and 40, the step advances to S2.

Next, the file of only header information saved in the work instruction folder (example: folder whose name is "Task") in client computer 20, 30 and 40 is read at the step of S2 and the step advances to S3.

Then, at the step of S3, the file of only header information thus read is saved in the work instruction folder (example: folder whose name is "Task") in host computer 100, and step advances to S4.

Then, at the step of S4, the file is saved in the work instruction folder (example: folder whose name is "Task") in host computer 100, and the file of only header information saved in the work instruction folder (example: folder whose name is "Task") in client computers 20, 30 and 40 is deleted, and the step returns to S1.

At the step 11, output-use folder (example: folder whose name is "Print") in host computer 100 is searched, and thereby it is judged whether or not output-use digital image data are saved in output-use folder (example: folder whose name is "Print") in host computer 100. When output-use digital image data are not saved in the output-use folder (example: folder whose name is "Print") in host computer 100, the step advances to S21. When output-use digital image data are saved in the output-use folder (example: folder whose name is "Print") in host computer 100, the step advances to S12.

Next, output-use digital image data saved in output-use folder (example: folder whose name is "Print") in host computer 100 are read together with header information at the step S12.

Then, at the step S13, from output-use digital image data thus read, digital image data for image recording including header information such as print quantity information, magazine selection information, longitudinal/lateral information, cutting length information and printing information are obtained through processing for recording which will be described later, and they are saved in image-recording-use folder (example: folder whose name is "Recording").

Then, at the step S14, output-use digital image data corresponding to image-recording-use digital image data which are saved in output-use folder (example: folder whose name is "Print") in host computer 100, then are read out at S12, and are saved at S13 are deleted together with header information for them, and the step returns to S11.

At the step S21, input-use folder (example: folder whose name is "Input") in host computer 10 is searched, and it is judged whether or not input digital image data are saved in input-use folder (example: folder whose name is "Input") in host computer 100. When input digital image data are not saved in input-use folder (example: folder whose name is "Input") in host computer 100, the step advances to step S31. When input digital image data are saved in input-use folder (example: folder whose name is "Input") in host computer 100, the step advances to step S22.

Next, at the step S22, input digital image data saved in input-use folder (folder whose name is "Input") in host computer 100 are read together with their header information, and thereby, output-use digital image data and their header information are obtained, or input-use digital image data and their header information are obtained, in accordance with input from touch panel 180 or key board 120. In this case, information necessary as header information of the aforesaid data is displayed on monitor 190, and input from touch panel 180 or from key board 120 is controlled so that the necessary information stated above may be obtained. Incidentally, necessary information as header information is the same as that described above.

When output-use digital image data and their header information are obtained at the step of S23, they are saved in output-use folder (example: folder whose name is "Print") in host computer 100, while when input-use digital image data and their header information are obtained, they are transmitted to either one (example: folder whose name is "PC1", folder whose name is "OnLine" or folder whose name is "ODEV") of input-use folders of client computer 20 shown by the header information, to be saved.

Then, at the step S24, input digital image data corresponding to digital image data saved in input-use folder (example: folder whose name is "Print") in host computer 100, then read out at S22, and saved at S23 are deleted together with header information for them, and the step returns to S11.

Next, at the step S31, output-use folder (example: folder whose name is "Print") in client computer 20 is searched by host computer 100, and it is judged whether or not output-use digital image data are saved in output-use folder (example: folder whose name is "Print") in client computer 20. When output-use digital image data are not saved in any of output-use folder (example: folder whose name is "Print") in client computer 20, the step returns to step S11. When output-use digital image data are saved in either of output-use folder (example: folder whose name is "Print") in client computer 20, the step advances to step S32.

Next, at the step S32, the command from host computer 100 makes output-use digital image data saved in either one of output-use folders (example: folder whose name is "Print") in client computer 20 to be read together with their header information and to be transmitted to host computer 100.

Then, at the step S33, from output-use digital image data thus read, digital image data for image recording including header information such as print quantity information, magazine selection information, longitudinal/lateral information, cutting length information and printing information are obtained through processing for recording such as image processing which will be described later, and they are saved in image-recording-use folder (example: folder whose name is "Recording").

Then, at the step S34, output-use digital image data corresponding to image-recording-use digital image data which are saved in either one of output-use folders (example: folder whose name is "Print") in client computer 20, then are read out at S32, and are saved at S33 are deleted together with their header information, and the step returns to S11.

This is a way how the processing program of host computer 100 flows.

2-9. Output Processing of Printer Processor

Next, with reference to FIGS. 1–7, there will be explained a processing to obtain prints based on image-recording-use digital image data saved in image-recording-use folder (example: folder whose name is "Recording") in host computer 100.

First, exposure control section 209 of exposure unit 200 starts reading successively image-recording-use digital image data saved in image-recording-use folder (example: folder whose name is "Recording") in host computer 100, in time to the timing of exposure. Then, the exposure control section 209 conducts the operations to transmit magazine selection information and cutting information which represent header information of the read image-recording-use digital image data to feed-out section 230, then, to transmit printing information representing header information of the read image-recording-use digital image data to conveyance section 290, then, to generate image recording signals for exposure section 250 from the read image-recording-use digital image data and to transmit them to exposure section 250, for the number of times corresponding to print quantity information representing header information of image-recording-use digital image data.

Thereupon, the feed-out section 230 feeds out print-use light-sensitive material P from magazine 210 selected based on the transmitted magazine selection information for the number of times corresponding to print quantity information, and feeds the light-sensitive material P to exposure section 250 after cutting it to the cutting length of a sheet based on the transmitted cutting length information, while, the exposure section 250 exposes, based on the transmitted image recording signals, the sheet-shaped print-use light-sensitive material P fed from the feed-out section 230, and the conveyance section 290 conveys the print-use light-sensitive material P to automatic processing machine 300 while printing on the print-use light-sensitive material P which has been exposed by the exposure section 250, based on the transmitted printing information, thus, prints in quantity corresponding to print quantity information are obtained through processing of the automatic processing machine 300.

When exposure control from image-recording-use digital image data thus read is completed, the exposure control section 209 adds header information of "exposed" to the image-recording-use digital image data saved in an image-recording-use folder (example: folder whose name is "Recording") in host computer 100.

Then, the automatic processing machine 300 successively conveys prints to sorter 400 which sorts the conveyed prints to each order information, based on order information of header information added to output-use digital image data corresponding to the conveyed print. An operator of printer processor 1 puts the sorted print in a photographic bag on which the corresponding receipt number is recorded, after observing the receipt number printed on the print, and puts the photographic bag in a finished product storage box. In addition, the operator inputs the receipt number from key board 120 so that the order information may be made to be "finished" and information of server 10 may be updated.

2-10. Delivery Processing

Next, delivery of photographic products which have been finished and have not been handed to an orderer will be explained with reference to FIG. 1.

First of all, when a customer who is an orderer visits the store where the photographic processing system of the present embodiment is installed, an operator of client computer 20 deals with the customer, asking the customer to deposit a credit card, a shopping chain card, or a credit card. When the credit card deposited by the customer is of a card type with which the store has not made a contract, the customer is asked to deposit a credit card or a shopping chain card with which the store has made a contract.

2-10-1. When a Credit Card is Deposited

When a credit card is deposited, the operator of client computer 20 inserts the deposited card in credit card reader 28. The credit card reader 28 reads the inserted credit card by reading the type and the number of the credit card, and transmits the type and the number of the credit card thus read to client computer 20.

The client computer 20 transmits, through modem 22, the card number to credit card center 821 or 822 corresponding to the type of the credit card which has been read (for example, transmits to credit card center 821 of "MA" Company in the case of a credit card of "MA" Company, while transmits to credit card center 822 of "VI" Company in the case of a credit card of "VI" Company), and makes the credit card center to transmit where to make contact including a zip code, an address, a phone number and a name of the owner of the credit card corresponding to the card number of the credit card transmitted.

Then, the client computer 20 receives from the credit card centers 821 and 822 to which the client computer transmitted, where to make contact including a zip code, an address, a phone number and a name of the owner of the credit card corresponding to the card number of the credit card transmitted, through modem 22.

Then, the client computer 20 makes monitor 21 to display where to make contact including a zip code, an address, a phone number and a name of the owner of the credit card received.

In addition, the client computer 20 transmits the received phone number and the name, and makes server 10 to retrieve the order information including the receipt number, order contents and current status for undelivered photographic products corresponding to the phone number and the name mentioned above, and to send a reply. The client computer 20 makes monitor 29 to display thereon the receipt number, order content information and information showing whether or not the order information has been made to be "finished" for photographic products which correspond to the received phone number and the name and have not been delivered.

Then, after observing the receipt number on the monitor 21 showing that the order information has been made to be "finished", the operator of the client computer 20 searches the finished product storage box for the photographic bag on which the receipt number is recorded, then, makes a bar code recorded on the photographic bag thus found out to be read by bar code reader 29, and hands this photographic product contained in the photographic bag to the orderer.

Then, the bar code reader reads a bar code recorded on the photographic bag and transmits it to client computer 20 which sets on server 10 that the photographic product corresponding to the phone number, name and receipt number recorded in the bar code has been handed.

2-10-2. When a Shopping Chain Card is Deposited

When a shopping chain card is deposited, bar code reader 29 reads the deposited shopping chain card to read the card number (card ID information which sometimes includes letters and symbols in addition to the numbers) of the shopping chain card. The card number of the shopping chain card thus read is transmitted to client computer 20.

Then, the client computer 20 transmits the card number to shopping chain center 831 through modem 22, and makes where to make contact including a zip code, an address, a phone number and a name of an owner of the shopping chain card corresponding to the above-mentioned card number to be transmitted.

Then, the client computer 20 receives from the shopping chain center 831 where to make contact including a zip code, an address, a phone number and a name of the owner of the shopping chain card corresponding to the card number of the transmitted shopping chain card, through modem 22.

Then, the client computer 20 makes monitor 21 to display thereon the card number of the shopping chain card and received where to make contact including a zip code, an address, a phone number and a name of an owner of the shopping chain card.

In addition, the client computer 20 transmits the received phone number and the name, and makes server 10 to retrieve the order information including the receipt number, order contents and current status for undelivered photographic products corresponding to the phone number and the name mentioned above, and to send a reply. The client computer 20 makes monitor 21 to display thereon the receipt number, order content information and information showing whether or not the order information has been made to be "finished" for photographic products which correspond to the received phone number and the name and have not been delivered.

Then, after observing the receipt number on the monitor 21 showing that the order information has been made to be "finished", the operator of the client computer 20 searches the finished product storage box for the photographic bag on which the receipt number is recorded, then, makes a bar code recorded on the photographic bag thus found out to be read by bar code reader 29, and hands this photographic product contained in the photographic bag to the orderer.

Then, the bar code reader reads a bar code recorded on the photographic bag and transmits it to client computer 20 which sets on server 10 that the photographic product corresponding to the phone number, name and receipt number recorded in the bar code has been handed.

2-10-3. In the Case of None of the Foregoing

When neither a credit card nor a shopping chain card is deposited, an operator of client computer 20 hears from a customer its phone number and name, and inputs them through a key board provided on the client computer 20.

Then, the client computer 20 retrieves the unfinished receipt number corresponding to the inputted phone number and name from server 10, and makes monitor 21 to display it.

In addition, the client computer 20 transmits the received phone number and the name, and makes server 10 to retrieve the order information including the receipt number, order contents and current status for undelivered photographic products corresponding to the phone number and the name mentioned above, and to send a reply. The client computer 20 makes monitor 21 to display thereon the receipt number, order content information and information showing whether or not the order information has been made to be "finished" for photographic products which correspond to the received phone number and the name and have not been delivered.

Then, after observing the receipt number on the monitor 21 showing that the order information has been made to be "finished", the operator of the client computer 20 searches the finished product storage box for the photographic bag on which the receipt number is recorded, then, makes a bar code recorded on the photographic bag thus found out to be read by bar code reader 29, and hands this photographic product contained in the photographic bag to the orderer.

Then, the bar code reader reads a bar code recorded on the photographic bag and transmits it to client computer 20 which sets on server 10 that the photographic product corresponding to the phone number, name and receipt number recorded in the bar code has been handed.

2-10-4. Selling Procedures

In the store where the photographic processing system of the present embodiment is installed, selling procedures are conducted on the occasion of order receiving, which makes it unnecessary to conduct selling procedures when handing photographic products to the customer.

2-11. Direct Delivery From Photographic Processing System of the Present Embodiment In the photographic processing system of the present embodiment, sales processing is conducted on the occasion of order receiving. It is therefore possible to deliver photographic products from the photographic processing system to the address of an orderer directly and automatically. Owing to this, an orderer can receive photographic products without visiting the store.

When a customer wishes to receive this service, information to the effect that direct delivery is desired is inputted from client computer 20 on the occasion of order receiving, and establishment is made on server 10 to that effect and "direct delivery desired" is printed by slip issuing machine 27 on a photographic bag and on a slip. In that case, a photographic bag which has a large size and high stiffness and serves as a container for delivery is selected as a photographic bag, and a name, a zip code, an address and a phone number of an orderer are described in a large size on one side of the photographic bag.

When putting a photographic bag containing photographic products in a finished product storage box, the photographic bag is put in the box for direct delivery. Then, the container for delivery containing the photographic products is picked up by delivery truck 842 which makes the round of its assigned block periodically and delivers to the orderer whose name and where to make contact are described on the container for delivery.

This delivery truck 842 delivers directly or indirectly the photographic products together with the container for delivery to the address of the orderer.

3. Others

Though photographic products are delivered after being contained in the photographic bag on which a bar code containing a phone number and a name is recorded, the bar code may also be recorded on the photographic product itself.

Embodiment 2

Figure 9:
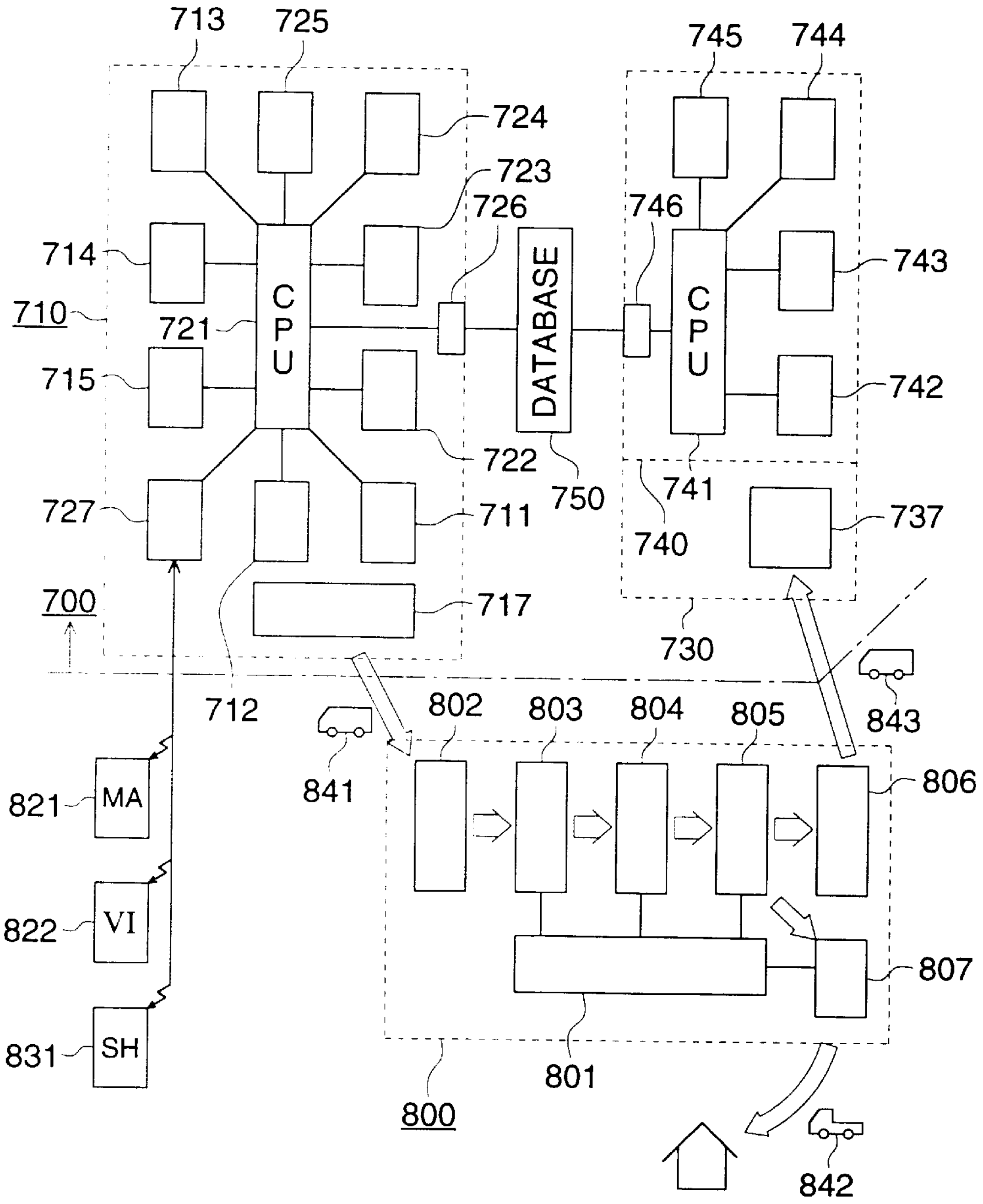
FIG. 9 is an outlined view of a photographic product production and distribution system in Embodiment 2.

A photographic product production/distribution system of the present embodiment is one having therein an order receiving system installed at a reception desk of the photographic store or of a photofinisher, a photofinishing system which conducts processing for photographic orders which have been received by the order receiving system, and a delivering system which delivers photographic products obtained through processing by the photofinishing system to the orderer. The photographic product production/distribution system of the present embodiment will be explained as follows, referring to FIG. 9 representing a schematic diagram of the photographic-product production/distribution system of the present embodiment.

1. Schematic Structure of Photographic Product Production/Distribution System The photographic product production/distribution system of the present embodiment has therein order receiving system 710 which is installed at a reception desk of a photographic store or of a photofinisher (hereinafter referred to as store 700) and receives orders for photographic processing, photofinishing system 800 which conducts photographic processing for order contents order-received by the order receiving system 710, and delivering system 730 which is installed in store 700 and delivers photographic products obtained through photographic processing by the photofinishing system 800 to the orderer. The order receiving system 710 and the delivering system 730 are separated form each other in store 700 as stated above to achieve an arrangement wherein the order receiving system 710 is arranged at the location facing a bustling main street, attaching great importance to customer attraction, and the delivering system 730, on the other hand, is arranged inside the store to lead a human traffic line into the store and thereby to stimulate the people's will to purchase, which is a recent layout of a photographic store.

1-1. Schematic Structure of Order Receiving-system 710

On the order receiving system 710, there is provided CPU 721 which controls various parts of the order receiving system 710. The CPU 721 is connected to monitor 723 which displays thereon various information for order receiving processing, images of digital image data recorded on a medium, and drive states of various equipment connected to the CPU 721. There is further provided on the client computer 721 key board 722 for inputting through operation of an operator. These make it possible to conduct interactive processing.

The CPU 721 is connected to data base 750 of store 700 through interface 726. On this data base 750, there are recorded receipt numbers of all orders, the names and phone numbers of orderers, types of image recording media, order contents information, information showing whether the order is finished or not, information showing whether the order is delivered or not, the amount of sold, type and number of a credit card when an order is accepted with a credit card, and the number of a shopping chain card when an order is accepted with a shopping chain card.

The CPU 721 is connected to medium drive 714 which has thereon a floppy disk drive for reading information from a floppy disk and writing information on a floppy disk, CD drive for reading information from CD and writing information on CD, PC card drive for reading information from PC card and writing information on PC card, MO drive for reading information from MO and writing information on MO, Zip drive for reading information from Zip and writing information on Zip, and DVD drive for reading information from DVD and writing information on DVD. Owing to the medium drive 714, it is possible to read information from these media and to write information on these media.

The CPU 721 is connected to modem 727 which is connected to a telephone line for connecting with credit card centers 821 and 822, and shopping chain center 831. Further, the CPU 721 is connected to credit card reader 724 which can read the type and number of the inserted credit card for various types of cards. The CPU 721 is further connected to bar code reader 725 for reading the type and number of a shopping chain card and reading bar code recorded on a slip or a photographic bag, by reading recorded on various shopping chain cards. Owing to these items, the CPU 721 can access credit card centers 821 and 822 corresponding to the credit card type read by the credit card reader 724 to conduct processing or to obtain information, and can access shopping chain centers 831 corresponding to the credit card type read by the bar code reader 725 to conduct processing or to obtain information.

The CPU 721 is further connected to prepaid IC card drive 713 which processes prepaid IC card. On this prepaid IC card, there are stored a name, a zip code, and address and a phone number of the owner, and the prepaid IC card drive 713 read these information, or conducts sales processing and changes the remainder on the prepaid card.

The CPU 721 is further connected to slip issuing machine 712 for issuing a slip and a photographic bag (these are order receiving information recording medium and orderer information recording medium) on which order content information showing order contents for photographic processing and orderer specifying information for specifying an orderer are recorded.

The CPU 721 is further connected to cash containing section 711 which contains cash by cash types, and controls opening and closing of the cash containing section 711. The CPU 721 plays a role of a cash register by controlling opening and closing of the cash containing section 711 depending on necessity of receiving or paying cash.

Then, image recording medium subjected to order receiving processing by order receiving system 710 in the present embodiment is put in photographic bag which is then put in order received box 717.

The order receiving system 710 is visited periodically by delivery truck 841 which delivers the photographic bag put in the order received box 717 to photofinisher system 800.

Incidentally, though FIG. 9 shows only one order receiving system 710 in one store 700, it is also possible to arrange a plurality of order receiving systems 710 in one store 700.

1-2. Schematic Structure of Photofinisher System

Photofinisher system 800 of the present embodiment is provided with CPU 801 which controls photofinisher system 800 totally, receiving box 802 which temporarily receives the photographic bag delivered by delivery truck 841, assortment section 803 which assorts photographic bags depending on the receipt number described in a bar code, the type of an image recording medium and order content information which have been obtained by reading with a bar code reader a bar code recorded on the photographic bag taken out of the receiving box 802, and depending on the read type of an image recording medium obtained by reading a name, a zip code, an address and a phone number of an orderer recorded on a specific bar code provided when direct delivery is desired, and by sending them to CPU 801, and order content information, production section 804 which produces photographic products from an image recording medium contained in the photographic bag assorted by the assortment section 803, in accordance with order content information, loading section 805 which loads photographic products produced by the production section 804 in a photographic bag, storage section 806 which keeps the assorted photographic bag containing photographic products loaded by the loading section 805 until the photographic bag is delivered to each store 700, and delivery preparation section 807 where the photographic bag which contains the photographic products for the desired direct delivery and has been sent from the loading section 805 is put in a container for delivery on which a name, a zip code, an address and a phone number are recorded, so that direct delivery to the customer may be carried out.

Incidentally, in the assortment section 803, it is possible to read the type of an image recording medium and order content information by reading a bar code recorded on a photographic bag with a bar code reader.

On the production section 804, on the other hand, there are provided various items such as a film developing unit, a digital printer, a paper developing unit and a media drive, explanation of which will be omitted.

1-3. Schematic Structure of Delivery System 730

On the delivery system 730, there is provided CPU 741 which control various parts of the delivery system 730. The CPU 741 is connected to monitor 743 which is for displaying various information for delivery processing and driving status of each equipment connected to the CPU 741. On the CPU 741, there is provided key board 742 through which is used by an operator for key-inputting. These make interactive processing possible.

The CPU 741 is connected to data base 750 of each store through interface 726.

The CPU 741 is further connected to credit card reader 744 which can read the type and the number of the inserted credit card for various credit cards. The CPU 741 is further connected to bar code reader 745 which reads the type and the number of a shopping chain card by reading a bar code recorded on various shopping chain cards and reads a bar code recorded on a slip and a photographic bag.

Then, the photographic bag delivered by delivery truck 843 from the photofinisher system 800 of the present embodiment is put in finished product storage box 737.

The delivery system 730 is visited by delivery truck 843 periodically, and photographic products produced by photofinisher system 800 are delivered to the delivery system 730.

Incidentally, though FIG. 9 shows only one delivery system 730 in one store 700, it is also possible to arrange a plurality of delivery systems 730 in one store 700.

2. Order Receiving Processing

First of all, when a customer who is an orderer visits the store where order receiving system 710 is installed, an operator of the order receiving system 710 deals with the customer. Then, the operator of the order receiving system 710 hears order contents of the customer, then, receives the image recording medium representing a photographic document in trust, and inputs order contents for photographic processing of the customer through key board 722 provided on CPU 721.

2-1. Order Content Information to be Inputted

Order content information relating to order contents for photographic processing to be inputted are as follows.

First information is a type of an image recording medium representing a photographic document (for example, various kinds such as an undeveloped photographic film, developed photographic film, reflection type documents such as a photographic print and a printed matter, a floppy disk, CD, PC card and MO).

Second information is one concerning whether to process all image frames recorded on an image recording medium, for example, like the processing for the first-time print of an undeveloped photographic film, or to process only specific image frames among image frames recorded on an image recording medium, for example, like the processing for the reorder print from a developed photographic film.

Third information includes the number or the estimated number of image frames recorded on an image recording medium when processing all image frames recorded on the image recording medium, and information to specify image frames to be processed from an image recording medium (for example, frame numbers) or the number of frames to be processed, when processing only specific image frames among image frames recorded on an image recording medium.

Fourth information includes types of objects desired (for example, types such as development of a photographic film, making of a photographic print (including an index print and a seal print in addition to ordinary photographic prints), writing in a floppy disk, writing in CD such as Photo-CD and writing in MO).

Fifth information includes contents of image processing desired (types such as a simple copying processing, composite processing and image maneuver processing).

2-2. Calculation of the Amount Sold

After these contents of photographic processing order are inputted, CPU 721 saves them as order contents information of header information, then starts a program for calculating the amount sold, and calculates the amount sold from the inputted order contents for photographic processing to save it in sales information of the header information. Further, the client computer starts a program for calculating the scheduled time of completion to calculate it from the inputted order contents for photographic processing, and save it in the information of scheduled time for completion in header information. Then, the CPU 721 makes monitor 723 to display the calculated amount sold.

2-3. Order Receiving in the Case Where an Image Recording Medium Represents a Medium When an image recording medium is a medium on which digital image data representing a document for making a photographic product are recorded, an operator receives this medium and inserts it in the medium drive 714 corresponding to the type of that medium.

Then, the drive in which the medium has been inserted reads the inserted medium to confirm whether digital image data representing a document for making a photographic product are recorded on the medium or not.

When it is confirmed that digital image data representing a document for making a photographic product are recorded on the medium, this is transmitted to CPU 721. When the CPU 721 receives the confirmation that digital image data representing a document for making a photographic product are recorded on the medium, monitor 723 is caused to display this. Then, the sequence advances to the step which follows the order receiving step. An operator of the order receiving system 710 advances to the step following the order receiving step after observing a display on the monitor 723.

However, when it is confirmed that digital image data representing a document for making a photographic product are not recorded on the medium, this is transmitted to CPU 721. After receiving information of the confirmation that digital image data representing a document for making a photographic product are not recorded, the CPU 721 makes monitor 723 to display the information showing that digital image data representing a document for making a photographic product are not recorded, and does not conduct order receiving processing. Then, an operator of the order receiving system 710 rejects an order.

2-4. Requesting Deposit of Cards

Then, the operator of the order receiving system 710 requests a customer to deposit a medium or a prepaid IC card on which information of a card such as a credit card, a shopping chain card, a credit card or a shopping chain card is recorded. Incidentally, when the credit card deposited in that store is a card for which the store is not a contractor, the customer is requested to deposit a credit cart or a shopping chain card for which the store is a contractor.

2-5. When a Credit Card is Deposited

When a credit card is deposited, the operator inserts the deposited card into credit card reader 724. The credit card reader 724 reads the inserted credit card and read the type and the card number of the credit card, and sends the type and the card number of the credit card thus read to CPU 721 which temporary saves the transmitted type and number of the credit card.

Then, CPU 721 makes data base 750 to transmit the consecutive receipt number s showing the order of receipt (incidentally, the receipt number is one within a range of the number allotted from the photofinisher) and saves the received receipt number, order contents information, sales information (the amount sold calculated through the amount sold calculating program) and card in formation (type and card number of a credit card) as header information. Then, CPU 721 makes the data base 750 to store the header information. Incidentally, on and after this moment, header information in the data base 750 is changed each time the header information is changed by the CPU 721.

Then, the CPU 721 transmits the amount sold calculated by the amount sold calculating program and the card number to credit card centers 821 and 822 corresponding to the types of the credit card read, through modem 727 (for example, transmits to credit card center 821 of "MA" Company in the case of a credit card of "MA" Company, while transmits to credit card center 822 of "VI" Company in the case of a credit card of "VI" Company) to make the credit card center to conduct selling procedures, and to transmit information showing whether the selling procedures have been conducted or not and information of a liaison section including the zip code, an address and a telephone number and a name of an owner of the credit card corresponding to the card number of the transmitted credit card.

Then, the CPU 721 receives information showing whether the selling procedures have been conducted or not and information of a liaison section including the zip code, an address, a telephone number and a name of an owner of the credit card corresponding to the card number of the transmitted credit card, from the credit card centers 821 and 822 through modem 727.

Then, th e CPU 721 establishes and registers information of a liaison section including the zip code, an address, a telephone number and a name of an owner of the received credit card and the receipt number as order information, then establishes and registers a part of order contents information, a telephone number, a name and the receipt number as printing information, and establishes and registers information showing whether-the selling procedures have been conducted or not in sales information of the header information.

When selling procedures have not been conducted, cash containing sections 711 is opened, and order receiving which does not employ card information explained in Item 2-10 stated later is conducted.

When selling procedures have been conducted, the CPU 721 makes slip issuing machine 712 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which also serves as a memorandum for delivery of the finished photographic products. The photographic bag can be utilized as a container to contain an image recording medium and a photographic product prepared from the image recording medium.

2-6. When a Shopping Chain Card is Deposited

When a shopping chain card is deposited, a bar code recorded on the shopping chain-card thus deposited is read by bar code readers 725, 39 and 49 so that the card number (representing card ID information which sometimes includes characters and symbols in addition to numerals) of the shopping chain card is read. Then, the card number of the shopping chain card thus read is sent to CPU 721. The CPU 721 saves temporarily the transmitted card number of the shopping chain card.

Then, the CPU 721 makes data base 750 to transmit the consecutive receipt numbers showing the sequence of order receiving, and saves the received receipt numbers, order contents information, sales information (the amount sold calculated by the amount sold calculating program) and card information (card number of the shopping chain card), as header information. Then, the CPU 721 makes the data base 750 to store the header information. Incidentally, on and after this moment, header information in the data base 750 is changed each time the header information is changed by the CPU 721.

Then, the CPU 721 transmits the amount sold calculated by the amount sold calculating program and the card number to shopping chain center 831 through modem 727 so that the amount sold may be stored, and makes the sales record in the past and information of a liaison section composed of a zip code, an address, a telephone number and a name of the owner of the shopping chain card corresponding to the card number of the transmitted shopping chain card to be transmitted.

Then, it receives from the shopping chain center 831 the sales record in the past and information of a liaison section composed of a zip code, an address, a telephone number and a name of the owner of the shopping chain card corresponding to the card number of the transmitted shopping chain card, through modem 727.

Then, the CPU 721 makes monitor 723 to display the received sales record in the past. Due to this, an operator of the order receiving system 710 can take actions corresponding to the sales record in the past. Further, the CPU 721 establishes and registers information of a liaison section composed of a zip code, an address, a telephone number and a name of the owner of the received shopping chain card and the card number, as order information. Further, the client computer 20 establishes and registers a part of order contents information, a telephone number, a name and the receipt number as printing information.

Then, when the operator of the order receiving system 710 receives cash exceeding the amount sold displayed on monitor 723, the operator inputs the received cash. After the received cash is inputted, the CPU 721 opens cash containing section 711 so that settlement in cash may be made. Then, the operator of the order receiving system 710 closes the cash containing section 711 after the settlement in cash is completed.

When the cash containing sections 711 is closed, the CPU 721 makes slip issuing machine 712 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag, presuming that the selling procedures have been conducted.

The slip thus issued is a receipt to be given to the customer which also serves as a memorandum for delivery of the finished photographic products. The photographic bag serves as a memo for the store, and it can be utilized as a container to contain an image recording medium and a photographic product prepared from the image recording medium.

Though the explanation stated above is made under the assumption that the store belongs to only one shopping chain, the store may-also belong to plural shopping chains, and when the store belongs to plural shopping chains, there is required processing corresponding to the type of the shopping chain card which has been explained in the case of a credit card.

2-7. When Medium on Which Credit Card Information is Recorded is Deposited

When a medium on which credit card information is recorded is deposited, an operator inserts the medium on which credit card information is recorded into the medium drive 14 corresponding to the type of the medium.

Then, the medium drive 714 in which the medium has been inserted reads the inserted medium to confirm whether the type of the credit card and the card number are recorded on the medium or not.

When it is confirmed that the type of the credit card and the card number are recorded on the medium, the type of the credit card and the card number are read and are transmitted to CPU 721. The CPU 721 saves therein temporarily the transmitted type of the credit card and the card number.

Incidentally, when it is confirmed that the type of the credit card and the card number are not recorded on the medium, this is transmitted to CPU 721. The CPU 721 makes monitor 723 to display that the type of the credit card or the card number is not recorded, and enters the order receiving depending on no card information which will be explained in Item 2-10.

Then, the CPU 721 makes data base 750 to transmit the consecutive receipt numbers showing the order of receipt, and saves the received receipt number, order contents information, sales information (the amount sold calculated through the amount sold calculating program) and card information (type and card number of a credit card) as header information. Then, the CPU 721 makes the data base 750 to store the header information. Incidentally, on and after this moment, header information in the data base 750 is changed each time the header information is changed by the CPU 721.

Then, the CPU 721 transmits the amount sold calculated by the amount sold calculating program and the card number to credit card centers 821 and 822 corresponding to the types of the credit cart read, through modem 727 (for example, transmits to credit card center 821 of "MA" Company in the case of a credit card of "MA" Company, while transmits to credit card center 822 of "VI" Company in the case of a credit card of "VI" Company) to make the credit card center to conduct selling procedures, and makes information showing whether the selling procedures have been conducted or not and information of a liaison section including the zip code, an address and a telephone number and a name of an owner of the credit card corresponding to the card number of the transmitted credit card to be transmitted.

Then, the client computer 20 receives information showing whether the selling procedures have been conducted or not and information of a liaison section including the zip code, an address, a telephone number and a name of an owner of the credit card corresponding to the card number of the transmitted credit card, from the credit card centers 821 and 822 through modem 727.

Then, the CPU 721 establishes and registers information of a liaison section including the zip code, an address, a telephone number and a name of an owner of the received credit card and the type of the credit card as well as the card number as order information. The client computer establishes and registers a part of order contents information, a telephone number, a name and the receipt number as printing information.

Then, the CPU 721 saves information showing whether the selling procedures have been conducted or not in sales information of header information. When the selling procedures have not been conducted, the client computer opens cash containing section 711, and settles accounts in cash which will be stated later.

When selling procedures have been conducted, the CPU 721 makes slip issuing machine 712 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which also serves as a memorandum for delivery of the finished photographic products. The photographic bag serves as a memo for the store, and it can be utilized as a container to contain an image recording medium and a photographic product prepared from the image recording medium.

2-8. When a Medium on Which Shopping Chain Card Information is Recorded is Deposited When a medium on which shopping chain card information is recorded is deposited, the medium on which shopping chain card information is recorded is inserted in the medium drive 14 corresponding to the type of the medium.

Then, the medium drive 714 in which the medium has been inserted reads the medium inserted, and confirms whether the card number of the shopping chain card is recorded on the medium or not.

When it is confirmed that the card number of the shopping chain card and digital image data representing a document for making a photographic product are recorded on the medium, the medium drive 714 in which the medium has been inserted reads the medium inserted to read the card number (card ID information which sometimes includes characters and symbols in addition to the numeral) of the shopping chain card recorded on the medium, and transmits the card number thus read to CPU 721. The CPU 721 saves temporarily the transmitted card number of the shopping chain card.

When it is confirmed that the card number of the shopping chain card is not recorded on the medium, this is transmitted to CPU 721. The CPU 721 makes monitor 723 to display that the type of the credit card or the card number is not recorded, and enters the order receiving depending on no card information which will be explained in Item 2-10.

Then, the CPU 721 makes data base 750 to transmit the consecutive receipt numbers showing the order of receipt, and saves the received receipt number, order contents information, sales information (the amount sold calculated through the amount sold calculating program) and the received card information (the card number of the shopping chain card) as header information. Then, the CPU 721 makes the data base 750 to store the header information. Incidentally, on and after this moment, header information in the data base 750 is changed each time the header information is changed by the CPU 721.

Then, the CPU 721 transmits the amount sold calculated by the amount sold calculating program and the card number to shopping chain center 831 through modem 727 to make the amount sold to be stored, and makes the sales record in the past and information of a liaison section including the zip code, an address and a telephone number and a name of an owner of the shopping chain card corresponding to the card number of the transmitted shopping chain card to be transmitted to be transmitted.

Then, the client computer 20 receives the sales record in the past and information of a liaison section including the zip code, an address, a telephone number and a name of an owner of the shopping chain card corresponding to the card number of the transmitted shopping chain card, from the shopping chain center 831 through modem 727.

Then, the CPU 721 makes monitor 723 to display the received sales record in the past. Due to this, an operator of the order receiving system 710 can take actions corresponding to the sales record in the past. Further, the CPU 721 establishes and registers information of a liaison section including the zip code, an address, a telephone number and a name of an owner of the received shopping chain card and the card number as order information, and it further establishes and registers a part of order contents information, a telephone number, a name and the receipt number as printing information.

Then, when the operator of the order receiving system 710 receives cash exceeding the amount sold displayed on monitor 723, the operator inputs the received cash. After the received cash is inputted, the CPU 721 opens cash containing section 711 so that settlement in cash may be made. Then, the operator of the order receiving system 710 closes the cash containing section 711 after the accounts are settlement in cash. When the cash containing section 711 is closed, the CPU 721 makes data base 750 to transmit the consecutive receipt numbers showing the sequence of order receiving, and adds the received receipt number to header information to make the data base 750 to store the header information.

The CPU 721 makes slip issuing machine 712 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which also serves as a memorandum for delivery of the finished photographic products. The photographic bag serves as a memo for the store, and it can be utilized as a container to contain an image recording medium and a photographic product prepared from the image recording medium.

Though the explanation stated above is made under the assumption that the store belongs to only one shopping chain, the store may also belong to plural shopping chains, and when the store belongs to plural shopping chains, there is required processing corresponding to the type of the shopping chain card which has been explained in the case of a credit card.

2-9. Receiving an Order With a Prepaid IC Card

When a prepaid IC card is deposited, an operator sets the deposited prepaid IC card in prepaid IC card drive 13.

Then, the prepaid IC card drive 13 reads the prepaid IC card thus set, and confirms whether a name, a zip code, an address and phone number of an owner are recorded on the prepaid IC card or not.

Then, when it is confirmed that a name, a zip code, an address and phone number of an owner are recorded on the prepaid IC card, the prepaid IC-card drive reads the name, zip code, address and phone number of the owner recorded on the medium and transmits the name, zip code, address and phone number thus read to CPU 721. The CPU 721 saves the transmitted name, zip code, address and phone number temporarily.

When it is confirmed that a name, a zip code, an address and phone number of an owner are not recorded on the prepaid IC card, this information is transmitted to CPU 721. The CPU 721 makes monitor 723 to display that the type and number of the credit card are not recorded. An operator of the order receiving system 710 hears from an orderer its name and phone number, and input them through key board 722.

Then, CPU 721 makes data base 750 to transmit the consecutive receipt numbers showing the order of receipt and saves the received receipt number, order contents information, sales information (the amount sold calculated through the amount sold calculating program) and order information (a name and a phone number of an orderer, and a zip code and an address if they are recorded on the prepaid IC card) as header information. Then, CPU 721 makes the data base 750 to store the header information. Incidentally, on and after this moment, header information in the data base 750 is changed each time the header information is changed by the CPU 721.

Next, CPU 721 makes prepaid IC card drive 713 to read a recorded prepaid remaining amount from the prepaid IC card which is set, and checks whether the prepaid remaining amount thus read can cover the selling processing or not.

When it is confirmed that the prepaid remaining amount thus read can cover the selling processing, CPU 721 causes the prepaid IC card drive 713 to write so that the prepaid remaining amount recorded on the prepaid IC card may be changed to the amount which is a difference between that prepaid remaining amount and the amount sold.

Incidentally, when it is confirmed that the prepaid remaining amount thus read can not cover the selling processing, CPU 721 makes the prepaid remaining amount recorded on the prepaid IC card to be zero for the prepaid IC card drive 713, causes monitor 723 to display a balance which is obtained by subtracting the prepaid remaining amount from the amount sold, and opens cash containing section 711 so that the balance may be settled in cash. Then, an operator of order receiving system 710 closes the cash containing section 711 after completion of settlement in cash. Then, after the cash containing section 711 has been closed, CPU 721 updates sales information, judging that the selling processing has been performed.

When the selling processing has been completed, CPU 721 causes slip issuing machine 712 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which also serves as a memorandum for delivery of the finished photographic products. The photographic bag can be utilized as a container to contain an image recording medium and a photographic product prepared from the image recording medium.

2-10. Order Receiving Depending on no Card Information (In the Case of None of the Above)

When neither credit card nor shopping chain card is deposited, and neither a medium on which credit card information is recorded nor a medium on which shopping chain card information is recorded is deposited, an operator of the order receiving system 710 hears from a customer its phone number, address and name and inputs them through a key board. Then, CPU 721 establishes and registers where to make contact containing the customer's address and phone number and the customer's name as order information.

Then, CPU 721 makes data base 750 to transmit the consecutive receipt numbers showing the sequence of order receiving, and saves the received receipt numbers and order contents information, sales information (the amount sold calculated by the amount sold calculating program) and inputted order information (where to make contact containing a phone number or an address), as header information. Then, the CPU 721 establishes and registers a part of the order contents information, the phone number and the name as printing information. Then, the CPU 721 makes the data base 750 to store these header information. Incidentally, on and after this moment, header information in the data base 750 is changed each time the header information is changed by the CPU 721.

Then, when the operator of the order receiving system 710 receives cash exceeding the amount sold displayed on monitors 723, 31 and 41, the operator inputs the received cash. After the received cash is inputted, the CPU 721 opens cash containing section 711 so that settlement in cash may be made. Then, the operator of the order receiving system 710 closes the cash containing section 711 after the settlement in cash is completed. When the cash containing sections 711 is closed, the CPU 721 updates sales information, judging that the selling procedures have been completed.

Then, the CPU 721 makes slip issuing machine 712 to issue the slip wherein information of a liaison section including the zip code, an address, a telephone number and a name of an owner of the credit card, the receipt number, a type of the credit card, the card number, the amount sold, contents of order for photographic processing and scheduled time for completion are described, and a telephone number, a name and the receipt number are recorded as a bar code, and a photographic bag.

The slip thus issued is a receipt to be given to the customer which also serves as a memorandum for delivery of the finished photographic products. The photographic bag serves as a memo for the store, and it can be utilized as a container to contain an image recording medium and a photographic product prepared from the image recording medium.

3. Delivery Procedures

Delivery truck 843 delivers to delivery system 730 of the store a photographic bag containing a photographic product produced based on an image recording medium on which an image representing a document for photographic processing is recorded, and on photographic processing of order contents shown by order content information. Then, an operator of the delivery system 730 deals with this, and puts the photographic bag in an unarranged box of finished product storage box 737. Then, the operator of the delivery system 730 makes a bar code recorded on a photographic bag to be read by bar code reader 745 for each photographic bag so that a phone number, a name and a receipt number recorded in the bar code may be read by the bar code reader 745 and transmitted to CPU 741 which then displays the phone number, name and receipt number thus read on monitor 743 and establishes and registers on data base 750 that the photographic product having this receipt number has been delivered. Then, the operator of the delivery system 730 puts photographic bags away in the order of names displayed on the monitor 743.

4. Delivery Procedures

Next, delivery of photographic finished products which have not been delivered to an orderer will be explained as follows.

First of all, when a customer who is an orderer visits the store where the delivery system of the present embodiment is installed, an operator of delivery system 740 deals with the customer, asking the customer to deposit a credit card, a shopping chain card, or a credit card. When the credit card deposited by the customer is of a card type with which the store has not made a contract, the customer is asked to deposit a credit card or a shopping chain card with which the store has made a contract.

4-1. When a Credit Card is Deposited

When a credit card is deposited, an operator of delivery system 740 inserts the deposited card in credit card reader 744. The credit card reader 744 reads the inserted credit card by reading the type and the number of the credit card, and transmits the type and the number of the credit card thus read to CPU 741.

The CPU 741 transmits, through interface 746, the type and number of the credit card thus read to data base 750, and makes the data base 750 to transmit where to make contact including a zip code, an address, a phone number and a name of the owner of the credit card corresponding to the transmitted card type and card number of the credit card.

Then, the CPU 741 receives where to make contact including a zip code, an address, a phone number and a name of an owner of the credit card transmitted by data base 750 through interface 746.

Then, the CPU 741 makes monitor 743 to display thereon where to make contact including a zip code, an address, a phone number and a name of an owner of the credit card thus received.

In addition, the CPU 741 transmits the received phone number and the name, and makes data base 750 to retrieve the order information including-the receipt number, order contents and current status for undelivered photographic products corresponding to the phone number and the name mentioned above, and to transmit them. The CPU 741 makes monitor 743 to display thereon the receipt number, order content information and information showing whether or not the order information has been made to be "finished" for photographic products which correspond to the received phone number and the name and have not been delivered.

Then, after observing the receipt number on the monitor 743 showing that the order information has been made to be "finished", the operator of the delivery system 740 searches finished product storage box 737 for the photographic bag on which the receipt number is recorded, then, makes a bar code recorded on the photographic bag thus found out to be read by bar code reader 745, and hands this photographic product contained in the photographic bag to the orderer.

Then, the bar code reader 745 reads a bar code recorded on the photographic bag and transmits it to CPU 741 which sets on data base 750 that the photographic product corresponding to the phone number, name and receipt number recorded in the read bar code has been handed.

4-2. When a Shopping Chain Card is Deposited

When a shopping chain card is deposited, bar code reader 745 reads the deposited shopping chain card to read the card number (card ID information which sometimes includes letters and symbols in addition to the numbers) of the shopping chain card. The card number of the shopping chain card thus read is transmitted to CPU 741.

Then, the CPU 741 transmits the card number of the shopping chain card to data base 750, and makes where to make contact including a zip code, an address, a phone number and a name of an owner of the shopping chain card corresponding to the above-mentioned card number to be transmitted.

Then, the CPU 741 receives from data base 750 where to make contact including a zip code, an address, a phone number and a name of the owner of the shopping chain card corresponding to the card number of the transmitted shopping chain card, through modem 727.

Then, the CPU 741 makes monitor 743 to display thereon the card number of the shopping chain card and where to make contact including a zip code, an address, a phone number and a name of an owner of the received shopping chain card.

In addition, the CPU 741 transmits the received phone number and the name, and makes data base 750 to retrieve the order information including the receipt number, order contents and current status for undelivered photographic products corresponding to the phone number and the name mentioned-above,and to send a reply. The CPU 741 makes monitor 743 to display thereon the receipt number, order content information and information showing whether or not the order information has been made to be "finished" for photographic products which correspond to the received phone number and the name and have not been delivered.

Then, after observing the receipt number on the monitor 743 showing that the order information has been made to be "finished", an operator of the delivery system 740 searches the finished product storage box for the photographic bag on which the receipt number is recorded, then, makes a bar code recorded on the photographic bag thus found out to be read by bar code reader 745, and hands this photographic product contained in the photographic bag to the orderer.

Then, the bar code reader 745 reads a bar code recorded on the photographic bag and transmits it to CPU 741 which sets on data base 750 that the photographic product corresponding to the phone number, name and receipt number recorded in the bar code read by the bar code reader 745 has been handed.

4-3. In the Case of None of the Foregoing

When neither a credit card nor a shopping chain card is deposited, an operator of delivery system 740 hears from a customer its phone number and name, and inputs them through a key board provided on the CPU 741.

Then, the CPU 741 retrieves the unfinished receipt number corresponding to the inputted phone number and name from data base 750, and makes monitor 743 to display it.

In addition, the CPU 741 transmits the received phone number and the name, and makes data base 750 to retrieve the order information including the receipt number, order contents and current status for undelivered photographic products corresponding to the phone number and the name mentioned above, and to send a reply. The CPU 741 makes monitor 743 to display thereon the receipt number, order content information and information showing whether or not the order information has been made to be "finished" for photographic products which correspond to the received phone number and the name and have not been delivered.

Then, after observing the receipt number on the monitor 743 showing that the order information has been made to be "finished", the operator of the delivery system 740 searches the finished product storage box 737 for the photographic bag on which the receipt number is recorded, then, makes a bar code recorded on the photographic bag thus found out to be read by bar code reader 745, and hands this photographic product contained in the photographic bag to the orderer.

Then, the bar code reader 745 reads a bar code recorded on the photographic bag and-transmits it to CPU 741 which sets on data base 750 that the photographic product corresponding to the phone number, name and receipt number recorded in the bar code has been handed.

4-4. Selling Procedures in Delivering Photographic Product

In the photographic product production/distribution system of the present embodiment, selling procedures are conducted on the occasion of order receiving, which makes it unnecessary to conduct selling procedures when delivering photographic products.

5. Direct Delivery from Photofinishing System

In the photographic product production/distribution system of the present embodiment, selling procedures are conducted on the occasion of order receiving, which makes it possible for the photofinishing system to directly deliver photographic products to an address of an orderer automatically. Due to this, the orderer can receive photographic products without visiting the delivery system 740.

When a customer wishes to receive this service, information to the effect that direct delivery is desired is inputted in the order receiving system 710, and establishment is made on data base 750 to that effect, and "direct delivery desired" is printed by slip issuing machine 712 on a photographic bag and on a slip. In that case, a specific bar code showing that direct delivery is desired is provided on a photographic bag. This specific bar code is one wherein a name, a zip code, an address and a phone number of the orderer are encoded.

In the photofinishing system 800 of the present embodiment, it is judged whether the direct delivery is desired or not by reading a bar code on a photographic bag at assorting section 803, and when the direct delivery is desired, the information to that effect is established on CPU 801. Then, an arrangement is made so that photographic products produced at production section 804 are loaded in photographic bags at loading section 805, and then, the photographic bags loaded with photographic products are sent to delivery preparation section 807.

At the delivery preparation section 807, photographic bags loaded with photographic products are put in a container for delivery on which where to make contact composed of a name, a zip code, an address and a phone number of an orderer recorded is recorded. Then, the container for delivery containing therein photographic products is transferred to delivery truck 842 which delivers the container for delivery to the orderer whose name and where to make contact are recorded on the container for delivery.

Then, the delivery truck 842 delivers photographic products directly or indirectly to the address of the orderer together with the container for delivery.

Embodiment 3

Figure 10:
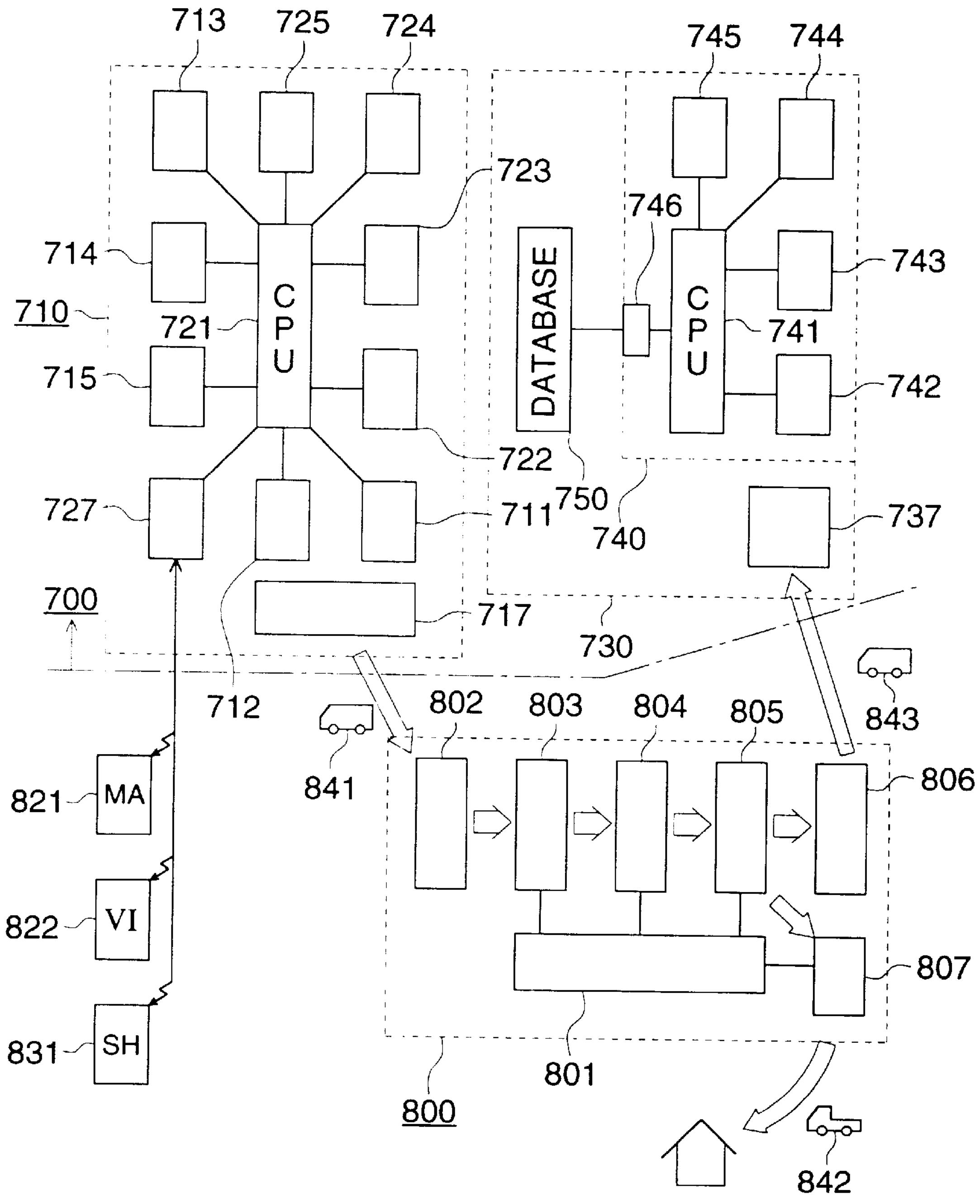
FIG. 10 is an outlined view of a photographic product production and distribution system in Embodiment 3.

The photographic product production/distribution system of the present embodiment is one wherein a part of the photographic product production/distribution system of Embodiment 2 has been changed. The photographic product production/distribution system of the present embodiment will now be explained as follows, referring to FIG. 10 which is a schematic diagram of the photographic product production/distribution system of the present embodiment.

Points of the aforesaid change include that CPU 721 of the order receiving system is not connected to data base 750, and changed points caused by the foregoing. Owing to this, order receiving system 710 and delivery system 730 can be operated independently of each other.

Since CPU 721 is not connected to data base 750 of store 700, CPU 721 can not change information stored in the data base 750 of the store 700. When the data base 750 is made to store information obtained by reading bar codes recorded on photographic bags of all photographic products delivered, the receipt number, a name and a phone number of an orderer, a type of an image recording medium, order content information, information showing whether "delivered" or not, the amount sold, a type and a number of a credit card when a credit card is used for order receiving, and a card number of a shopping chain card when it is used for order receiving for all delivered photographic products are stored in the data base 750.

For a photographic bag and a slip, there are provided consecutive receipt numbers, and a bar code showing the receipt number is recorded on a photographic bag. It is therefore unnecessary for CPU 721 to make data base 750 to transmit the receipt number.

When a type and a number of a credit card are obtained, a bar code on which the encoded type and the number of the credit card are recorded is recorded on a photographic bag by slip issuing machine 712. Then, in the case of delivery to delivery system 710, this bar code is read and decoded to obtain the type and number of the credit card.

When the number of a shopping chain card is obtained, a bar code on which the number of the shopping chain card is recorded is recorded on a photographic bag by slip issuing machine 712. Then, in the case of delivery to delivery system 710, this bar code is read to obtain the number of the shopping chain card.

Embodiment 4

Figure 11:
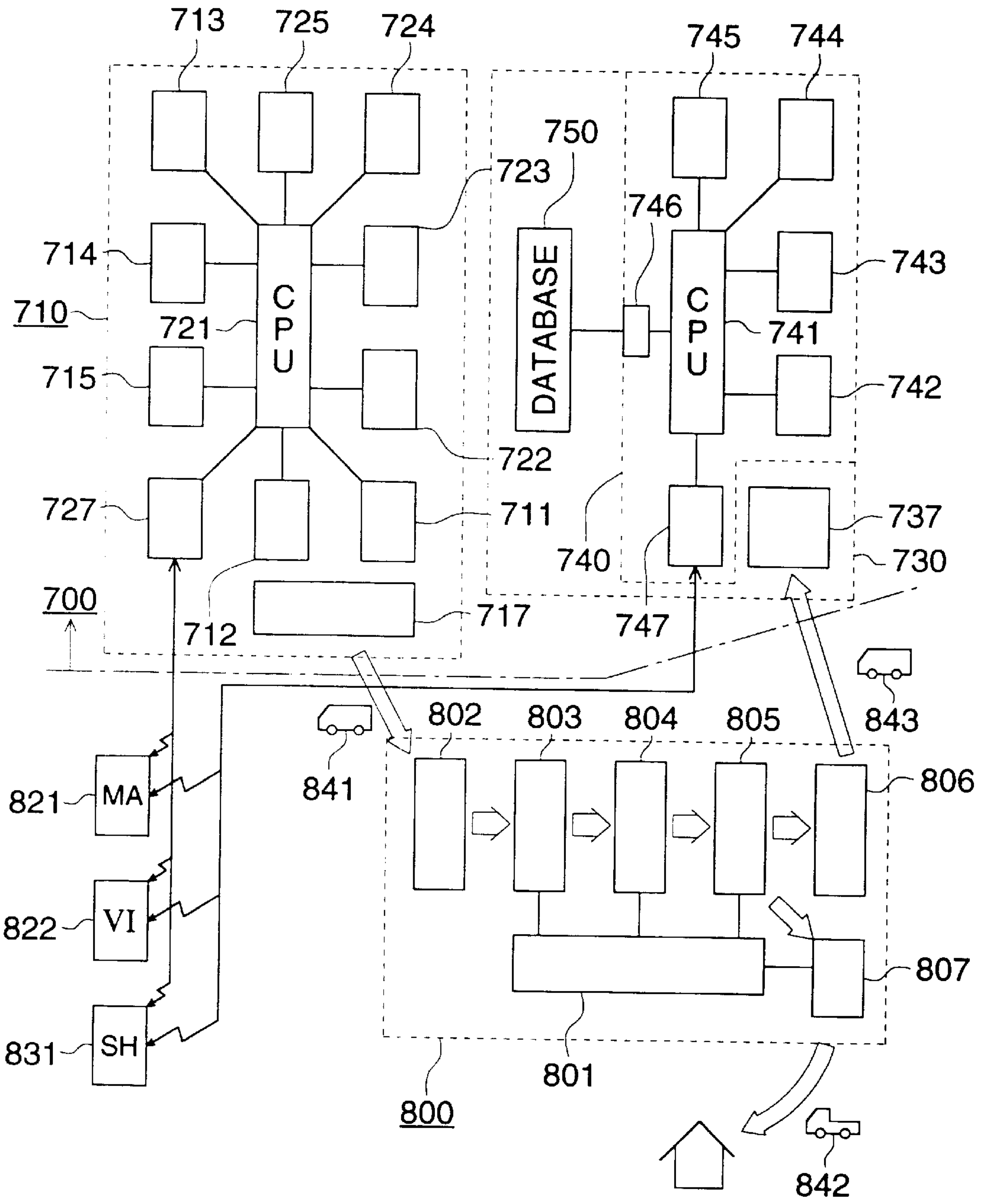
FIG. 11. is an outlined view of a photographic product production and distribution system in Embodiment 4.

The photographic product production/distribution system of the present embodiment is one wherein a part of the photographic product production/distribution system of Embodiment 2 has been changed. The photographic product production/distribution system of the present embodiment will now be explained as follows, referring to FIG. 11 which is a schematic diagram of the photographic product production/distribution system of the present embodiment.

Points of the aforesaid change include that CPU 721 of the order receiving system is not connected to data base 750, and that CPU 741 of delivery system 730 is connected to modem 727 connected with a telephone line to connect to credit card centers 821 and 822 and shopping card center 831, and changed points caused by the foregoing. Owing to this, order receiving system 710 and delivery system 730 can be operated independently of each other. Further, a photographic bag does not need to be provided with a bar code in which a type and a number of a credit card are recorded or a bar code in which the number of a shopping chain card is recorded, which is different from Embodiment 3.

Since CPU 721 is not connected to data base 750 of store 700, CPU 721 can not change information stored in the data base 750 of the store 700. Further, in the data base 750, there are stored the receipt number, a name and a phone number of an orderer, a type of an image recording medium, order content information, information showing whether "delivered" or not, and the amount sold for all delivered photographic products.

Photographic bags and slips are provided respectively with consecutive receipt numbers in advance, and a bar code showing this receipt number is recorded on a photographic bag in advance. Therefore, CPU 721 does not need to make data base 750 to transmit the receipt number.

The data base 750 does not store the type and the card number of a credit card when a credit card is used for order receiving, and it does not store the card number of a shopping chain card when a shopping chain card is used for order receiving.

However, it is possible to deal with a customer satisfactorily, by obtaining information of a name, a zip code, an address and a phone number of an owner of a credit card, when a credit card is deposited in the case of delivery, by transmitting the card number to credit card centers 821 and 822 corresponding to the type of the credit card acquired by reading the credit card, and by obtaining information of a name, a zip code, an address and a phone number of an owner of a shopping chain card, when a shopping chain card is deposited in the case of delivery, by transmitting the card number acquired through reading of the shopping chain card to shopping chain card center 831.

The photographic product production/distribution system having this structure can also cope with deferred payment which is the same as those in conventional payment system for photographic products.

Embodiment 5

Figure 12:
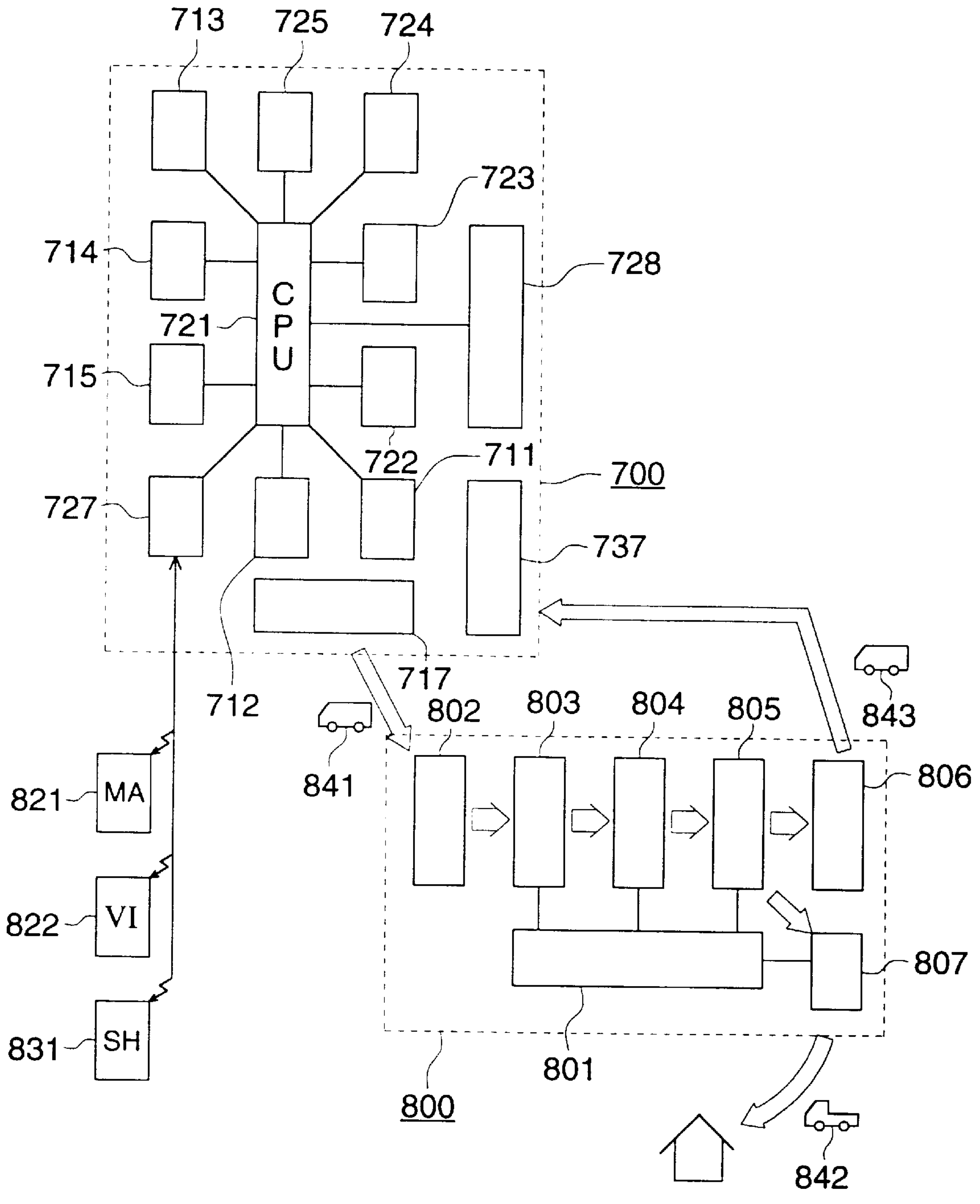
FIG. 12 is an outlined view of a photographic product production and distribution system in Embodiment 5.

The photographic product production/distribution system of the present embodiment is one wherein a part of the photographic product production/distribution system of Embodiment 2 has been changed. The photographic product production/distribution system of the present embodiment will now be explained as follows, referring to FIG. 12 which is a schematic diagram of the photographic product production/distribution system of the present embodiment.

The photographic product production/distribution system of the present embodiment is one wherein order receiving system 710 also serves as a delivery system. Therefore, it has only to provide external storage unit 728 connected to CPU 721, in place of a data base. Each of order receiving system 710 also has a function of a unit having the same name in delivery system in Embodiment 2. External storage unit 728 has a function of the data base in Embodiment 2. Incidentally, finished product storage box 737 is provided separately in the order receiving system 710 which also serves as a delivery system.

The photographic product production/distribution system having this structure can also cope with deferred payment which is the same as those in conventional payment system for photographic products.

Embodiment 6

Figure 13:
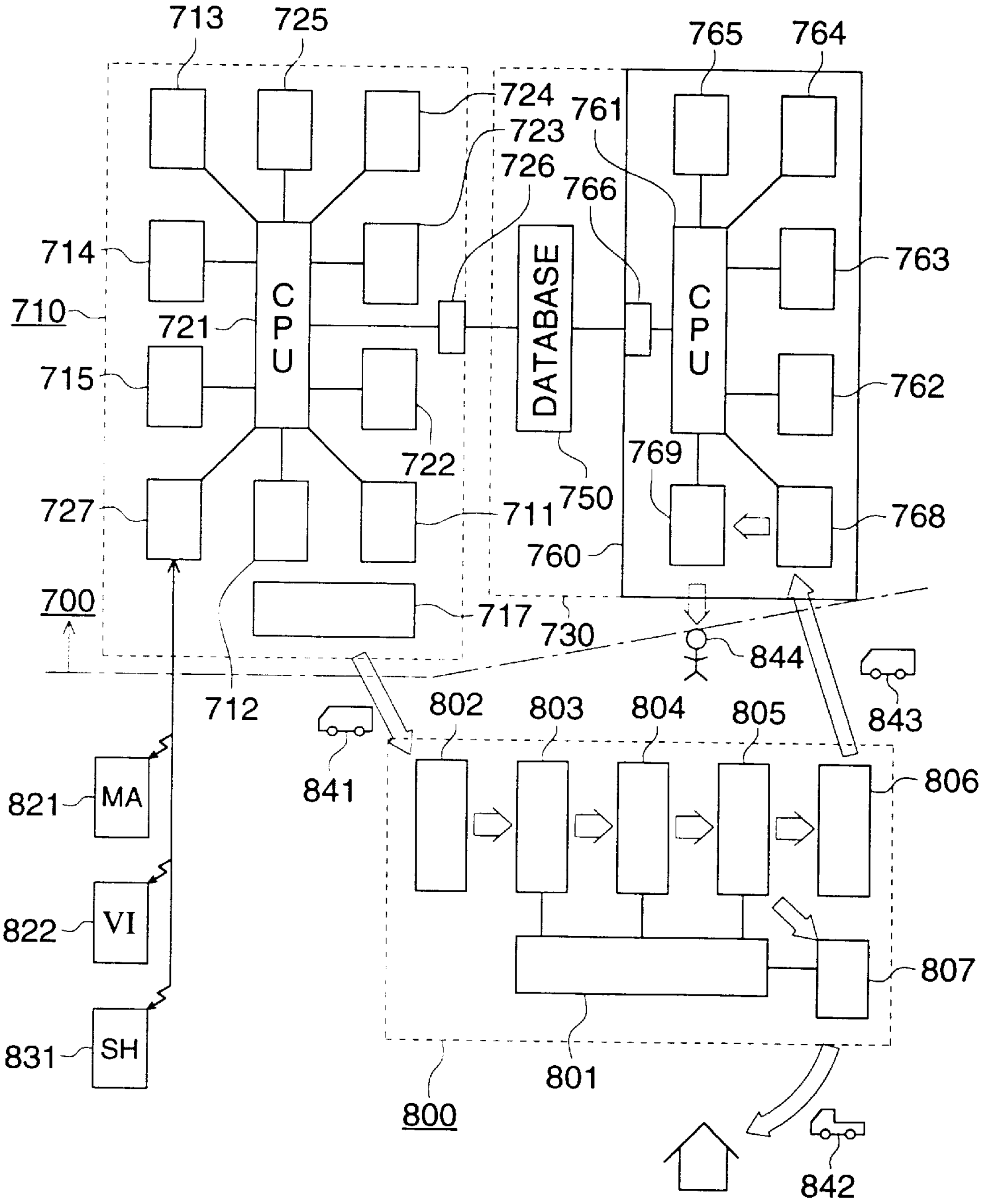
FIG. 13 is an outlined view of a photographic product production and distribution system in Embodiment 6.

The photographic product production/distribution system of the present embodiment is one wherein a part of the photographic product production/distribution system of Embodiment 2 has been changed. The photographic product production/distribution system of the present embodiment will now be explained as follows, referring to FIG. 13 which is a schematic diagram of the photographic product production/distribution system of the present embodiment.

The photographic product production/distribution system of the present embodiment is one wherein the delivery system of Embodiment 2 is changed to an automatic delivery equipment into which an automated machine is introduced to require no operator. There will be explained all points of difference between Embodiment 2 and the present embodiment, as follows.

1. Schematic Structure of Automatic Delivery Equipment 760

On automatic delivery equipment 760, there is provided CPU 761 which controls various parts of the automatic delivery equipment 760. The CPU 761 is connected to monitor 763 which displays various information for delivery processing and states of driving various sections connected to the CPU 761. On the CPU 761, there is provided key board 762 which is used by customer 844 when the customer operates to input through a key.

Further, the CPU 761 is connected, through interface 766, to data base 750 of store 700.

The CPU 761 is further connected to credit card reader 764 which is provided so that various credit cards may be inserted in prescribed positions and can read the type and the card number of the credit card inserted in the prescribed position.

The CPU 761 is further connected to bar code reader 765 which is provided so that various shopping chain cards may be inserted in prescribed positions and can read the type and the card number of the shopping chain card by reading a bar code recorded on the shopping chain card inserted in the prescribed position.

A photographic bag delivered from photofinishing system 800 by delivery truck 843 is put in sorter 768 which can sort each photographic bag in its sorter bin one by one. On the sorter 768, there is provided a bar code reader which can read a bar code recorded on each photographic bag and thereby can read information recorded on the bar code. The sorter 768 is connected to CPU 761, and delivery member 769 is provided so that it can be controlled by the CPU 761 to take out a specific photographic bag contained in the sorter 768. The delivery member 769 is connected to CPU 761, and a specific photographic bag sorted in sorter 768 is taken out by the control of CPU 761, and is delivered to customer 844.

2. Delivery of Goods

Automatic delivery equipment 760 is periodically visited by delivery truck 843 so that photographic products produced by photofinishing system 800 are delivered to the automatic delivery equipment 760. Then, a driver of the delivery truck 843 unlocks the sorter 768, and puts each photographic bag in each bin of the sorter 768 in the prescribed direction one by one, for delivery.

Then, the bar code of the photographic bag sorted in each bin of the sorter 768 is read by a bar code reader provided on the sorter 768 and the receipt number recorded on the bar code is read and is transmitted to CPU 761 which then transmits the receipt number read by the bar code reader of the sorter 768 to data base 750, thus, it is established and registered that the photographic products corresponding to that receipt number have been delivered.

3. Delivery Procedures

Next, delivery of finished photographic products which have not been handed to an orderer will be explained.

When a customer who is an orderer visits a tore where the delivery system of the present embodiment is installed, a guide screen is displayed on monitor 763 of the automatic delivery equipment 760. Then, the guide screen on the monitor 763 of the automatic delivery equipment 760 requests the customer either to insert a credit card or a shopping chain card in its corresponding reader, or to input its name and a phone number through key board 762.

3-1. When a Credit Card is Inserted

When a credit card is inserted, credit card reader 764 of automatic delivery equipment 760 reads the inserted credit card and reads the type and the card number of the credit card, then, transmits the type and the card number of the credit card which have been read to CPU 761.

Then, the CPU 761 transmits the type and the card number of the credit card thus read to data base 750 through interface 766, then, makes a phone number and a name of an owner of the credit card corresponding to the type and card number of the transmitted credit cart to be retrieved, and makes the phone number and the name to be transmitted. Then, the CPU 761 receives the phone number and the name.

Then, the CPU 761 transmits the received phone number and the name, and makes data base 750 to retrieve the receipt number corresponding to the transmitted phone number and name, and to transmit the retrieved receipt number and information showing whether or not each photographic product of the retrieved receipt number has been delivered or handed.

Then, the CPU 761 receives the retrieved receipt number and information showing whether or not each photographic product corresponding to the retrieved receipt number has been delivered or handed which were transmitted by data base 750 through interface 766.

Then, the CPU 761 makes monitor 763 to display the retrieved receipt number and information showing whether or not each photographic product corresponding to the retrieved receipt number has been delivered or handed.

Then, the CPU 761 takes out of sorter 768 a photographic bag with the receipt number which has been delivered but has not been handed, and controls delivery member 769 so that it hands the photographic bag. Then the delivery member 769 takes the desired photographic bag out of sorter 768, and hands it to customer 844.

Then, CPU 761 establishes on data base 750 saying that the photographic product of the photographic bag has been handed.

3-2. When a Shopping Chain Card is Inserted

When a shopping chain card is inserted, bar code reader 765 reads the inserted shopping chain card, and reads the card number of the shopping chain card (card ID information which sometimes includes letters and symbols in addition to numerals). Then, it transmits the card number of the shopping chain card thus read to CPU 761.

Then, the CPU 761 transmits the card number of the shopping chain card to data base 750, and makes the phone number and the name of an owner of the shopping chain card corresponding to the aforesaid card number to be transmitted.

Then, the CPU 761 receives the phone number and the name of an owner of the shopping chain card corresponding to the transmitted card number of the shopping chain card, from data base 750 through modem 727.

Then, the CPU 761 transmits the received phone number and name, and makes data base 750 to retrieve the receipt number of photographic products corresponding to the phone number and name, and makes the retrieved receipt number and information showing whether or not each photographic product of the retrieved receipt number has been delivered or handed to be transmitted.

Then, the CPU 761 receives the retrieved receipt number and information showing whether or not each photographic product corresponding to the retrieved receipt number has been delivered or handed.

Then, the CPU 761 makes monitor 763 to display the retrieved receipt number and information showing whether each photographic product corresponding to the retrieved receipt number has been delivered or handed.

Then, the CPU 761 takes out of sorter 768 a photographic bag with the receipt number which has been delivered but has not been handed, and controls delivery member 769 so that it hands the photographic bag. Then the delivery member 769 takes the desired photographic bag out of sorter 768, and hands it to customer 844.

Then, the CPU the 761 establishes on data base 750 indicating that the photographic product of the photographic bag has been handed.

3-3. When Phone Number and Name are Inputted Through Keyboard

When a phone number and a name are inputted through keyboard 762, CPU 761 transmits the inputted phone number and name to data base 750 so that the receipt number of photographic products corresponding to the phone number and name may be retrieved by the data base 750, and makes the retrieved receipt number and information showing whether or not each photographic product corresponding to the retrieved receipt number has been delivered or handed to be transmitted.

Then, the CPU 761 receives the retrieved receipt number and information showing whether or not each photographic product corresponding to the retrieved receipt number has been delivered or handed which have been transmitted by data base 750 through interface 766.

Then, the CPU 761 makes monitor 763 to display the retrieved receipt number and information showing whether or not each photographic product corresponding to the retrieved receipt number has been delivered or handed.

Then, the CPU 761 takes out of sorter 768 a photographic bag with the receipt number which has been delivered but has not been handed, and controls delivery member 769 so that it hands the photographic bag. Then the delivery member 769 takes the desired photographic bag out of sorter 768, and hands it to customer 844.

Then, the CPU the 761 establishes on data base 750 saying that the photographic product of the photographic bag has been handed.

3-4. Selling Procedures for Handing Photographic Products

Incidentally, in the photographic product production/distribution system of the present embodiment, selling procedures are not needed when handing photographic products, because selling procedures are taken in the course order receiving.

Embodiment 7

Figure 14:
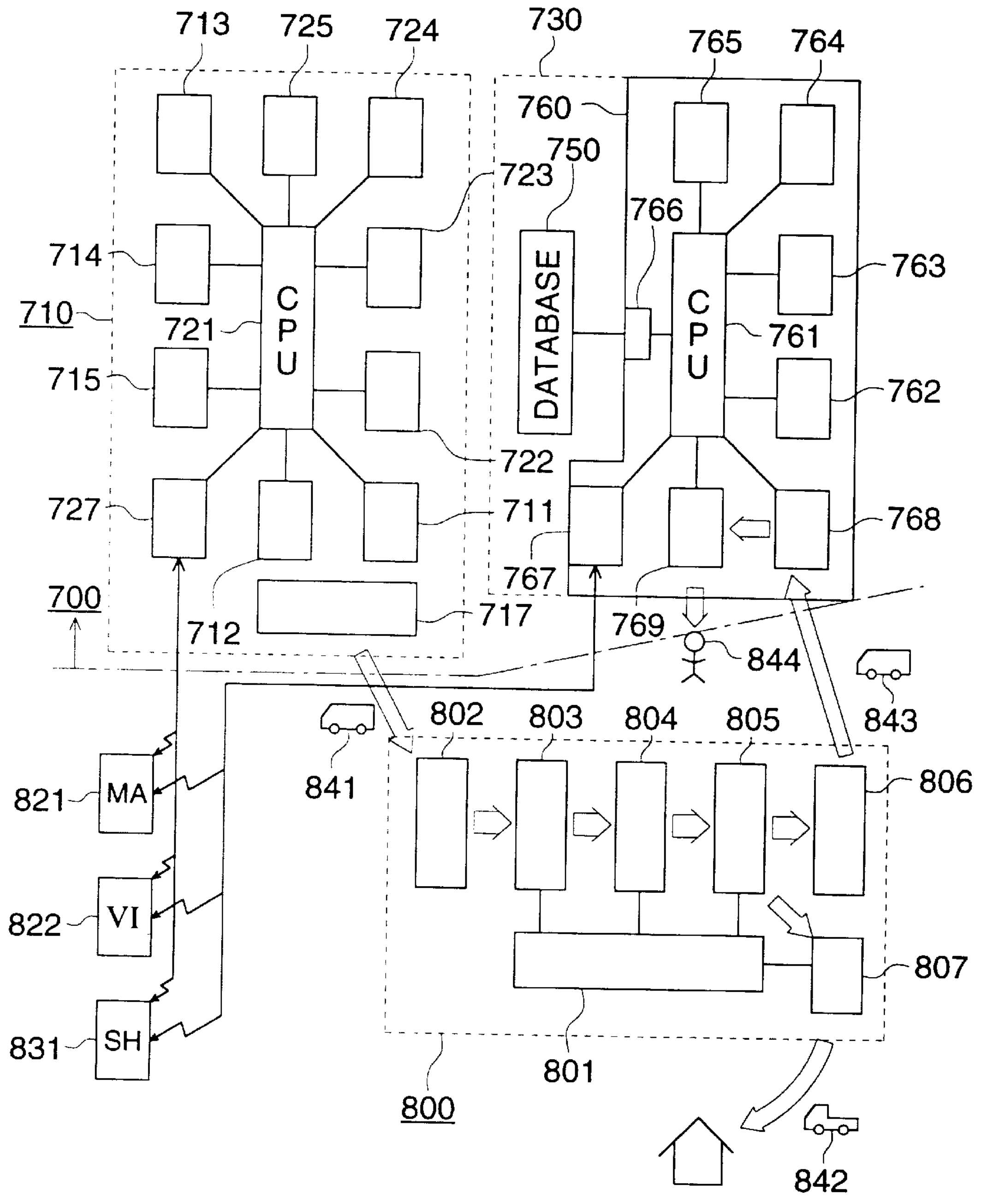
FIG. 14 is an outlined view of a photographic product production and distribution system in Embodiment 7.

The photographic product production/distribution system of the present embodiment is one wherein a part of the photographic product production/distribution system of Embodiment 6 has been changed. The photographic product production/distribution system of the present embodiment will now be explained as follows, referring to FIG. 14 which is a schematic diagram of the photographic product production/distribution system of the present embodiment.

Points of the aforesaid change include that CPU 721 of the order receiving system is not connected to data base 750, and that CPU 761 of automatic delivery equipment 760 is connected to modem 767 connected with a telephone line to connect to credit card centers 821 and 822 and shopping chain center 831, and changed points caused by the foregoing. Owing to this, order receiving system 710 and automatic delivery equipment 760 can be operated independently of each other.

Since CPU 721 is not connected to data base 750 of store 700, CPU 721 can not change information stored in the data base 750 of the store 700. Further, in the data base 750, there are stored the receipt number, a name and a phone number of an orderer, and information showing whether "delivered" or not, for all delivered photographic products.

Photographic bags and slips are provided respectively with consecutive receipt numbers in advance, and a bar code showing this receipt number is recorded on a photographic bag in advance. Therefore, CPU 721 does not need to make data base 750 to transmit the receipt number.

The data base 750 does not store the type and the card number of a credit card when a credit card is used for order receiving, and it does not store the card number of a shopping chain card when a shopping chain card is used for order receiving.

1. Schematic Structure of Automatic Delivery Equipment 760

Only point of automatic delivery equipment 760 different from the automatic delivery equipment in Embodiment 6 is that CPU 761 is connected to modem 727 connected with a telephone line to be connected to credit card centers 821 and 822 and to shopping chain center 831, and other points are the same as those in the automatic delivery equipment in Embodiment 6.

2. Delivery of Goods

The delivery is the same as that in Embodiment 6.

3. Delivery Procedures

Next, delivery of finished photographic products which have not been handed to an orderer will be explained.

When a customer who is an orderer visits a tore where the delivery system of the present embodiment is installed, a guide screen is displayed on monitor 763 of the automatic delivery equipment 760. Then, the guide screen on the monitor 763 of the automatic delivery equipment 760 requests the customer either to insert a credit card or a shopping chain card in its corresponding reader, or to input its name and a phone number through keyboard 762.

3-1. When a Credit Card is Inserted

When a credit card is inserted, credit card reader 764 of automatic delivery equipment 760 reads the inserted credit card and reads the type and the card number of the credit card, then, transmits the type and the card number of the credit card which have been read to CPU 761.

Then, the CPU 761 transmits the card number to credit card centers 821 and 822 corresponding to the type of the credit card read from the credit card through modem 767, and makes a name and phone number of an owner of the credit card to be transmitted. Then, the CPU 761 receives the phone number and the name.

Then, the CPU 761 transmits the received phone number and the name, and makes data base 750 to retrieve the receipt number corresponding to the transmitted phone number and name, and to transmit the retrieved receipt number and information showing whether or not each photographic product of the retrieved receipt number has been handed.

Then, the CPU 761 receives the retrieved receipt number and information showing whether or not each photographic product corresponding to the retrieved receipt number has been delivered or handed which were transmitted by data base 750 through interface 766.

Then, the CPU 761 makes monitor 763 to display the retrieved receipt number and information showing whether or not each photographic product corresponding to the retrieved receipt number has been delivered or handed.

Then, the CPU 761 takes out of sorter 768 a photographic bag with the receipt number which has not been handed, and controls delivery member 769 so that it hands the photographic bag. Then the delivery member 769 takes the desired photographic bag out of sorter 768, and hands it to customer 844.

Then, CPU 761 establishes on data base 750 saying that the photographic product of the photographic bag has been handed.

3-2. When a Shopping Chain Card is Inserted

When a shopping chain card is inserted, bar code reader 765 reads the inserted shopping chain card, and reads the card number of the shopping chain card (card ID information which sometimes includes letters and symbols in addition to numerals). Then, it transmits the card number of the shopping chain card thus read to CPU 761.

Then, the CPU 761 transmits the card number read from the shopping chain card to shopping chain center 831 through modem 767, and makes the shopping chain center to transmit the name and phone number of an owner of the shopping chain card.

Then, the CPU 761 receives through modem 767 the phone number and the name of an owner of the shopping chain card transmitted from the shopping chain center 831.

Then, the CPU 761 transmits the received phone number and name, and makes data base 750 to retrieve the receipt number of photographic products corresponding to the phone number and name, and to transmit the retrieved receipt number and information showing whether or not each photographic product of the retrieved receipt number has been handed.

Then, the CPU 761 receives the retrieved receipt number and information showing whether or not each photographic product corresponding to the retrieved receipt number has been handed.

Then, the CPU 761 makes monitor 763 to display the retrieved receipt number and information showing whether each photographic product corresponding to the retrieved receipt number has been handed.

Then, the CPU 761 takes out of sorter 768 a photographic bag with the receipt number which has not been handed, and controls delivery member 769 so that it hands the photographic bag. Then the delivery member 769 takes the desired photographic bag out of sorter 768, and hands it to customer 844.

Then, the CPU the 761 establishes on data base 750 indicating that the photographic product of the photographic bag has been handed.

3-3. When Phone Number and Name are Inputted Through Keyboard

When a phone number and a name are inputted through keyboard 762, CPU 761 transmits the inputted phone number and name to data base 750, and makes the data base 750 to retrieve the receipt number of photographic products corresponding to the phone number and name and to transmit the retrieved receipt number and information showing whether or not each photographic product corresponding to the retrieved receipt number has been handed.

Then, the CPU 761 receives the retrieved receipt number and information showing whether or not each photographic product corresponding to the retrieved receipt number has been handed which have been transmitted by data base 750 through interface 766.

Then, the CPU 761 makes monitor 763 to display the retrieved receipt number and information showing whether or not each photographic product corresponding to the retrieved receipt number has been handed.

Then, the CPU 761 takes out of sorter 768 a photographic bag with the receipt number which has not been handed, and controls delivery member 769 so that it hands the photographic bag. Then the delivery member 769 takes the desired photographic bag out of sorter 768, and hands it to customer 844.

Then, the CPU the 761 establishes on data base 750 indicating that the photographic product of the photographic bag has been handed.

3-4. Selling Procedures for Handing Photographic Products

Incidentally, in the photographic product production/distribution system of the present embodiment, selling procedures are not needed when handing photographic products, because selling procedures are taken in the course of order receiving.

With the above structures of the present invention, following effects can be obtained.

The problem that the sales account can not be reckoned regardless of the fact that an order for the photographic processing is received through transmission can be avoided.

Even if a large amount of print outputs from digital image data are received simultaneously from many and unspecified persons, it is not necessary for the host computer to memorize the large amount of digital image data, whereby situations that the printer can not work normally or outputs properly due to the shortage of the memory capacity of the host computer or that the host computer can not conduct the other process can be avoided.

Even if a large amount of output digital image data are produced simultaneously by the client computer, it is not necessary for the host computer to memorize the large amount of output digital image data, whereby situations that the host computer can not output properly due to the shortage of the memory capacity or that the host computer can not conduct the other process can be avoided.

Invasion to the host computer included in the printer through the modem or from the client computer while the output digital image data is transmitted to the host computer included in the printer can be avoided.

Even if the program of the host computer of the printer is not maintained so as to correspond to the newly developed program installed in the client computer, the situation that the program of the host computer can not work properly can be avoided.

The situations that the produced print can not transferred or delivered regardless of the fact that an order for the photographic processing is received through transmission can be avoided.

A stalker is made to stand in difficulty to get the name and the contact place of an orderer, whereby the oderer does not conceive the fear that the name and the contact place are surreptitiously looked by a stalker.

It is not necessary to write a name with katakana character, whereby the work to write in the column of order or confirm it can be reduced.

The problem that the sales account can not be reckoned due to the reason that the orderer does not come to take the photographic print regardless of the order for the photographic processing can be avoided.

The request for the orderer to carry a ticket in order to receive the photographic product at a photo shop or a photophinisher can be eliminated.

What is claimed is:

1. A photographic processing and client administrative system for receiving a photographic processing order from a client who carries an image medium containing photographic image information and a card containing an ID code including numbers to identify the client and for processing the photographic image information in accordance with the photographic processing order, comprising:

a photographic processing order input device for inputting the photographic processing order, wherein the photographic processing order includes information which designates the kind of image medium received from the client and the type of method to be used to process the photographic image information, and the photographic processing order does not include client information including a client name and a client telephone number, and wherein the photographic processing order input device generates data of the photographic processing order;

a card reader for reading the ID code form the card of the client and for generating data of the ID code;

a controller configured to generate a reference number with reference to the data of the photographic processsing order and the data of the ID code and to memorize the data of the photographic processing order and the date of the ID code together with the reference number in a correlated form in a memory;

an ID transmitting receiving device for transmitting the data of the ID code to an ID information administrative center and for receiving data of the client information including the client name and the client telephone number from the ID information administrative center, wherein the controller memorizes the data of the client information together with both of the data of the photographic processing order and the reference number in the memory in the correlated form after the ID transmitting receiving device has received the data of the client information from the ID information administrative center;

a writing device to receive the data of the client information and the reference number from the controller and to write the client name and the client telephone number together with the reference number on a sheet; and a photographic processing device to process the photographic image information in the image medium based on the photographic processing order correlated with the reference number and to produce a photographic product in correlation with the reference number.

2. The photographic processing and client administrative system of claim 1, wherein the card reader is one of a slot type card reader having a slot in which the card is inserted so that the ID code is read and a bar code reader to read bar code representing the ID code from the card.

3. The photographic processing and client administrative system of claim 1, wherein the order contents input device generates electric data as the data of the photographic processing order, the card reader generates electric data as the data of the ID code, and the controller memorizes the electric data of the photographic processing order and the electric data of the ID code together with electric data of the reference number in the memory.

4. The photographic processing and client administrative system of claim 1, wherein the reference number is a receipt number.

5. The photographic processing and client administrative system of claim 4, wherein the reference number is a consecutive number generated for each receipt of an order.

6. The photographic processing and client administrative system of claim 1, wherein the reference data and the photographic processing order are stored in the memory as header information for the photographic image information contained in the image medium.

7. The photographic processing and client administrative system of claim 1, wherein the controller further memorizes charge information to be paid by the client and correlates it with the reference number.

8. The photographic processing and client administrative system of claim 7, wherein the controller transmits the charge information to the ID information administrative center with the date of the ID code.

9. The photographic processing and client administrative system of claim 7, wherein the controller memorizes the charge information in the memory in correlation with the received client information.

10. The photographic processing and client administrative system of claim 1, wherein the controller obtains the client information to be written on an order receipt slip from the memory.

11. The photographic processing and client administrative system of claim 10, wherein the writing device is a receipt slip producing device for producing the receipt slip for the photographic processing order from the client information.

12. The photographic processing and client administrative system of claim 11, wherein the receipt slip producing device records the order contents on the slip.

13. The photographic processing and client administrative system of claim 11, wherein the receipt slip producing device records the order contents and at least one of the ID code and the client name.

14. The photographic processing and client administrative system of claim 11, wherein the printing information and client information including the client name and the client telephone number is further recorded on a photographic bag in company with the production of the receipt slip by the receipt slip producing device.

15. The photographic processing and client administrative system of claim 10, further comprising;

a printing device for recording an image on a recording medium by photographic processing of the order contents.

16. The photographic processing and client administrative system of claim 15, further comprising:

a receipt slip producing device for producing the order receipt slip from the printing information, wherein the receipt slip producing device records a scheduled time for completion of the photographic processing.

17. The photographic processing and client administrative system of claim 1, wherein the photographic processing device comprises a printing device for recording the photographic image information of the image medium on a photographic paper.

18. The photographic processing and client administrative system of claim 17, wherein the recording medium is a silver halide photosensitive material.

19. The photographic processing and client administrative system of claim 1, wherein the controller stores image data in the memory correlated with at least one of the reference number, the client information, and the other contents.

20. The photographic processing and client administrative system of claim 19, further comprising:

a printing device for recording an image on a recording medium from the data stored in the memory.

21. The photographic processing and client administrative system of claim 20, wherein the image data is processed on the basis of the order contents stored in the memory, and wherein the printing device records the image on a recording medium from the processed data of the image data.

22. The photographic processing and client administrative system of claim 21, wherein the recording medium is a silver halide photosensitive material.

23. The photographic processing and client administrative system of claim 19, further comprising:

an image data input device for inputting image data accepted from the client, wherein image data is stored in the memory through the image data input device.

24. The photographic processing and client administrative system of claim 23, wherein the image input device reads image data from a computer readable medium.

25. The photographic processing and client administrative system of claim 23, wherein the image input device reads image data by scanning a medium containing an image.

* * * * *

UNITED STATES PATENT AND TRADEMARK OFFICE

CERTIFICATE OF CORRECTION

PATENT NO. : 6,429,923 B1
DATED : August 6, 2002
INVENTOR(S) : Yutaka Ueda et al.

It is certified that error appears in the above-identified patent and that said Letters Patent is hereby corrected as shown below:

Column 80,
Line 9, "form" should read -- from --.
Line 15, "date" should read -- data --.

Column 81,
Line 4, "date" should read -- data --.

Signed and Sealed this

Ninth Day of December, 2003

JAMES E. ROGAN
*Director of the United States Patent and Trademark Office*